US010742726B2

(12) United States Patent
Vysotsky et al.

(10) Patent No.: US 10,742,726 B2
(45) Date of Patent: Aug. 11, 2020

(54) WEBRTC API REDIRECTION WITH ALTERNATIVE NETWORK CONNECTIVITY STEERING

(71) Applicant: CITRIX SYSTEMS, INC., Fort Lauderdale, FL (US)

(72) Inventors: Vladimir Vysotsky, Fremont, CA (US); Todd Giebler, Pompano Beach, FL (US); Georgy Momchilov, Parkland, FL (US); James Page, Pompano Beach, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/402,926

(22) Filed: May 3, 2019

(65) Prior Publication Data
US 2019/0342365 A1 Nov. 7, 2019

Related U.S. Application Data

(60) Provisional application No. 62/667,013, filed on May 4, 2018.

(51) Int. Cl.
*H04L 29/06* (2006.01)
*H04L 29/08* (2006.01)
(Continued)

(52) U.S. Cl.
CPC .......... *H04L 67/104* (2013.01); *G06F 3/0481* (2013.01); *G06F 3/1454* (2013.01);
(Continued)

(58) Field of Classification Search
CPC ... H04L 67/104; H04L 43/12; H04L 61/2575; H04L 63/20; H04L 65/1059;
(Continued)

(56) References Cited

U.S. PATENT DOCUMENTS 8,131,816 B2   3/2012  Robinson et al.
8,296,357 B2  10/2012  Stone et al.
(Continued)

OTHER PUBLICATIONS

U.S. Appl. No. 15/880,938, filed Jan. 26, 2018 Ingale et al.
(Continued)

*Primary Examiner* — Viet D Vu
(74) *Attorney, Agent, or Firm* — Allen, Dyer, Doppelt + Gilchrist, PA

(57) ABSTRACT

A computing system includes a virtual desktop server and a client computing device. The virtual desktop server is within an enterprise and includes a real-time media application to provide real-time communications (RTC) for peer-to-peer networking, and a native RTC engine to execute a portion of the real-time media application when received by the native RTC engine. An API code redirection module redirects intercepted APIs of the real-time media application intended for the native RTC engine so that the portion of the real-time media application is redirected away from the native RTC engine to a client RTC engine in the client computing device. The portion of the real-time media application being redirected includes provisioning information directed to a media server. A network edge appliance associated with a branch within the enterprise provides alternative network connectivity options for the peer-to-peer networking.

21 Claims, 35 Drawing Sheets

(51) Int. Cl.

| | | |
|---|---|---|
| *G06F 9/451* | (2018.01) | |
| *G06F 9/455* | (2018.01) | |
| *G06F 9/54* | (2006.01) | |
| *H04L 29/12* | (2006.01) | |
| *G06T 7/90* | (2017.01) | |
| *G06F 3/0481* | (2013.01) | |
| *G06F 3/14* | (2006.01) | |
| *G06K 19/06* | (2006.01) | |
| *H04N 5/272* | (2006.01) | |
| *H04N 7/14* | (2006.01) | |
| *H04L 12/26* | (2006.01) | |

(52) U.S. Cl.
CPC .............. *G06F 9/452* (2018.02); *G06F 9/455* (2013.01); *G06F 9/45529* (2013.01); *G06F 9/45533* (2013.01); *G06F 9/45545* (2013.01); *G06F 9/547* (2013.01); *G06K 19/06028* (2013.01); *G06T 7/90* (2017.01); *H04L 43/12* (2013.01); *H04L 61/256* (2013.01); *H04L 61/2575* (2013.01); *H04L 63/20* (2013.01); *H04L 65/1059* (2013.01); *H04L 65/1069* (2013.01); *H04L 65/4015* (2013.01); *H04L 65/4069* (2013.01); *H04L 65/60* (2013.01); *H04L 65/601* (2013.01); *H04L 65/608* (2013.01); *H04L 65/80* (2013.01); *H04L 67/02* (2013.01); *H04L 67/08* (2013.01); *H04L 67/1091* (2013.01); *H04L 67/2804* (2013.01); *H04L 67/2814* (2013.01); *H04L 67/2819* (2013.01); *H04L 67/2861* (2013.01); *H04L 67/34* (2013.01); *H04L 67/42* (2013.01); *H04N 5/272* (2013.01); *H04N 7/147* (2013.01); *G06F 9/45558* (2013.01); *G06F 2009/45562* (2013.01); *G06F 2009/45595* (2013.01); *G06F 2203/04804* (2013.01); *H04L 65/1063* (2013.01)

(58) Field of Classification Search
CPC . H04L 65/1069; H04L 65/4015; H04L 65/60; H04L 65/601; H04L 65/608; H04L 65/80; H04L 67/02; H04L 67/08; G06F 9/452; G06F 3/0481; G06F 3/1454; G06F 9/455; G06F 9/45529; G06F 9/45533; G06F 9/45545; G06F 9/547
See application file for complete search history.

(56) References Cited

U.S. PATENT DOCUMENTS

| | | |
|---|---|---|
| 8,601,056 B2 | 12/2013 | Lauwers et al. |
| 8,671,213 B2 | 3/2014 | Robinson et al. |
| 8,799,362 B2 | 8/2014 | Lauwers et al. |
| 8,869,141 B2 | 10/2014 | Lauwers et al. |
| 8,949,316 B2 | 2/2015 | Lauwers et al. |
| 9,055,139 B1 | 6/2015 | Devireddy et al. |
| 9,124,668 B2 | 9/2015 | Giebler |
| 9,176,744 B2 | 11/2015 | Lee |
| 9,191,425 B2 | 11/2015 | Momchilov et al. |
| 9,203,883 B2 | 12/2015 | Momchilov et al. |
| 9,325,759 B2 | 4/2016 | Robinson et al. |
| 9,538,345 B2 | 1/2017 | Sah et al. |
| 9,571,599 B2 | 2/2017 | Giebler |
| 2014/0348044 A1 | 11/2014 | Narayanan et al. |
| 2015/0373136 A1 | 12/2015 | Giebler |
| 2016/0149836 A1 | 5/2016 | Narayanan et al. |
| 2016/0285948 A1* | 9/2016 | Saint-Hilaire .......... H04L 67/02 |
| 2016/0378451 A1 | 12/2016 | Walker |
| 2017/0076095 A1 | 3/2017 | Reddington |
| 2017/0083354 A1* | 3/2017 | Thomas ................. G06F 9/455 |
| 2017/0205978 A1 | 7/2017 | Rossi et al. |
| 2019/0155861 A1* | 5/2019 | Klug ..................... G06F 16/957 |
| 2019/0356701 A1* | 11/2019 | Prabhu ................ H04L 65/1073 |

OTHER PUBLICATIONS

U.S. Appl. 16/228,945, filed Dec. 21, 2019 Vysotsky, et al.
U.S. Appl. 16/228,964, filed Dec. 21, 2019 Vysotsky, et al.
U.S. Appl. 16/229,251, filed Dec. 21, 2019 Vysotsky, et al.
U.S. Appl. 16/229,308, filed Dec. 21, 2019 Vysotsky, et al.
U.S. Appl. 16/229,445, filed Dec. 21, 2019 Vysotsky, et al.
U.S. Appl. 16/402,847, filed May 3, 2019 Vysotsky, et al.
U.S. Appl. 16/402,882, filed May 3, 2019 Vysotsky, et al.
U.S. Appl. 16/402,902, filed May 3, 2019 Vysotsky, et al.

\* cited by examiner

| Input | | | | | Blended | | Computed/Recovered | | | |
|---|---|---|---|---|---|---|---|---|---|---|
| R | G | B | Color | Opacity | Black Blend | White Blend | Comp. A | Comp. R | Comp. G | Comp. B |
| 192 | 0 | 0 | | 0.0 | | | 0.0 | 0 | 0 | 0 |
| 0 | 192 | 0 | | 0.0 | | | 0.0 | 0 | 0 | 0 |
| 0 | 0 | 192 | | 0.0 | | | 0.0 | 0 | 0 | 0 |
| 255 | 255 | 255 | | 0.0 | | | 0.0 | 0 | 0 | 0 |
| 128 | 128 | 128 | | 0.0 | | | 0.0 | 0 | 0 | 0 |
| 0 | 0 | 0 | | 0.0 | | | 0.0 | 0 | 0 | 0 |
| 192 | 192 | 0 | | 0.0 | | | 0.0 | 0 | 0 | 0 |
| 192 | 0 | 192 | | 0.0 | | | 0.0 | 0 | 0 | 0 |
| 0 | 192 | 192 | | 0.0 | | | 0.0 | 0 | 0 | 0 |
| 192 | 0 | 0 | | 0.2 | | | 0.2 | 192 | 0 | 0 |
| 0 | 192 | 0 | | 0.2 | | | 0.2 | 0 | 192 | 0 |
| 0 | 0 | 192 | | 0.2 | | | 0.2 | 0 | 0 | 192 |
| 255 | 255 | 255 | | 0.2 | | | 0.2 | 255 | 255 | 255 |
| 128 | 128 | 128 | | 0.2 | | | 0.2 | 128 | 128 | 128 |
| 0 | 0 | 0 | | 0.2 | | | 0.2 | 0 | 0 | 0 |
| 192 | 192 | 0 | | 0.2 | | | 0.2 | 192 | 192 | 0 |
| 192 | 0 | 192 | | 0.2 | | | 0.2 | 192 | 0 | 192 |
| 0 | 192 | 192 | | 0.2 | | | 0.2 | 0 | 192 | 192 |
| 192 | 0 | 0 | | 0.5 | | | 0.5 | 192 | 0 | 0 |
| 0 | 192 | 0 | | 0.5 | | | 0.5 | 0 | 192 | 0 |
| 0 | 0 | 192 | | 0.5 | | | 0.5 | 0 | 0 | 192 |
| 255 | 255 | 255 | | 0.5 | | | 0.5 | 255 | 255 | 255 |
| 128 | 128 | 128 | | 0.5 | | | 0.5 | 128 | 128 | 128 |
| 0 | 0 | 0 | | 0.5 | | | 0.5 | 0 | 0 | 0 |
| 192 | 192 | 0 | | 0.5 | | | 0.5 | 192 | 192 | 0 |
| 192 | 0 | 192 | | 0.5 | | | 0.5 | 192 | 0 | 192 |
| 0 | 192 | 192 | | 0.5 | | | 0.5 | 0 | 192 | 192 |
| 192 | 0 | 0 | | 0.8 | | | 0.8 | 192 | 0 | 0 |
| 0 | 192 | 0 | | 0.8 | | | 0.8 | 0 | 192 | 0 |
| 0 | 0 | 192 | | 0.8 | | | 0.8 | 0 | 0 | 192 |
| 255 | 255 | 255 | | 0.8 | | | 0.8 | 255 | 255 | 255 |
| 128 | 128 | 128 | | 0.8 | | | 0.8 | 128 | 128 | 128 |
| 0 | 0 | 0 | | 0.8 | | | 0.8 | 0 | 0 | 0 |
| 192 | 192 | 0 | | 0.8 | | | 0.8 | 192 | 192 | 0 |
| 192 | 0 | 192 | | 0.8 | | | 0.8 | 192 | 0 | 192 |
| 0 | 192 | 192 | | 0.8 | | | 0.8 | 0 | 192 | 192 |
| 192 | 0 | 0 | | 1.0 | | | 1.0 | 192 | 0 | 0 |
| 0 | 192 | 0 | | 1.0 | | | 1.0 | 0 | 192 | 0 |
| 0 | 0 | 192 | | 1.0 | | | 1.0 | 0 | 0 | 192 |
| 255 | 255 | 255 | | 1.0 | | | 1.0 | 255 | 255 | 255 |
| 128 | 128 | 128 | | 1.0 | | | 1.0 | 128 | 128 | 128 |
| 0 | 0 | 0 | | 1.0 | | | 1.0 | 0 | 0 | 0 |
| 192 | 192 | 0 | | 1.0 | | | 1.0 | 192 | 192 | 0 |
| 192 | 0 | 192 | | 1.0 | | | 1.0 | 192 | 0 | 192 |
| 0 | 192 | 192 | | 1.0 | | | 1.0 | 0 | 192 | 192 |

FIG. 13

WEBRTC API REDIRECTION WITH ALTERNATIVE NETWORK CONNECTIVITY STEERING

RELATED APPLICATIONS

This application claims the benefit of provisional application Ser. No. 62/667,013 filed May 4, 2018, which is hereby incorporated herein in its entirety by reference.

TECHNICAL FIELD

The present disclosure generally relates to an application virtualization platform allowing virtualized browser and desktop applications to deliver optimized real-time communications using a standard Web Real-Time Communication (WebRTC) API.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

SUMMARY

A computing system includes a virtual desktop server and a client computing device. The virtual desktop server is within an enterprise and includes an application framework comprising a real-time media application to provide real-time communications (RTC) for peer-to-peer networking, and a native RTC engine to execute a portion of the real-time media application when received by the native RTC engine. An application programming interface (API) code redirection module redirects intercepted APIs of the real-time media application intended for the native RTC engine so that the portion of the real-time media application is redirected away from the native RTC engine, with the portion of the real-time media application being redirected including provisioning information directed to a media server.

A network edge appliance associated with a branch within the enterprise is configured to provide alternative network connectivity options for the peer-to-peer networking. The client computing device is in the branch with the network edge appliance and includes a client RTC API engine communicating with the API code redirection module to execute the redirected portion of the real-time media application, and perform alternative network connectivity probing via the network edge appliance to determine reachability to a peer computing device. At least one media stream is established with the peer computing device via the network edge appliance based on the alternative network connectivity probing.

The client RTC API engine is further configured to attempt network connectivity probing via the provisioned media server before performing the alternative network connectivity probing, and wherein the network edge appliance is further configured to intercept the attempt so that the alternative network connectivity probing is instead performed by the client RTC API engine.

The network edge appliance may notify the client computing device on availability of the network edge appliance for the alternative network connectivity probing.

The provisioning information being redirected along with the portion of the real-time media application includes information on at least one of a session traversal utilities for NAT (STUN) server, a traversal using relay NAT (TURN) server, and a combination of a STUN and TURN server. The client RTC API engine communicates with the API code redirection module through a virtual channel, and wherein the information on STUN and TURN servers to be used in the network connectivity probing is provided over the virtual channel.

The alternative connectivity probing is based on an interactive connectivity establishment (ICE). The alternative connectivity probing is based on communications with at least one session traversal utilities for NAT (STUN) server implementing a STUN protocol. The network connectivity probing is further based on communications with at least one traversal using relay NAT (TURN) server implementing a TURN protocol.

The API code redirection module redirects the intercepted APIs based on redirection code injected into the real-time media application. The redirected APIs correspond to real-time media processing. The peer computing device may be configured as another client computing device or as a conference bridge.

Yet another aspect is directed to a method for providing real-time communications (RTC) for peer-to-peer networking comprising receiving, by a virtual desktop server within an enterprise, a portion of a real-time media application by a native RTC engine of the virtual desktop server. The method includes intercepting and redirecting, by an application programming interface (API) code redirection module of the virtual desktop server, APIs of the real-time media application intended for the native RTC engine so that the portion of the real-time media application is redirected away from the native RTC engine, with the portion of the real-time media application being redirected including provisioning information directed to a media server.

The method further includes receiving, from a network edge appliance associated with a branch within the enterprise, alternative network connectivity options for the peer-to-peer networking, and instructing, by the virtual desktop server, a client computing device in the branch with the network edge appliance. The client computing device includes a client RTC API engine communicating with the API code redirection module to execute the redirected portion of the real-time media application, and establish at least one media stream with the peer computing device via the network edge appliance based on the alternative network connectivity probing.

Yet another aspect is directed to a non-transitory computer readable medium for operating a client computing device within a computing system as described above. The non-transitory computer readable medium has a plurality of computer executable instructions for causing the client computing device to perform steps as also described above.

BRIEF DESCRIPTION OF THE DRAWINGS

FIG. 13 is a table diagram illustrating a method of detecting semi-transparent overlays that can be used with the architecture illustrated in FIG. 3.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime and double prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
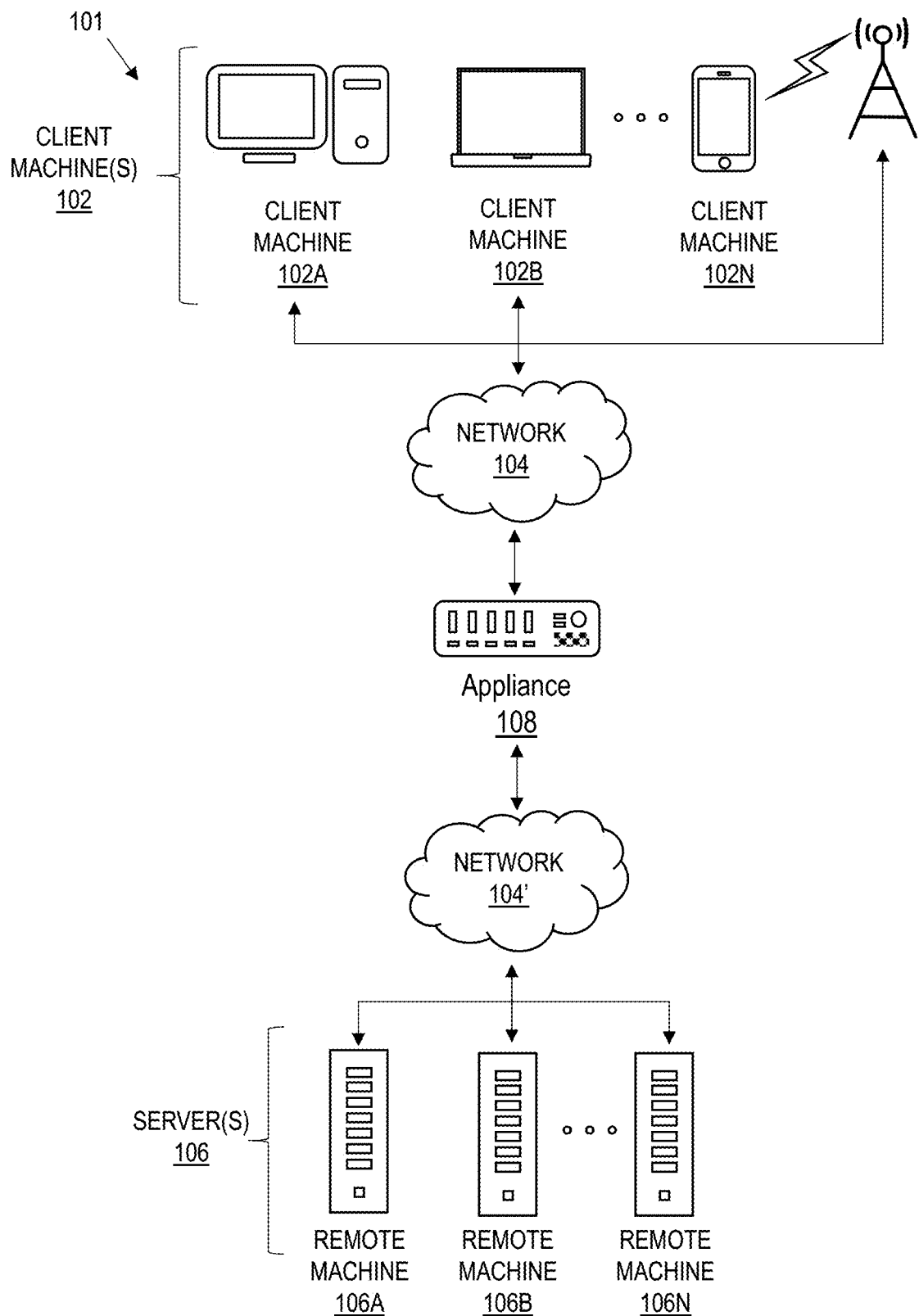
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local area network (WLAN), the protocols may include 802.11, Bluetooth, and Near Field Communication (NFC).

Figure 2:
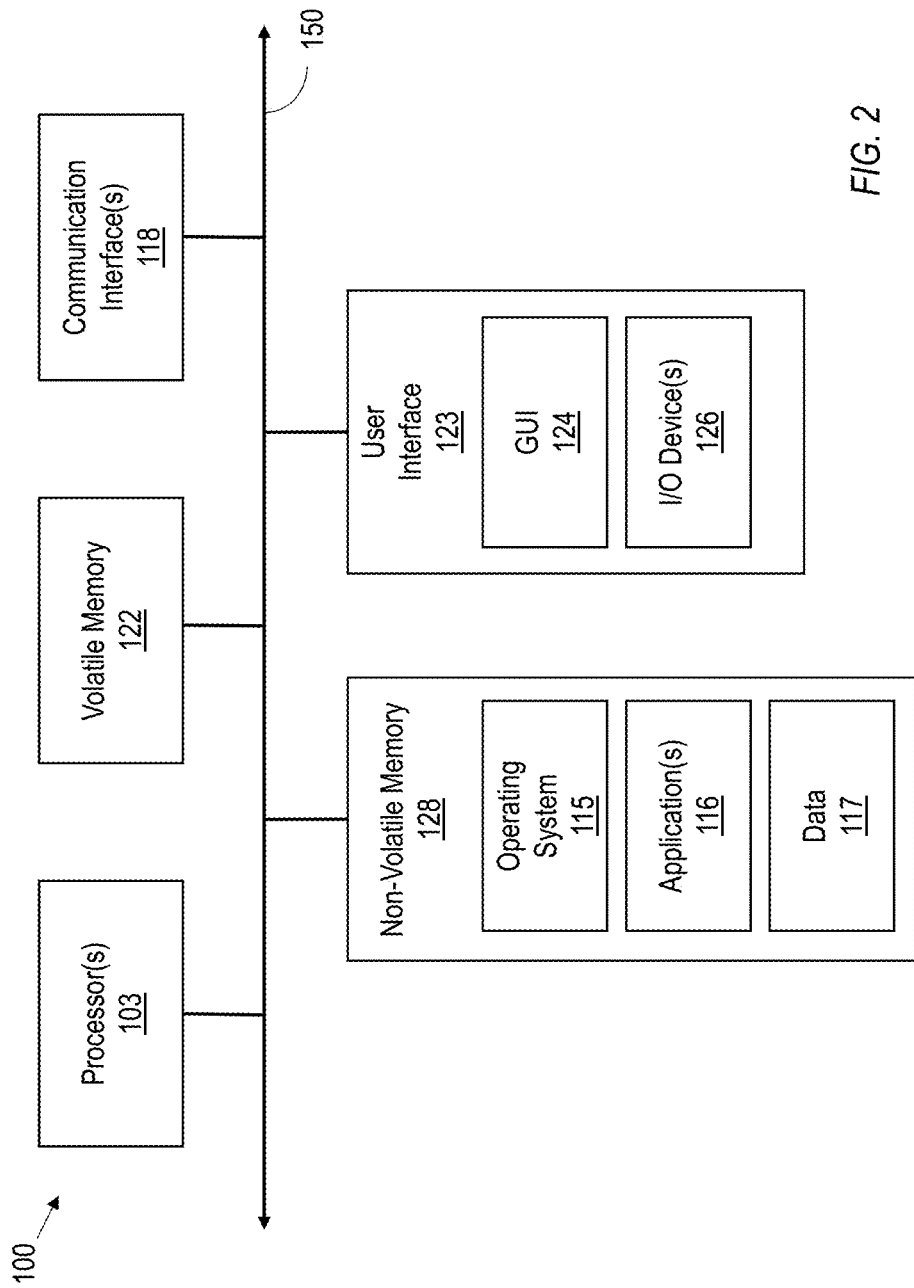
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
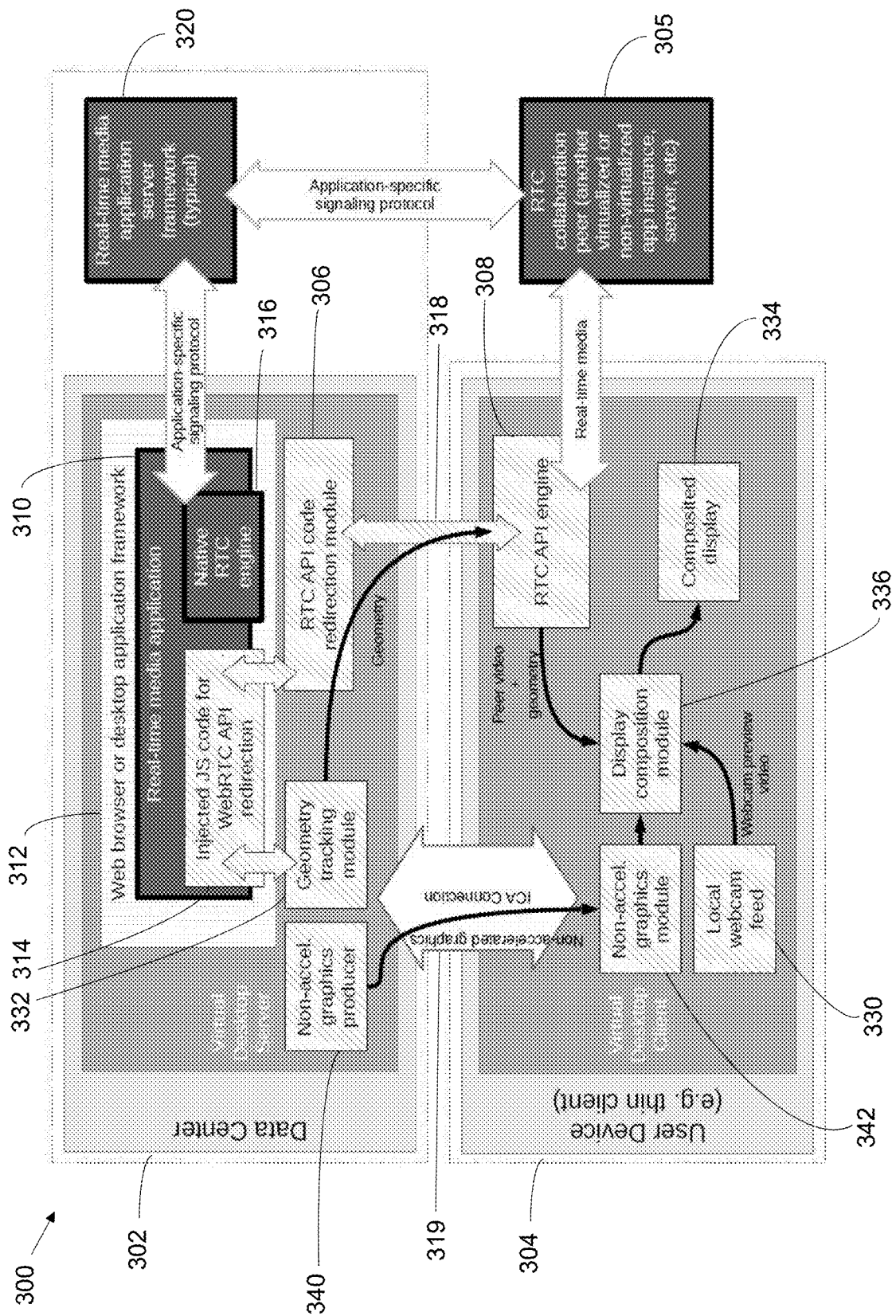
FIG. 3 is a block diagram of an architecture illustrating an application virtualization platform that provides WebRTC API on the virtual desktop server and executes the WebRTC API functionality on the client computing device in which various aspects of the disclosure may be implemented.
Figure 4:
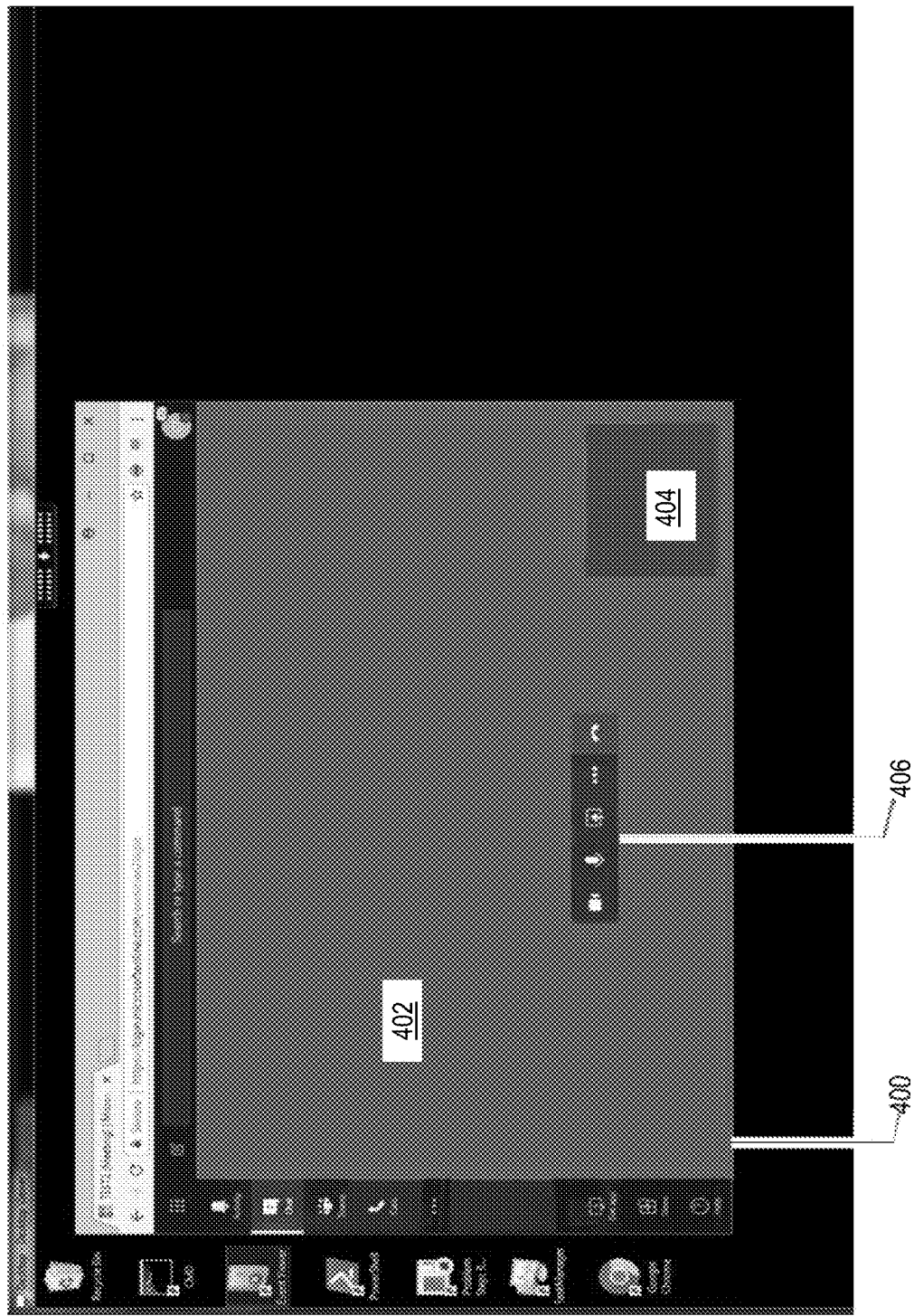
FIGS. 4-7 are various windows illustrating an example window monitoring/overlay detection scenario with the architecture illustrated in FIG. 3.

Turning now to FIG. 3, the illustrated architecture 300 will be discussed in terms of WebRTC redirection with interception techniques. The architecture 300 allows virtualized browser and desktop applications to deliver optimized real-time communications (RTC) using a standard WebRTC API. Real-time communications includes voice, video and data collaboration. An application framework 312 provides the WebRTC API on the application server 302, and provides execution of the WebRTC API functionality on the remote client 304. Various techniques are used to make this functionality feasible and transparent to the real-time media application 310, and achieve high quality user experience and other desirable features.

The application framework 312 includes a web browser or a desktop application to provide the real-time media application 310 that provides the real-time communications. The real-time media application 310 is supported by a real-time media application server 320. The architecture 300 may be referred to as a computing system 300, the application server 302 may be referred to as a virtual desktop server 302, and the remote client 304 may be referred to as a client computing device 304 or as a virtual desktop client 304. The client computing device 304 is in peer-to-peer communications with at least one other client computing device 305.

WebRTC is a collection of APIs and an open source project enabling real-time communications (VoIP, video over IP, and other types of real-time collaboration) in browser and desktop applications. Since its introduction to the industry by Google in 2011, and adoption by several standards bodies (W3C and IETF), WebRTC has been included in most popular web browsers, as well as made available in desktop application platforms such as Electron. Application and service vendors as well as enterprise IT departments are increasingly making use of WebRTC for adding voice and video functionality to existing and new HTML5 applications.

Electron is an open source framework for building desktop applications (running outside of a browser) using technologies originally defined for the Web, including HTML5 and WebRTC. Electron is also seeing increased adoption in the industry by leading application vendors.

Under desktop virtualization, execution of WebRTC functionality on the virtual desktop server 302 has a number of well-known disadvantages. One disadvantage is the high latency and low media quality introduced by virtualization of audio and video devices, which involves several rounds of media compression/decompression and extra network hops. Another disadvantage is network and server scalability concerns caused by mandatory tunneling of peer-to-peer media through the data center or the cloud infrastructure, and running high cost audio and video codecs on the virtual desktop server 302.

Execution of real-time functionality, including both the media processing pipelines and the networking code, by a client RTC API engine 308 on the client computing device 304 addresses these problems. It is still advantageous to run the rest of the real-time media application code on the virtual desktop server 302, using a native RTC engine 316 where it can integrate with other desktop applications and other desktop OS functionality. Redirection of WebRTC APIs provides a way for the real-time media application code to continue executing on the virtual desktop server 302, while offloading only real-time media processing and networking to the client computing device 304. Further, the real-time media application code can be largely unaware of the fact that WebRTC APIs are being redirected. This results in out-of-the box real-time media optimization for many if not all virtualized applications.

Redirection, or remoting, of parts of application functionality from the virtual desktop server 302 to the client computing device 304 is not new by itself, and has been implemented in a number of technologies (including such Citrix technologies as Remoting Audio and Video Extensions (RAVE), Flash Redirection, Browser Content Redirection, and Real-time Optimization Pack). However, what is new is using WebRTC redirection techniques to deliver real-time media optimization for HTML 5/JavaScript applications.

WebRTC redirection techniques include a number of unique features such as: new methods of API interception for browser and desktop applications; new techniques for providing fallback functionality; new techniques for video area identification and geometry tracking; new techniques for window monitoring/overlay detection; new techniques for selecting and capturing screen content for content-sharing sessions; new types and applications of policies to control application access to endpoint media sources; and new techniques for managing network connectivity for real-time media in virtualization application environments. These techniques are discussed in more detail below.

As a general overview, WebRTC comprises a set of API specifications maintained by the Web Real-Time Communications Working Group (part of W3C), as well as implementations of these APIs in web browsers and HTML5/JavaScript desktop application platforms such as Electron. The most relevant specifications for this architecture include WebRTC 1.0: Real-time Communication Between Browsers (further referenced as [webrtc]), Media Capture and Streams ([mediacapture-streams]), and Screen Capture ([screen-capture]). The following description references definitions and API elements from relevant W3C specifications without repeating them here.

The general idea of the illustrated architecture 300 in FIG. 3 is to redirect underlying functionality of WebRTC APIs from the virtual desktop server 302 to the client computing device 304 by intercepting calls to the API made by the real-time media application 310. The intercepted APIs are executed either remotely on the client computing device 304 via the client RTC API engine 308, or locally on the virtual desktop server 302 as appropriate via the native RTC engine 316. API callbacks are invoked or asynchronous API events are generated to the real-time media application 310.

Acronyms and definitions in this field include XenApp (XA), XenDesktop (XD), and Virtual Desktop Infrastructure (VDI). VDI is virtualization technology that hosts a desktop operating system on a centralized server in a data center, and provides remote access to virtual hosted applications and desktops. Citrix Receiver and Citrix Workspace App are virtual desktop clients providing remote access to virtual hosted applications and desktops.

The following major elements comprise the system architecture 300 for WebRTC redirection. A virtual desktop server 302 provides server-side virtual channel functionality and hosts virtual applications. For example, these may be implemented in Citrix XenApp/XenDesktop. A virtual desktop client 304 provides client-side virtual channel functionality. For example, this may be implemented in Citrix Receiver and Citrix Workspace App. A virtualized application (or virtual application) is a third-party application implemented in HTML 5 and JavaScript and uses WebRTC to deliver real-time voice, video and data functionality. The virtualized application, such as the real-time media application 310, is hosted on the virtual desktop server 302.

A server-side API code redirection module 306 includes code libraries and applications running on the virtual desktop server 302, and interacts with the real-time media application 310 to achieve WebRTC API redirection. The API code redirection module 306 may be referred to as a WebRTC API connector 306. The API code redirection module 306 may be considered as a single system component, or may be split into two subcomponents: injected and non-injected code, for some of the techniques described below.

Injected server-side WebRTC connector code 314 (injected API code) includes portions of connector code that may be either implemented in JavaScript, or implemented in a different computer language but providing a JavaScript-compatible API. The injected API code 314 is injected into the real-time media application 310, and modifies the HTML5/JavaScript execution environment within the application process. If implemented in JavaScript, the injected code 314 would communicate with non-injected connector code libraries directly using WebSockets or another suitable inter-process communication mechanism, and indirectly through rendered screen contents as described below in the window tracking section.

Other server-side connector code includes code libraries implemented in any suitable programming language and running either within or outside of the application process. The API code redirection module 306 communicates with the injected code 314 through WebSockets or another suitable mechanism, and indirectly through screen capture, and with the client RTC API engine 308 through a virtual channel 318.

The client RTC API engine 308 includes code libraries running on the client computing device 304. The client RTC API engine 308 communicates with the API code redirection module 306 through a virtual channel 318 hosted by the virtual desktop server 302.

The illustrated architecture 300, and the general idea of optimizing application virtualization by offloading parts of the real-time media application RTC functionality from the virtual desktop server 302 to the client computing device 304, are fairly generic and widely used in systems implementing application or desktop virtualization. The distinction herein lies in specific functions and interactions of the injected code 314, the API code redirection module 306, and the client RTC API engine 308 that are designed to optimize real-time media APIs. In particular, WebRTC is optimized.

As noted above, the computing system 300 includes the virtual desktop server 302 and the client computing device 304 in peer-to-peer communications with another endpoint device 305. The virtual desktop server 302 includes the application framework 312 that includes the real-time media application 310 to provide real-time communications (RTC), and the native RTC engine 316 to execute a portion of the real-time media application 310 when received by the native RTC engine 316. The API code redirection module 306 redirects intercepted APIs of the real-time media application 310 intended for the native RTC engine 316 based on redirection code 314 injected into the real-time media application 310 so that the portion of the real-time media application 310 is redirected. The client RTC API engine 308 in the client computing device 304 communicates with the API code redirection module 306 through a virtual channel 318 to execute the redirected portion of the real-time media application 310.

The application framework 312 may be a web browser or a desktop application framework. The redirected APIs correspond to real-time media processing and/or peer-to-peer networking with another client computing device 305.

Various API interception techniques will now be discussed. WebRTC APIs are defined as Java Script APIs available to HTML 5/Java Script applications within a web browser or within an application development platform such as Electron. Electron combines an HTML 5/Java Script application engine with additional desktop-specific platform functionality. Interception of WebRTC APIs by a desktop virtualization platform requires additional novel techniques.

The following API interception techniques will be discussed below: hooking; use of a custom browser; JavaScript injection via proxy; JavaScript injection via a browser helper object (BHO) or browser extension, JavaScript injection via micro-VPN plugin; and use of an electron app decomposition.

For hooking, the API code redirection module 306 may include a hooking module configured to intercept the APIs of the real-time media application 310 based on hooking, and inject the redirection code 314 into the real-time media application 310 based on the intercepted APIs.

JavaScript rendered DLL APIs are hooked and custom JS is inserted. For IE, the JavaScript engine DLL is jscript.dll and is a (in process) COM object server. Hence, the idea would be to employ standard COM shimming techniques to operate as a "man in the middle" (MITM) in order to insert custom JavaScript. In the IE JavaScript engine, all JavaScript objects implement the IDispatchEx interface. Alternatively, one could hook OS socket APIs, e.g. WinSock APIs, parse HTTP traffic and HTML content and then insert JS.

For a custom browser, a custom Chromium-based browser engine may be used and a custom Secure Browser published, e.g., as part of the Citrix Secure Browser Cloud Service. Hooks or plugins are used within the Chromium engine to inject custom JS. Alternatively, a custom browser engine may implement some or all of the WebRTC redirection functionality in native code, limiting or removing the need to inject custom JavaScript code. The virtual desktop server 302 includes a browser that includes hooks or plug-ins configured to intercept the APIs of the real-time media application 310, and inject the redirection code 314 into the real-time media application 310 based on the intercepted APIs.

For JavaScript injection via proxy, a proxy is used to intercept HTML content. The proxy would add additional JS via content rewriting. The proxy could be a separate appliance on the network, or reside on the virtual desktop server 302. The proxy could be configured explicitly (using browser settings) or operate as a transparent proxy.

In one approach, the computing system 300 further includes a proxy server configured to intercept HTML content from a web server to be retrieved by the real-time media application 310, and re-write the intercepted HTML content so that execution of the re-written HTML content causes the APIs of the real-time media application 310 to be intercepted. The redirection code 314 is then injected into the real-time media application 310 based on the intercepted APIs.

In another approach, the proxy server may be configured to intercept HTML content from a web server to be retrieved by the real-time media application 310, and inject code into pages of the intercepted HTML content. Execution of the pages with the injected code causes the APIs of the real-time media application 310 to be intercepted. The redirection code 314 is then injected into the real-time media application 310 based on the intercepted APIs.

For JavaScript injection via Browser Helper Object (BHO) or browser extension, JavaScript code to implement WebRTC API redirection could be injected into a browser-based application using the BHO or the Browser Extension for web browsers that implement BHO or browser extension mechanisms. The virtual desktop server 302 thus includes a browser including a BHO or a Browser Extension to intercept the APIs of the real-time media application 310, and inject the redirection 314 code into the real-time media application 310 based on the intercepted APIs.

For JavaScript injection via micro-VPN plugin, a universal windows platform (UWP) App is used to implement a virtual private network (VPN) app plugin. The UWP VPN plugin app will handle the declaration of the VPN client plug-in capability in the AppX manifest and provide reference to the VPN plug-in app handler. Running the plugin within a sandbox (app container) allows for greater security and reduced complexity of the implementation.

The VPN app plugin is able to control VPN connections in conjunction with the OS VPN platform. In addition, the VPN app plugin could be configured as a micro-VPN, i.e., it can be applied on a per-application basis. For example, the configuration could be achieved via mobile device management (MDM) or mobile application management (MAM) policies.

Alternatively, a custom profile may be created using PowerShell scripts. The configuration could specify apps whose traffic is to be managed by the micro-VPN plugin. In particular, the micro-VPN plugin could be configured for browser applications and Electron based apps. The micro-VPN plugin could be enabled to intercept network traffic for all or specific apps, decrypt TLS using local certificate store, parse HTTP traffic and HTML content and then insert custom JavaScript.

In one approach, the computing system further includes a micro-virtual private network (VPN) plug-in configured to intercept HTML content from a web server to be retrieved by the real-time media application 310, and re-write the intercepted HTML content so that execution of the re-written HTML content causes the APIs of the real-time media application 310 to be intercepted. Then the redirection code 314 is to be injected into the real-time media application 310 based on the intercepted APIs.

In another approach, the micro-virtual private network (VPN) plug-in may be configured to intercept HTML content from a web server to be retrieved by the real-time media application 310, and inject code into pages of the intercepted HTML content. Execution of the pages with the injected code causes the APIs of the real-time media application 310 to be intercepted. The redirection code 314 is then injected into the real-time media application 310 based on the intercepted APIs.

For electron app decomposition, the electron app is first run through a tool that modifies the electron app. The modification is based on decomposing binaries of the electron application to access the APIs of the real-time media application 310, add hooks to inject the redirection code into the real-time media application 310 based on the intercepted APIs, repackage the electron application binaries, and re-sign the electron application. The modified electron application is then configured to intercept the APIs of the real-time media application 310 based on hooking, and inject the redirection code 314 into the real-time media application 310 based on the intercepted APIs. Stated another way, the electron app is detected during virtual app publishing.

Electron app binaries are then decomposed. App content is usually located within an .asar archive located within a subfolder corresponding to the electron application. It is possible to unpack this archive using asar.exe (available as a node.js package) to access the JavaScript code for the application. Then hooks are added where the hooks comprise DLLs or other modules to be loaded at runtime to inject custom JS. The import address table of the main executable is modified to load the hooks when a process runs. The application binaries are repackaged, and the electron application package is then re-signed.

Another aspect of delivering optimized real-time communications (RTC) using a standard WebRTC API is directed to a method for operating a computing system 300 comprising a virtual desktop server 302 and a client computing device 304 comprising a client RTC API engine 308. The virtual desktop server 302 includes an application framework 312 and an API code redirection module 306. The application framework 312 includes a real-time media application 310 and a native RTC engine 316.

The method includes providing real-time communications based on operation of the real-time media application 310, with a portion of the real-time media application 310 to be executed by the native RTC engine 316 when received by the native RTC engine 316. The method further includes redirecting by the API code redirection module 306 intercepted APIs of the real-time media application 310 intended for the native RTC engine 316 based on redirection code 314 injected into the real-time media application 310 so that the portion of the real-time media application 310 is redirected. The client RTC API engine 308 communicates with the API code redirection module 306 through a virtual channel 318 to execute the redirected portion of the real-time media application 310.

Yet another aspect is directed to a non-transitory computer readable medium for operating a virtual desktop server 302 within a computing system 300 as described above. The non-transitory computer readable medium has a plurality of computer executable instructions for causing the virtual desktop server 302 to provide real-time communications (RTC) based on operation of the real-time media application 310, with a portion of the real-time media application 310 to be executed by the native RTC engine 316 when received by the native RTC engine 316. The instructions further cause the virtual desktop server 302 to redirect by the API code redirection module 306 intercepted APIs of the real-time media application 310 intended for the native RTC engine 316 based on redirection code 314 injected into the real-time media application 310 so that the client RTC API engine 308 communicates with the API code redirection module 306 through a virtual channel 318 to execute the redirected portion of the real-time media application 310.

Still referring to FIG. 3, the illustrated computing system 300 will now be discussed in terms of WebRTC redirection with fallback. General fallback techniques will now be discussed where in some cases the necessary functionality will be missing so a graceful fallback functionality to use less optimized mechanisms is needed for handling real-time media when full optimization is not available.

The virtual desktop server 302 and the at least one client computing device 304 are as discussed above. The application framework 312 includes the real-time media application 310 to provide real-time communications (RTC), and the native RTC engine 316 executes a portion of the real-time media application 310 when received by the native RTC engine 316. The virtual desktop server 302 further includes an API code redirection module 306 to redirect original APIs of the real-time media application 310 intended for the native RTC engine 316 based on redirection code 314 injected into the real-time media application 310 so that the portion of the real-time media application 310 is to be redirected.

In particular, the client computing device 304 includes the client RTC API engine 308 reporting to the API code redirection module 306 through a virtual channel 318 on capabilities of the client computing device 304 to execute the redirected portion of the real-time media application 310. The API code redirection module 306 switches to a fallback mode if the client computing device 304 has limited capabilities. In the fallback mode at least part of the original APIs are used so that the native RTC engine 316 executes at least part of the portion of the real-time media application 310.

Real-time media functionality enabled by WebRTC redirection described here will result in optimized user experience and system scalability when all system components include the necessary functionality. In particular, when virtual desktop clients and servers include compatible software and hardware modules that have the necessary capabilities cooperate to deliver the functionality as designed.

If the client computing device 304 has full capabilities fallback is not needed. In this case, the API code redirection module 306 does not switch to the fallback mode so that the client RTC API engine 308 executes all of the redirected portion of the real-time media application 310.

However, in real world deployments, it is inevitable that in some cases the necessary functionality will be missing. A WebRTC remoting solution must provide graceful fallback functionality to use other, less optimized mechanisms for handling real-time media when full optimization is not available. Ideally, this fallback functionality (as well as the optimization itself) should be transparent to the application, i.e., handled by the application framework 312 without requiring application changes, and provide a friendly user experience.

To provide fallback functionality, a virtual application solution needs to include some or all of session state tracking and capability detection and negotiation. In session state tracking, application process lifetime may overlap with one or more user connections to a virtual access session, and the process of enabling optimized functionality or providing a fallback may happen multiple times as session state changes.

In capability detection and negotiation, client-server protocols used for providing optimized functionality need to support detection or negotiation of the virtual desktop server 302 and client computing device 304 capabilities, which enables the corresponding code to switch between optimized and fallback modes of operation.

When fallback is needed, then the following techniques are specific to providing fallback functionality for WebRTC redirection. These techniques include 1) fallback to the built-in native RTC engine 316; 2) per-modality fallback; 3) partial fallback; and 4) mapping of session connect/disconnect events to device availability events.

In fallback to the built-in native RTC engine 316, the client computing device 304 has no capabilities to execute the redirected portion of the real-time media application 310. In the fallback mode all of the original APIs are used so that the native RTC engine 316 executes all of the portion of the real-time media application 310 instead of the client RTC API engine 308.

When remote execution of WebRTC is not possible (e.g., when no client RTC API engine 308 is present), injected code can dynamically dispatch application API calls to the built-in native RTC engine 316 that is included as part of the application framework 312. Injected code 314 can use itself as a shim to monitor these calls and resulting built-in WebRTC objects are used to enable an eventual switch to remote (optimized) functionality as well as ongoing monitoring of application WebRTC usage and quality.

In the per-modality fallback, depending on client computing device 304 capabilities and policies, the application framework 312 may implement per-modality fallback functionality when a remaining part of the portion of the real-time media application 310 that is not executed by the native RTC engine 316 is redirected to the client RTC API engine 308 for execution.

For example, when a client computing device 304 can only handle the audio portion of a real-time media session, the application framework 312 may implement optimized functionality for audio and fallback functionality for video. To do this, injected code 314 can remote API calls for audio streams to the client computing device 304 and redirect API calls for video streams to the local built-in RTC engine 316, merging the results together. The at least part of the portion of the real-time media application 310 executed by the native RTC engine 316 corresponds to video, and the remaining part of the portion of the real-time media application 310 executed by the client RTC API engine 308 corresponds to audio.

Alternatively, the at least part of the portion of the real-time media application 310 executed by the native RTC engine 316 corresponds to audio, and the remaining part of the portion of the real-time media application 310 executed by the client RTC API engine 308 corresponds to video.

In the partial fallback, depending on the virtual desktop server 302 capabilities and policies, injected and server-side code can implement partial fallback. Partial fallback does not involve redirection to the client computing device 304. Instead, the capabilities of the virtual desktop server 302 are reduced.

In an optimized mode the WebRTC redirection framework may support audio, video, and data communications. In the partial fallback mode the framework may only provide audio and video if the server-side CPU utilization on a multi-user server does not exceed a certain value. If the certain value is exceeded, then video support is automatically turned off under high CPU load to avoid quality problems. Similar fallback restrictions can be implemented by monitoring media quality for fallback sessions, and disabling some functionality if quality stays or falls below a defined threshold.

In other words, if the client computing device 304 has limited capabilities and the API code redirection module 306 determines that the virtual desktop sever 302 also has limited capabilities, then the API code redirection module 306 does not switch to the fallback mode for at least a part of the portion of the real-time media application 310, and the at least part of the portion of the real-time media application 310 is neither executed by the client RTC API engine 308 nor the native RTC engine 316.

For example, the at least part of the portion of the real-time media application 310 that is neither executed by the client RTC API engine 308 nor the native RTC engine 316 may correspond to video, while the remaining part of the portion of the real-time media application 310 is executed by either the client RTC API engine 308 or the native RTC engine 316 in fallback mode and may correspond to at least one of audio and data communications.

As another example, the API code redirection module 306 may determine that the virtual desktop sever 302 also has limited capabilities based on at least one of client computing device 304 policies, virtual desktop sever 302 policies, virtual desktop sever 302 CPU load, and media quality.

In this case, if the client computing device 304 has limited capabilities and the API code redirection module 306 determines that the virtual desktop sever 302 also has limited capabilities, then the API code redirection module 306 does not switch to the fallback mode for at least a part of the portion of the real-time media application 310. The at least part of the portion of the real-time media application 310 is neither executed by the client RTC API engine 308 nor the native RTC engine 316.

The at least part of the portion of the real-time media application 310 that is neither executed by the client RTC API engine 308 nor the native RTC engine 316 corresponds to video, and the remaining part of the portion of the real-time media application 310 is executed by either the client RTC API engine 308 or the native RTC engine 316 in fallback mode and corresponds to at least one of audio and data communications.

The API code redirection module 306 determines that the virtual desktop sever 302 also has limited capabilities based on at least one of client computing device policies, virtual desktop sever policies, virtual desktop sever CPU load, and media quality.

In the mapping of session connect/disconnect events to device availability events, WebRTC includes a subset of APIs (NavigatorUserMedia, getUserMedia) enabling applications to enumerate local media devices, request access to a local media device (such as a microphone or a camera), and use it for a real-time media session. Under WebRTC redirection, the corresponding APIs will respectively enumerate, obtain access to, and request usage of, devices physically attached to the client computer.

To handle fallback scenarios, upon session disconnection, injected code will update internal data structures and generate events indicating to the application that all devices have been physically disconnected. Upon session reconnection and after successful capability negotiation, this code will indicate to the real-time media application 310 that new devices are now available.

Upon fallback, injected code will defer to the built-in WebRTC engine 316 to enumerate local devices, which may in turn invoke other virtual channel functionality to enumerate client devices and perform non-optimized redirection. For example, this may be via generic audio redirection or graphics-remoting virtual channels. With this approach, the application designed properly to handle local media device availability will not require any special logic to process session connect/disconnect and fallback events.

In one aspect, the virtual desktop server 302 enumerates devices physically connected to the client computing device 304 when the client computing device 304 is connected to the virtual desktop server 302. When the client computing device 304 is disconnected from the virtual desktop server 302, then the injected code 314 generates events indicating to the real-time media application 310 that all devices have been physically disconnected.

Upon reconnection of the client computing device 304 to the virtual desktop server 302, the injected code 314 indicates to the real-time media application 310 that new devices are now available. Upon fallback, the injected code 314 defers to the native RTC engine 316 to enumerate the devices physically connected to the client computing device 304.

Another aspect of providing fallback functionality to use less optimized mechanisms for handling real-time media when full optimization is not available is directed to a method for operating a computing system 300 comprising a virtual desktop server 302 and a client computing device 304 that includes a client RTC API engine 308. The virtual desktop server 302 includes an application framework 312 and an API code redirection module 306. The application framework 312 includes a real-time media application 310 and a native RTC engine 316.

The method includes providing real-time communications (RTC) based on operation of the real-time media application 310, with a portion of the real-time media application to be executed by the native RTC engine when received by the native RTC engine, and redirecting by the API code redirection module 306 original APIs of the real-time media application 310 intended for the native RTC engine 316 based on redirection code 314 injected into the real-time media application 310 so that the portion of the real-time media application 310 is to be redirected.

The method further includes reporting by the client RTC API engine 308 to the API code redirection module 306 through a virtual channel 318 on capabilities of the client computing device 304 to execute the redirected portion of the real-time media application 310. The API code redirection module 306 is operated to switch to a fallback mode if the client computing device 304 has limited capabilities, where in the fallback mode at least part of the original APIs are used so that the native RTC engine 316 executes at least part of the portion of the real-time media application 310.

Yet another aspect is directed to a non-transitory computer readable medium for operating a virtual desktop server 302 within a computing system 300 as described above. The non-transitory computer readable medium has a plurality of computer executable instructions for causing the virtual desktop server 302 to provide real-time communications (RTC) based on operation of the real-time media application 310, with a portion of the real-time media application 310 to be executed by the native RTC engine 316 when received by the native RTC engine 316. The instructions further cause the virtual desktop server 302 to redirect by the API code redirection module 306 intercepted APIs of the real-time media application 310 intended for the native RTC engine 316 based on redirection code 314 so that the portion of the real-time media application 310 is to be redirected. The API code redirection module 306 receives from the client RTC API engine 308 through a virtual channel 318 capabilities of the client computing device to execute the redirected portion of the real-time media application 310. The API code redirection module 306 is operated to switch to a fallback mode if the client computing device 304 has limited capabilities, where in the fallback mode at least part of the original APIs are used so that the native RTC engine 316 executes at least part of the portion of the real-time media application 310.

Still referring to FIG. 3, the illustrated computing system 300 will be now discussed in terms of WebRTC redirection with window monitoring/overlay detection. As will be discussed in detail below, geometry tracking is used to seamlessly provide redirection of WebRTC functionality. Applications using WebRTC typically render received video streams by connecting a MediaStream object to an HTML5 video element. Visibility and geometry of this element is usually managed by the application directly or using CSS style information.

Applications often create and position other UI elements (e.g., labels or control buttons) so that they visually overlap with the video, and may use transparency to blend rendered video with application UI content. The UI elements may be referred to as non-accelerated graphics, and the video may be referred to as accelerated graphics. An application, such as the real-time media application 310, may have more than one active video element rendering real-time video at the same time (e.g., one or more remote video feeds from video conference participants and a self-view from a local camera 330).

To achieve seamless redirection of WebRTC functionality, the application virtualization framework on the virtual desktop server 302 needs to identify and keep track of visibility and geometry of several video elements, as well as any other elements that overlay live video. When this information is available, WebRTC redirection code on the client computing device 304 will use it to create, position and clip local video rendering windows, and possibly render opaque or transparent overlays on top of these windows to represent corresponding application UI elements.

Geometry tracking for HTML5 video elements may be via color or pattern detection. Positioning and rendering of video and other UI elements in WebRTC applications is handled by the HTML rendering engine embedded in the browser or application framework, and is typically not readily available through an API or other means of introspection outside of the HTML renderer.

One possible way to overcome this limitation and identify multiple HTML5 video areas and track their geometry includes the following steps. One step is to use injected code 314 to assign each video element a unique ID at the point when the real-time media application 310 makes an API call to connect a redirected Media Stream with a particular video element. Also, the injected code 314 causes each video area to be painted with a color or a pattern derived from the video element ID. For example, this may include encoding bits of the element ID in bits of video area color for uniform painting, or in colors of adjacent pixels for pattern painting.

Another possibility is to paint the video area using a 1-D or 2-D bar code encoding the video element ID. In the graphics capture and remoting code (part of the application virtualization code), video overlay areas are detected by color, pattern, or bar code using any of the available techniques for pixel color or area pattern matching or bar code scanning.

Detected areas may be non-rectangular or may be partially clipped. To achieve correct geometry tracking, it will be necessary to combine the information retrieved from injected code (video element ID and size in pixels) with results of colored or patterned area detection to determine the size and clipping geometry of each individual video element. To improve performance, results of video area detection can be cached and only partially recalculated for subsequent frames.

The illustrated computing system 300 includes at least one video source 330 to provide at least one video stream, the virtual desktop server 302 and the at least one client computing device 304 as discussed above. The virtual desktop server 302 includes the application framework 312 that includes the real-time media application 310 to provide real-time communications (RTC), and the native RTC engine 316 to execute a portion of the real-time media application 310 when received by the native RTC engine 316.

The API code redirection module 306 redirects intercepted APIs of the real-time media application 310 intended for the native RTC engine 316 based on redirection code 314 injected into the real-time media application 310 so that the portion of the real-time media application 310 is redirected. In particular, the injected redirection code 314 defines at least one placeholder to indicate positioning geometry of the at least one video stream within an RTC window. A geometry tracking module 332 detects the at least one placeholder within the injected redirection code 314, and provides the positioning geometry associated therewith.

The client computing device 304 includes a display 334 to display the RTC window. The client RTC API engine 308 communicates with the API code redirection module 306 through the virtual channel 318 to execute the redirected portion of the real-time media application 310. This virtual channel 318 provides accelerated graphics.

In particular, the client computing device 304 further includes a display composition module 336 to receive the at least one video stream and the positioning geometry of the at least one placeholder, and to overlay the at least one video stream over the at least one placeholder within the displayed RTC window based on the positioning geometry.

The positioning data from the geometry tracking module 332 may be provided to the display composition module 336 over two different paths. In a first path, the geometry tracking module 332 provides the positioning geometry to the API code redirection module 306 so as to be included in the redirected portion of the real-time media application 310 to the client RTC API engine 308. The client RTC API engine 308 then provides the positioning data to the display composition module 336. In a second path, the geometry tracking module 332 provides the positioning geometry directly to the display composition module 336 over a different virtual channel 319. This virtual channel 319 is for non-accelerated graphics.

The RTC window as provided by the display 334 is a composited display that includes non-accelerated graphics and accelerated graphics. Non-accelerated graphics include UI elements, labels and control buttons, for example. Accelerated graphics in the illustrated embodiment is defined by the video stream provided by the local webcam feed 330. The display composition module 336 may receive additional video streams, such as from another end point device, such as client computing device 305.

The injected redirection code 314 generates the non-accelerated graphics but does not generate the accelerated graphics. This means that the geometry tracking module 332 analyzes the non-accelerated graphics for the at least one placeholder. The virtual desktop server 302 also includes a non-accelerated graphics producer 340 that provides non-accelerated graphics over the virtual channel 319 to a non-accelerated graphics module 342 in the client computing device 304.

Referring now to FIGS. 4-7, an example window monitoring/overlay detection scenario will be discussed. In this scenario, there are two video stream sources. One video stream source is from the local webcam feed 330 on the first client computing device 304, and the other video stream source is from a second client computing device 305 in peer-to-peer communications with the first client computing device 304.

When the APIs are intercepted, the two video stream sources are enumerated by the virtual desktop server 302. When a call is started, the client computing device 304 reports to the real-time media application 310 that there is a first video stream from the local webcam feed 330. Similarly, the second client computing device 305 reports to the real-time media application 310 via the real-time media application server 320 that it has a camera providing the second video stream.

The real-time media application 310 gets notification that the two video streams have arrived, as reflected by events detected within the intercepted APIs. Since the real-time media application 310 does not receive the actual video streams, it creates a placeholder for each event. Each placeholder is drawn where the corresponding video stream is to be placed when displayed on the client computing device 304.

Referring now to FIGS. 4-7, various displays illustrating an example window monitoring/overlay detection scenario with the architecture illustrated in FIG. 3 will be discussed. As shown in window 400, the injected redirection code 314 in the virtual desktop server 302 renders a green rectangle 402 on where the peer video from the second client computing device 305 is to be placed and a red rectangle 404 on where the picture-in-picture preview video from the local webcam feed 330 is to be placed.

The injected redirection code 314 draws with different colors, with each color assigned to a respective video stream. An ID may also be associated with each color to identify the respective video streams. The controls 406 overlaid on the window 400 are rendered normally.

Since the window 400 is part of a WebRTC application framework, the real-time media application 310 needs to know where the video streams are to be rendered. The geometry tracking module 332 advantageously detects the different placeholders within the injected redirection code 314, and provides the positioning geometry associated with each placeholder to the display composition module 336. The positioning geometry provides x-y coordinates on where the video streams are to be placed, along with resolution.

The geometry tracking module 332 detects the different placeholders based on color, such as green and red, for example. In other embodiments, the different placeholders may be detected with patterns or bar codes. In addition, the different colors, patterns and bar codes may each have an ID associated therewith that corresponds to a respective video stream. In addition, the placeholder colors may change after being detected by the geometry tracking module to a more neutral color that blends in with the windows that are presented on the client computing device 304.

The window 400 is sent to the client computing device 304. The display composition module 336 within the client computing device 304 renders the video stream 412 from the second client computing device 305 based on the specified position geometry associated therewith, as shown in window 410 in FIG. 5. The rendered video stream 412 includes a cutout 414 for the controls 406 and a cutout 416 for the video stream from the local webcam feed 330.

Figure 6:
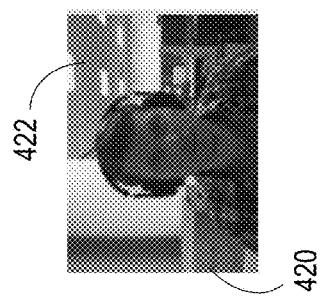
Figure 5:
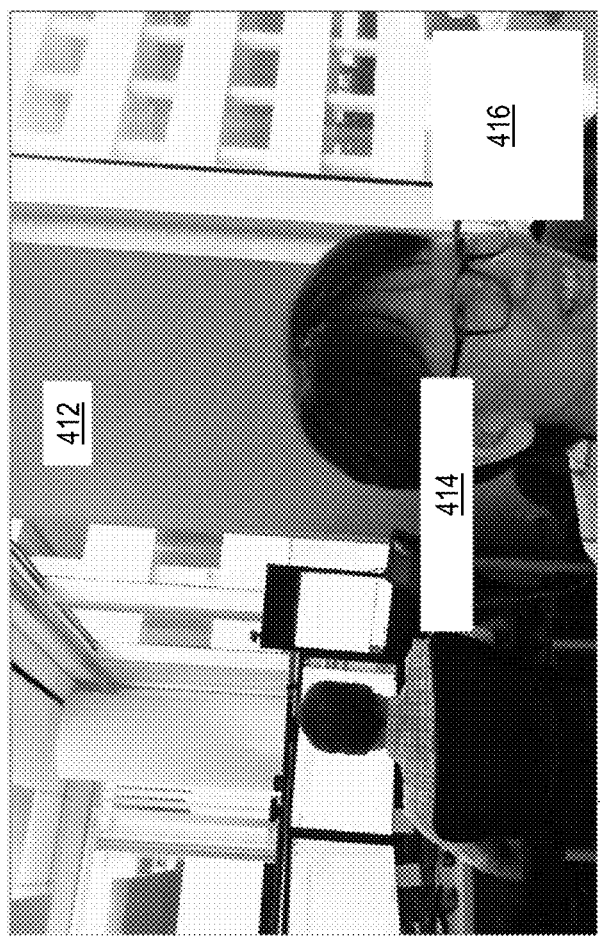
Figure 7:

The display composition module 336 within the client computing device 304 also renders the video stream 422 from the local webcam feed 330 based on the specified position geometry associated therewith, as shown in window 420 in FIG. 6. The rendered video stream 422 does not need any cutouts as with rendered video stream 412.

After compositing by the display composition module 336, the video streams appear in the correct location with the correct shape. The window 410 in FIG. 7 includes the video stream 412 from the second client computing device 305 positioned over the green placeholder 402, the video stream 422 from the local webcam feed 330 positioned over the red placeholder 404, and the controls 406 as provided by the virtual desktop server 302.

The virtual desktop along with the hosted real-time media application's non-accelerated content 406 (controls), and other hosted application windows, are drawn on the display 334 of the client computing device 304 using graphics sent by the virtual desktop server 302. The screen areas behind the accelerated content, such as the green rectangle 402 and the red rectangles 404 in this example, are also rendered on the display 334 of the client computing device 304 but they are not visible to the user because they are overlaid by the accelerated locally rendered content of the peer video 412 from the second client computing device 305 and the picture-in-picture preview video 422 from the local webcam feed 330, respectively.

Figure 8:
FIGS. 8-9 are updates to the window illustrated in FIG. 7 based on movement of the server-side window.

Referring now to windows 410 and 420 in FIG. 8, the underlying server-side window 400 has been moved to a different position. The injected redirection code 314 in the virtual desktop server 302 renders the placeholders in a new location. In particular, the green rectangle 402 is rendered where the peer video from the second client computing device 305 is to be placed, and the red rectangle 404 is rendered where the picture-in-picture preview video from the local webcam feed 330 is to be placed. The non-accelerated graphics, for example controls 406, are rendered normally in a new location by the non-accelerated graphics producer 340.

As a result of the video, the geometry and the non-accelerated graphics being updated asynchronously, whichever is received first is updated before the other. As a result, the video overlays 412, 422 may seem disconnected from the underling placeholders. This may be viewed as a temporary artifact.

Figure 9:
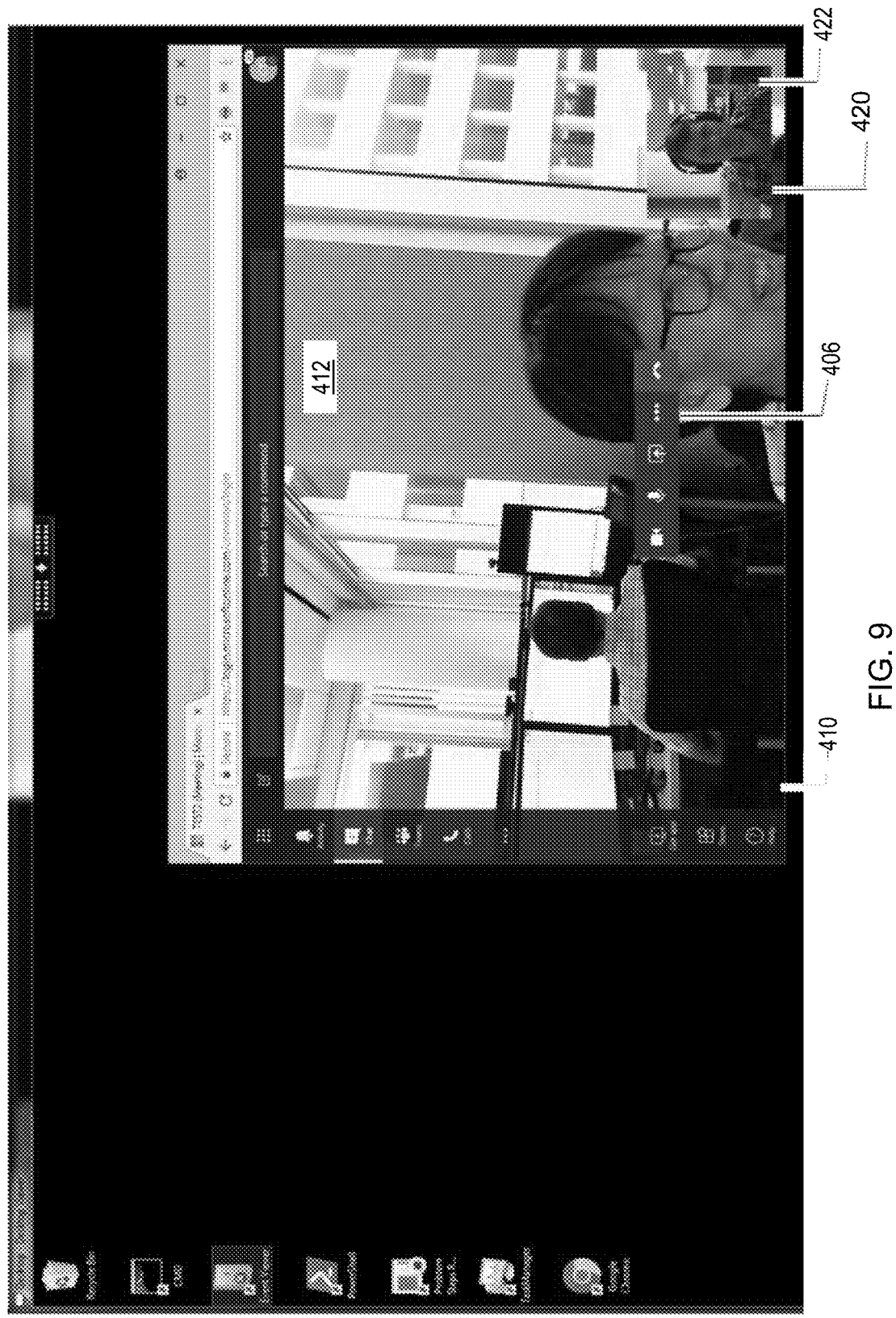

In this example, positioning and the non-accelerated graphics of the server-side window 400 are updated first. The client computing device 304 then receives the updated positioning geometry of the placeholders from the virtual desktop server 302, and then renders the respective video streams 412, 422 with the updated positioning geometry. After compositing, the windows 410 and 420 are in the new location as illustrated in FIG. 9.

Figure 10:
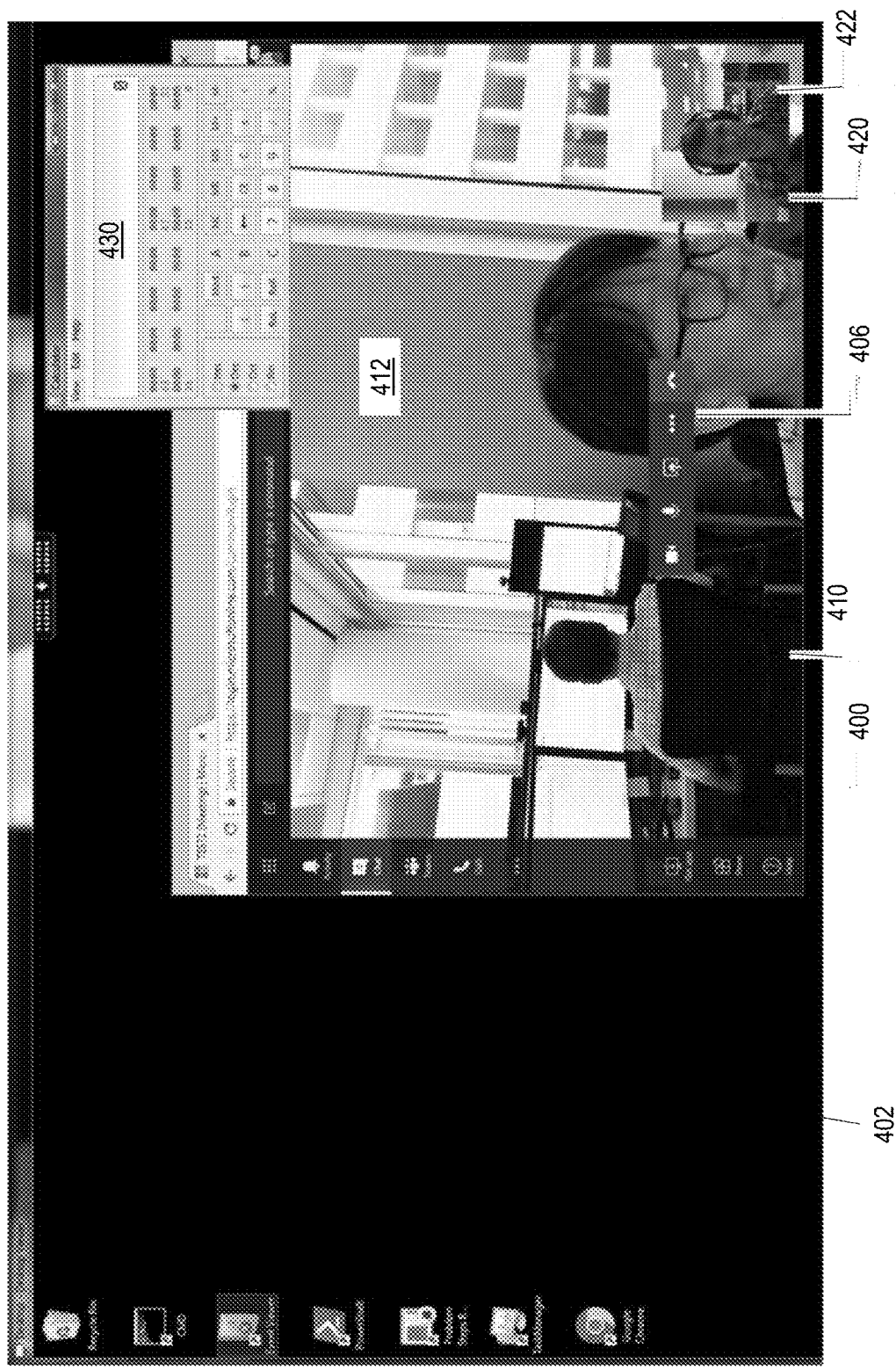
FIGS. 10-11 are updates to the window illustrated in FIG. 9 based on a rendered server-side application clipping a video stream.

Referring now to window 410 in FIG. 10, an overlapping application 430 is rendered by the virtual desktop server 302 over window 400 which in turn clips video stream 412 on the client computing device 304. Though the position of the video stream 412 will not change, the shape of the video stream 412 will. Consequently, the geometry tracking module 332 in the virtual desktop server 302 provides positioning geometry updates to the display composition module 336 in the client computing device 304.

Since the video streams 412 and 422, the geometry and the non-accelerated graphics 406 are updated asynchronously, the geometry may be altered to accommodate the overlay window 430 early or late. In this example, the video streams 412 and 422, and the non-accelerated graphics 406 are updated first, and the bottom part of the application is not visible until the geometry update is processed by the client computing device 304.

Figure 11:
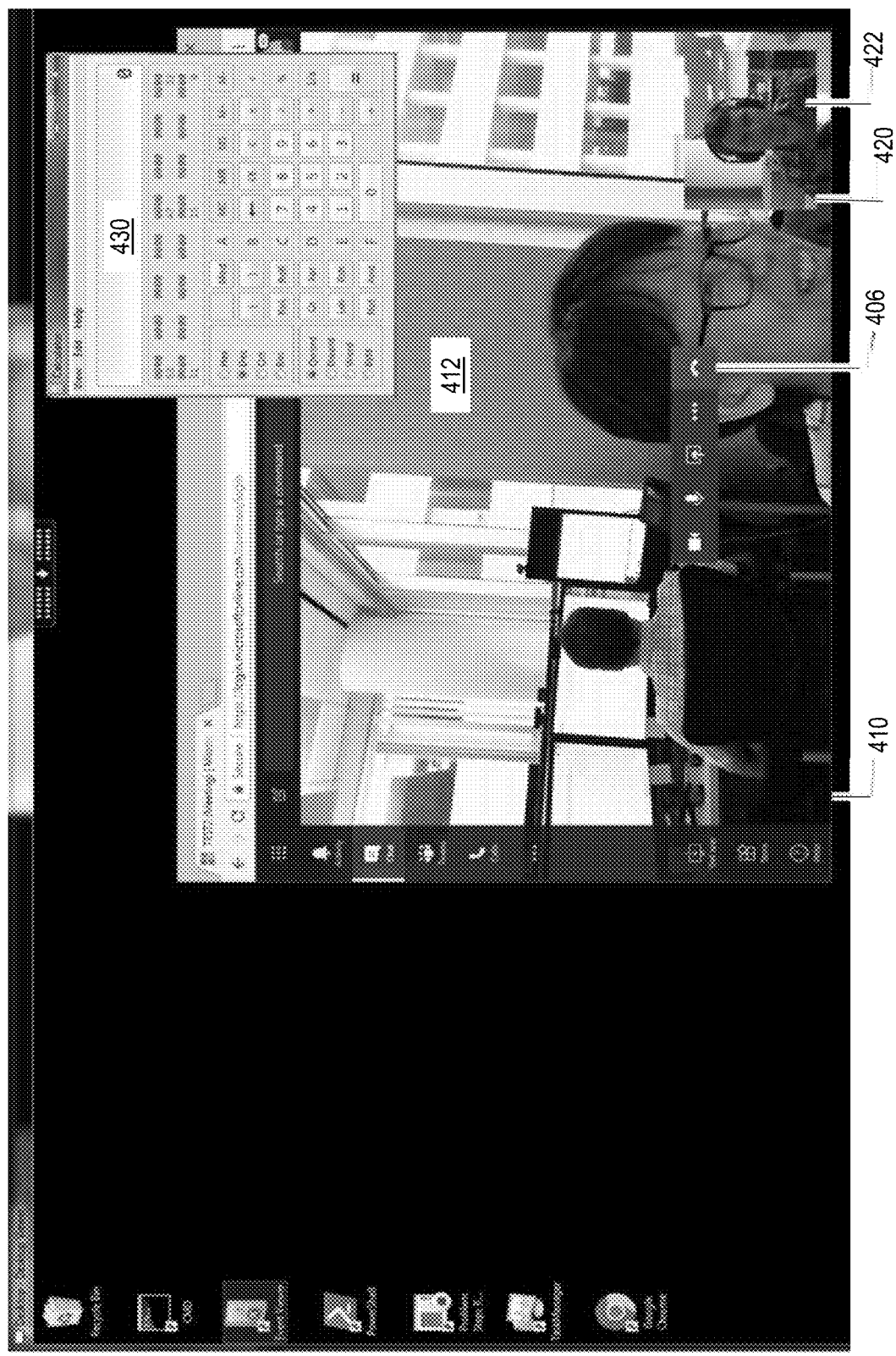

The client computing device 304 receives the updated positioning geometry of the placeholders from the virtual desktop server 302, and then renders the respective video streams 412, 422 with the updated positioning geometry while window 430 appears unobstructed. After compositing, the video stream 412 appears in the same location but with the correct shape, revealing the non-accelerated graphics of the overlay window 430, as illustrated in FIG. 11.

Another aspect of WebRTC redirection with window monitoring/overlay detection is directed to a method for operating a computing system 300 comprising at least one video source 330, a virtual desktop server 302 and a client computing device 304 comprising a client RTC API engine 308, a display 334 and a display composition module 336. The virtual desktop server 302 comprises a geometry tracking module 332, an application framework 312 and an API code redirection module 306. The application framework 312 includes a real-time media application 310 and a native RTC engine 316.

The method includes providing at least one video stream 412 from the at least one video source 330, and providing real-time communications (RTC) based on operation of the real-time media application 310, with a portion of the real-time media application 310 to be executed by the native RTC engine 316 when received by the native RTC engine 316.

The method further includes redirecting by the API code redirection module 306 intercepted APIs of the real-time media application 310 intended for the native RTC engine based on redirection code 314 injected into the real-time media application 310 so that the portion of the real-time media application 310 is redirected. The injected redirection code 314 defines at least one placeholder 402 to indicate positioning geometry of the at least one video stream 412 within an RTC window 410.

The geometry tracking module 332 is operated to detect the at least one placeholder 402 within the injected redirection code 314, and to provide the positioning geometry associated therewith. The RTC window is displayed on the display 334. The client RTC API engine 308 is operated to communicate with the API code redirection module 306 through a virtual channel 318 to execute the redirected portion of the real-time media application 310.

The display composition module 336 is operated to receive the at least one video stream 412 and the positioning geometry of the at least one placeholder 402, and to overlay the at least one video stream 412 over the at least one placeholder 402 within the displayed RTC window 410 based on the positioning geometry.

Yet another aspect is directed to a non-transitory computer readable medium for operating a virtual desktop server 302 within a computing system 300 as described above. The non-transitory computer readable medium has a plurality of computer executable instructions for causing the virtual desktop server 302 to provide real-time communications (RTC) based on operation of the real-time media application 310, with a portion of the real-time media application 310 to be executed by the native RTC engine 316 when received by the native RTC engine 316.

The steps further include redirecting by the API code redirection module 306 intercepted APIs of the real-time media application 310 intended for the native RTC engine 316 based on redirection code 314 injected into the real-time media application 310 so that the client RTC API engine 308 communicates with the API code redirection module 306 through a virtual channel 318 and executes the redirected portion of the real-time media application 310. The injected redirection code 314 defines at least one placeholder 402 to indicate positioning geometry of the at least one video stream 412 within an RTC window 410.

The geometry tracking module 332 is operated to detect the at least one placeholder 402 within the injected redirection code 314, and to provide the positioning geometry associated therewith so that the client computing device 304 operates the client RTC API engine 308 to communicate with the API code redirection module 306 through a virtual channel 318 to execute the redirected portion of the real-time media application 310. The display composition module 336 is operated to receive the at least one video stream 412 and the positioning geometry of the at least one placeholder 402, and to overlay the at least one video stream 412 over the at least one placeholder 402 within the displayed RTC window 410 based on the positioning geometry.

Geometry tracking includes detection and repainting of semi-transparent overlays. The technique described above can work for applications that use arbitrary opaque UI overlays on top of video elements. To address semi-transparent overlays, the same approach can be extended as follows.

Painting of video areas by injected code can be designed in a way that would allow robust pattern detection even after color transformation due to semi-transparent overlays. For example, element ID can be encoded using pixels with highly distinct colors, while detection code could be designed to accept much smaller or shifted differences in pixel colors (due to color blending). Predefined image patterns and information redundancy techniques such as various checksums used in bar codes can be used to improve detectability of video areas.

Further, painting of video areas can be designed to vary over time, using two or more different colors for each pixel.

Detection code can be extended to derive information about semi-transparent overlay from captured screen pixels. To do this, detection code would compare expected pixel colors with actual captured pixels. For the simplest implementation with two alternating colors, and assuming a linear blending model at two instances in time:

(pixel color at time 1)=(1−alpha)*(underlay color at time 1)+alpha*(overlay color)    1)

(pixel color at time 2)=(1−alpha)*(underlay color at time 2)+alpha*(overlay color)    2)

Both alpha and overlay color can be recovered with acceptable loss of precision:

alpha=1−(pixel color at time 2−pixel color at time 1)/(underlay color at time 2−underlay color at time 1)

overlay color=(pixel color−(1−alpha)*underlay color)/alpha

FIG. 13 is an illustrative table diagram 500 for the method of detecting semi-transparent overlays described above. The input column 510 specifies different combinations of overlay colors described in terms of red (R), green (G) and blue (B) pixel color values and opacity, or alpha value. The blended column 520 specifies two different colors, a black blend 522 and a white blend 524 in this example, that can be used by the injected code at two different times, e.g., time 1 and time 2, as discussed above.

The captured/recovered column 530 specifies the respective computed, values for the alpha and pixel colors, which are recovered by the graphics capture and remoting code. For example, when alpha value is zero (0), the overlay is completely invisible. In this particular case the overlay colors cannot be detected due to divide-by-zero error, as illustrated by zeroes in the detected color pixels. However, this is not even necessary because with opacity of zero (0), the overlay is not visible anyway. In another example, and at the other extreme case of alpha value of one (1), the overlay completely obscures the blending colors.

Figure 14:
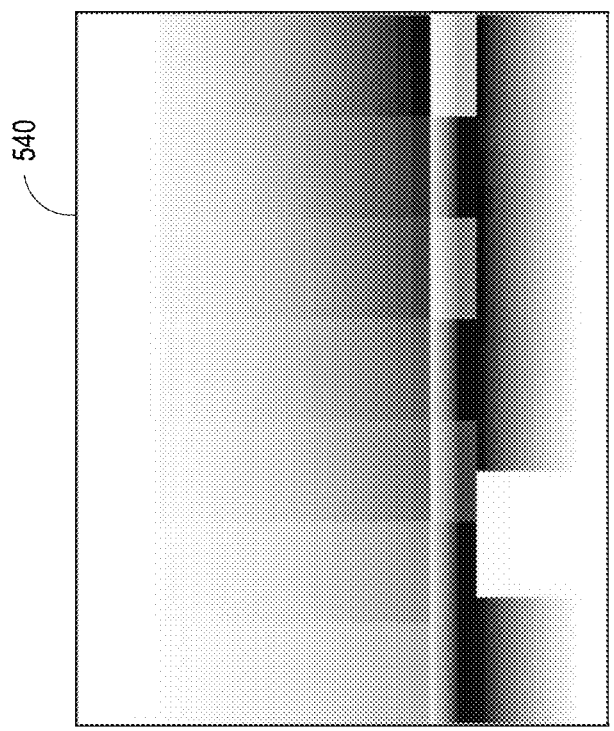
FIGS. 14-17 are sample images illustrating a test run of a method of detecting semi-transparent overlays that can be used with the architecture illustrated in FIG. 3.

FIG. 14 is a sample color bars image 540 used in a test run of the method of detecting semi-transparent overlays described above.

Figure 15:
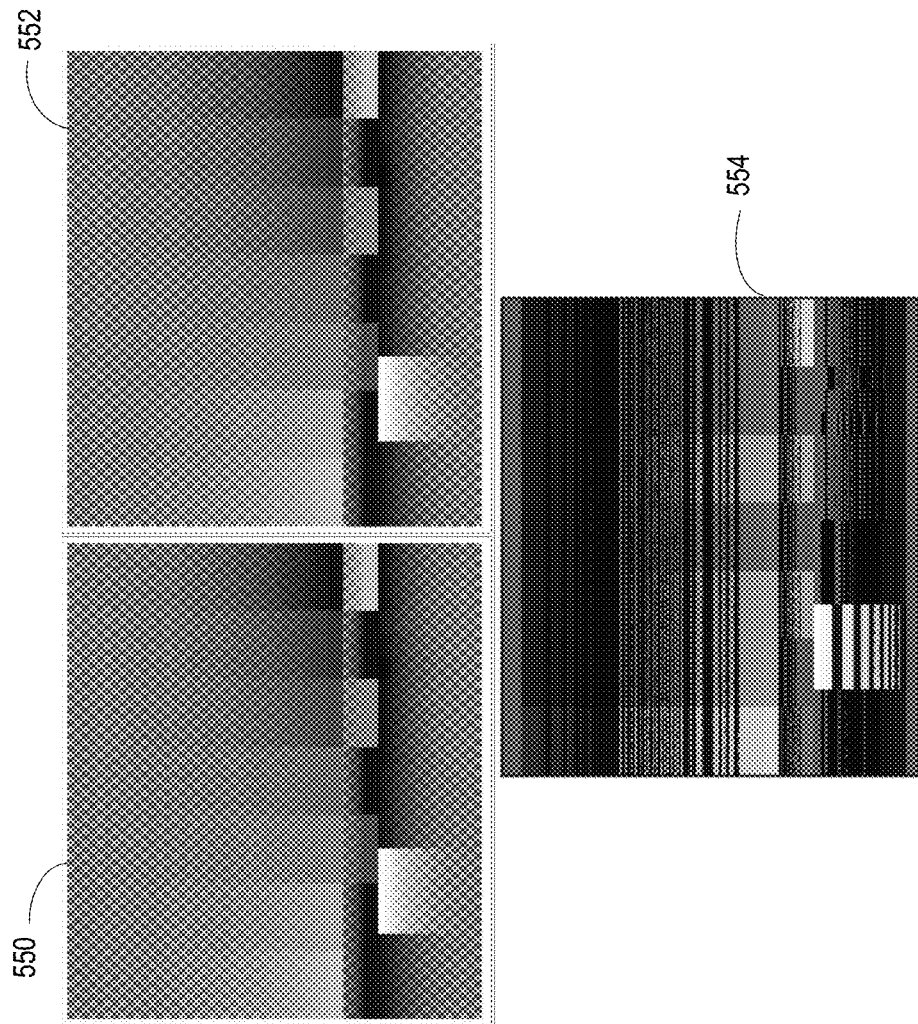

FIG. 15 is an illustrative image comparison diagram for a test run of the method of detecting semi-transparent overlays described above. In particular, FIG. 15 provides a visual illustration of a test run of the method described above on the sample image of FIG. 14 containing color bars with different colors and opacities.

The image on the top left 550 is the original (before) image, while the image on the top right 552 is the computed or detected (after) image. There is no perceptible difference between the two images. However, at extreme values of opacity, for example, when the alpha value is close to zero (0) or close to one (1), due to pixel color value rounding inaccuracies, the before and after images may start to differ slightly. This is illustrated in the bottom image 554, which renders a grayscale version of the detected color bar image. For strictly illustrative purposes the following is provided.

Pixels that have the same color values in both of the original (before) image and the detected (after) image are rendered in a grayscale representation of that shared color value.

Pixels that have differing color values in the original (before) image and the detected (after) image, where the difference is below a preset threshold, are rendered in a blue-scale representation of the detected color value.

Pixels that have differing color values in the original (before) image and the detected (after) image, where the difference is above a preset threshold, are rendered in a red-scale representation of the detected color value.

In this example, the threshold has been defined as 5 unit's difference out of 255 unit's total, or approximately 2 percent difference.

Figure 16:
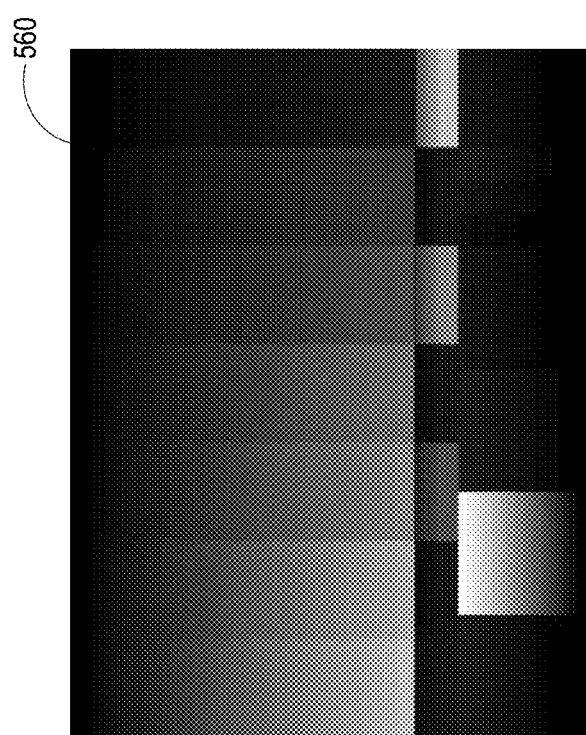

FIG. 16 is an illustrative image 560 of a step in the method of detecting semi-transparent overlays described above. In particular, FIG. 16 illustrates the image 560 observed by the detection code at time one (1) after applying a black blend in combination with the color bars image of FIG. 14.

Figure 17:
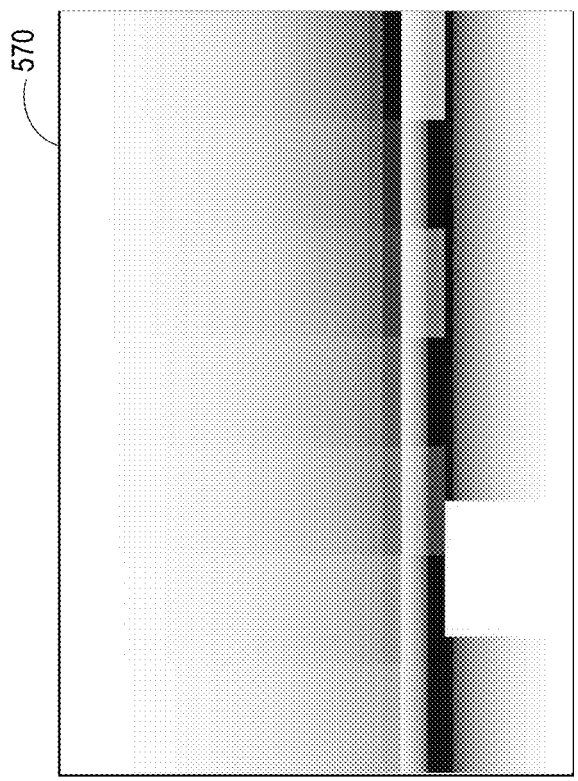

FIG. 17 is another illustrative image 570 of another step in the method of detecting semi-transparent overlays described above. In particular, FIG. 17 illustrates the image 570 observed by the detection code at time two (2) after applying a white blend in combination with the color bars image of FIG. 14. More alternating colors may be used to improve accuracy and address corner cases.

As will be discussed in further detail below in reference to FIG. 18, accuracy of this process can be improved by providing a feedback channel from the detection code to the injected code. Using this feedback channel, detection code would be able to request video area painting using specific, or adaptive, colors or patterns, to improve robustness and accuracy of detection process.

Spatial filtering techniques can be used to improve this process as well. For example, it is likely that the same alpha value will be used for large adjacent areas of semi-transparent overlays. Taking this into account, a filter can be used to average recovered per-pixel alpha values and accept the more accurate filtered value for further calculations.

Information about semi-transparent overlays, including alpha and pixel color values, can be transmitted from the server 302' to the client 304' and rendered on top of client-local video, resulting in an accurate reproduction of application UI.

In the instrumentation of the server-side HTML rendering engine, the two techniques above make it possible to detect video area geometry without instrumenting the HTML rendering engine. Direct instrumentation of the rendering engine provides another way of achieving the same purpose. For this technique, the HTML rendering engine in the browser or application framework 312' can be hooked or partially replaced so that information about video element positioning and overlays can be retrieved directly.

As yet another approach, a customized Chromium-based browser engine can be used to instrument the HTML rendering. For example, as part of the Citrix Secure Browser Cloud Service.

As discussed above, the architecture 300 illustrated in FIG. 3 supports detection and repainting of semi-transparent overlays 406 as directed to webRTC API redirection. In other embodiments, the architecture 300 may be modified to support any accelerated graphics media that includes a semi-transparent overlay 406. Such an architecture 300' is provided in FIG. 18.

In the illustrated architecture 300', the application framework 312' now includes a media application 311' instead of the real-time media application 310, an accelerated content redirection module 315' instead of the injected redirection code module 314 and the native RTC engine 316, and a host-side virtual channel redirection module 307' instead of the RTC API code redirection module 306. On the client computing device 304' the RTC API engine 308 is replaced with a client-side virtual channel redirection module 309' that communicates with the host-side virtual channel redirection module 307'.

The accelerated content redirection module 315' redirects the portion of the media streaming based on at least one of the following: DirectShow filter, DirectX Media Object (DMO) filter, Media Foundation filter, HTML5 video redirection module, Flash video redirection module, Browser Helper Object (BHO), and browser extension. DirectShow filter, DirectX Media Object (DMO) filter, and Media Foundation filter are used by Citrix RAVE (Remoting Audio and Video Extensions) technology. HTML5 video redirection module is used by Citrix HTML5 video redirection technology. Flash video redirection module is used by Citrix Flash video redirection technology.

For the media application 311' to play a file, various factors are taken into account, such as source of the file, file format, and media format inside the file. Based on these factors, one or more filters may be registered. The filters include source filters, transform filters, and rendering filters that allow the decompression and rendering of the file to be redirected to the client computing device 304'.

The host-side filters proxy the still compressed video and audio data from the virtual desktop server 302' to the client computing device 304'. At the client computing device 304', one or more client-side native filters are loaded to decompress the video and audio data, render the video and play the audio. Control information which includes window positioning information and additional stream control information is also provided by the one or more host-side filters.

Figure 18:
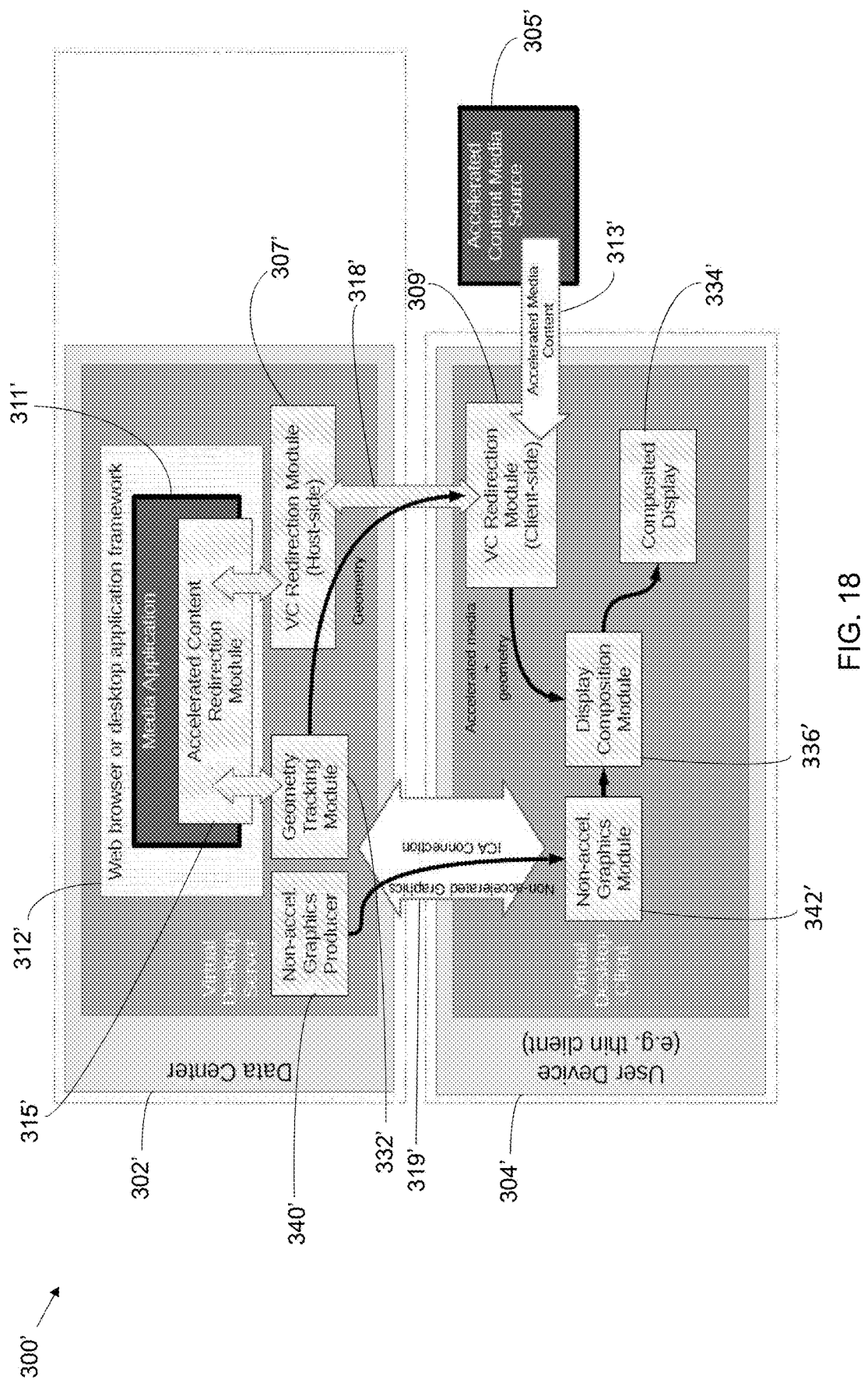
FIG. 18 is a block diagram of the architecture illustrated in FIG. 3 modified to support any accelerated graphics media that includes a semi-transparent overlay.

Still referring to FIG. 18 and architecture 300', the accelerated content redirection module 315' generates the non-accelerated graphics but does not generate the accelerated graphics. This means that the geometry tracking module 332' analyzes the non-accelerated graphics for the at least one placeholder. The virtual desktop server 302' also includes a non-accelerated graphics producer 340' that provides non-accelerated graphics over the virtual channel 319' to a non-accelerated graphics module 342' in the client computing device 304'.

The architecture 300' includes at least one video source 305' to provide at least one video stream 313'. The video source 305' may be referred to as an accelerated content media source. The virtual desktop server 302' includes the application framework 312' that includes the media application 311 to provide media streaming. The media stream includes the at least one video stream 313' with at least one overlay 406 to be positioned on the at least one video stream 313'. The accelerated content redirection module 315' is to redirect a portion of the media streaming by providing a placeholder 402 to indicate positioning geometry of the at least one video stream 313' within a media window 334'. The placeholder 402 is to include the overlay 406.

Providing the placeholder 402 includes providing a first color 522 for an underlay of the placeholder 402 at a first time, and providing a second color 524 for the underlay of the placeholder 402 at a second time.

The geometry tracking module 332' is to detect the placeholder 402 and determine positioning geometry associated therewith, and determine a color and an alpha blending factor of the overlay 406 based on calculations involving the first color 522 for the underlay of the placeholder 402 at the first time, and the second color 524 for the underlay of the placeholder 402 at the second time. The calculations are as described above using equations one (1) and two (2).

The determined color and the alpha blending factor of the overlay 406 are illustratively provided in the captured/recovered column 530 in FIG. 13. Comp. A is the alpha blending factor. Each of the red (R), green (G) and blue (B) pixel color values are represented by Comp. R, Comp. G, and Comp. B.

The client computing device 304' includes a display to display the media window 334'. The virtual channel redirection module 309' on the client side communicates with the accelerated content redirection module 315' through a virtual channel 318' to execute the redirected portion of the media application.

The display composition module 336' is to receive the video stream 313', the positioning geometry of the placeholder 402, and the color and the alpha blending factor for each pixel of the overlay 406 so as to overlay the video stream 313' over the placeholder 402 within the displayed window 334' based on the positioning geometry, and to overlay the overlay 406 in the color and alpha blending factor associated therewith.

As discussed above in one example, the API code redirection module 306 in the virtual desktop server 302 rendered a green rectangle 402 (as a placeholder) on where the peer video from the second client computing device 305 is to be placed. Similarly, in the context of the architecture 300' illustrated in FIG. 18, the host-side redirection module 307' in the virtual desktop server 302' may render a green rectangle 402 (as a placeholder) on where the peer video from the second client computing device 305' is to be placed. Since the overlay 406 positioned over the green rectangle 402 had an opacity of zero (0), there was no need to determine an alpha blending factor and a color of the overlay.

For a semi-transparent overlay 406 two (2) or more blended colors will be generated instead of a single color. Each pixel color value in the placeholder 402 (which includes the overlay color) is determined by the geometry tracking module 332'.

For the architecture 300' illustrated in FIG. 18, the accelerated content redirection module 315' generates the placeholder 402 with an underlay color 522 at time one (1), and then generates the placeholder 402 with an underlay color 524 at time two (2). The accelerated content redirection module 315' tells the geometry tracking module 332' the underlay colors used at time one (1) and two (2). The geometry tracking module 332' uses Equations (1) and (2) as discussed above to calculate the alpha blending factor and the color for each pixel of the overlay 406. Since there are two equations and two unknowns, the two unknowns (i.e., alpha blending factor and overlay color) may be determined.

In some cases, the black and white underlay colors may be too close to the colors of the overlay 406. To improve color contrast between the underlay colors and the overlay color, the geometry tracking module 332' provides feedback to the accelerated content redirection module 315' to vary the first and second underlay colors. For example, yellow and green may be used to provide a better color contrast instead of black and white.

The displayed media window 334' includes a composited display of non-accelerated graphics and accelerated graphics, with the accelerated graphics defined by the video stream 313'. The redirected portion of the media streaming only generates the non-accelerated graphics, and the geometry tracking module 332' analyzes the non-accelerated graphics for the placeholder 402 and the overlay 406.

The video source may be a camera 330 coupled to the client computing device 304 as illustrated in FIG. 3. Alternatively or in addition to, the video source may be a camera coupled to a different client computing device 305' in peer-to-peer communications with the client computing device 304'.

The video source is an accelerated content media source. The accelerated content media source is at least one of the following: video streaming website, video Content Delivery Network (CDN), video file share, DVD.

The video source may include a shared display surface coupled to a different client computing device 305' in peer-to-peer communications with the client computing device 304'. This covers screen sharing where a shared display surface may be overlaid with a semi-transparent overlay 406.

Another aspect of detection and repainting of semi-transparent overlays 406 is directed to a method for operating a computing system 300 comprising at least one video source 305', and a virtual desktop server 302', with the virtual desktop server 302' comprising a geometry tracking module 332', an application framework 312' and an accelerated content redirection module 315'. The application framework 312' includes a media application 311'. The method includes providing at least one video stream 313' from the at least one video source 305', and providing media streaming based on operation of the media application, with the media streaming including the at least one video stream 313' and at least one overlay 406 on the at least one video stream 313'.

A portion of the media streaming is redirected by providing a placeholder 402 to indicate positioning geometry of the at least one video stream 313' within a media window 334', with the placeholder 402 to include the at least one overlay 406.

Providing the placeholder 402 includes providing a first color 522 for an underlay of the placeholder 402 at a first time, and providing a second color 524 for the underlay of the placeholder 402 at a second time.

The method further includes operating the geometry tracking module 332' to detect the placeholder 402 and determine positioning geometry associated therewith, and determine a color and an alpha blending factor of the at least one overlay 406 based on calculations involving the first color 522 for the underlay of the placeholder 402 at the first time, and the second color 524 for the underlay of the placeholder 402 at the second time.

Yet another aspect is directed to a non-transitory computer readable medium for operating a virtual desktop server 302' within a computing system 300' comprising at least one video source 305', with the virtual desktop server 302' comprising a geometry tracking module 332', an application framework 312' and an accelerated content redirection module 315'. The application framework 312' includes a media application 311'.

The non-transitory computer readable medium has a plurality of computer executable instructions for causing the virtual desktop server 302' to provide media streaming based on operation of the media application 311', with the media streaming including the at least one video stream 313' and at least one overlay 406 on the at least one video stream 313'.

A portion of the media streaming is redirected by providing a placeholder 402 to indicate positioning geometry of the at least one video stream 313' within a media window 334', with the placeholder 402 to include the at least one overlay 406.

Providing the placeholder 402 includes providing a first color 522 for an underlay of the placeholder 402 at a first time, and providing a second color 524 for the underlay of the placeholder 402 at a second time.

The geometry tracking module 332' is operated to detect the placeholder 402 and determine positioning geometry associated therewith, and determine a color and an alpha blending factor of the at least one overlay 406 based on calculations involving the first color 522 for the underlay of the placeholder 402 at the first time, and the second color 524 for the underlay of the placeholder 402 at the second time.

Figure 12:
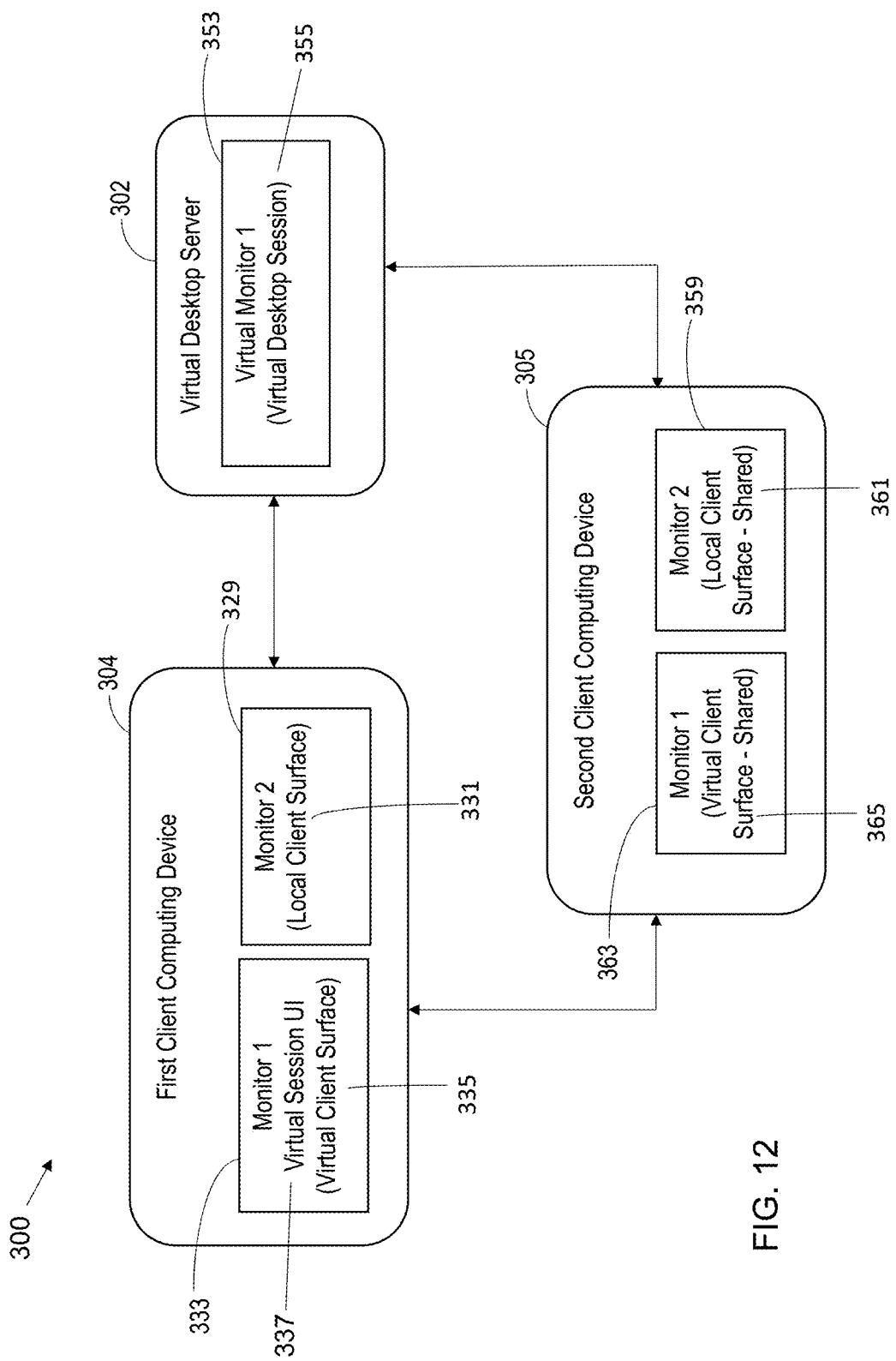
FIG. 12 is a simplified block diagram of the architecture illustrated in FIG. 3 illustrating screen sharing with WebRTC API redirection.

Referring now to FIGS. 3 and 12, the illustrated computing system 300 will be discussed in terms screen sharing functionality to achieve seamless redirection of WebRTC functionality. WebRTC includes APIs (getDisplayMedia) and other related API elements, defined in [screen-capture], that allow applications to share the visual contents of the local browser window, a single window of a different application, all windows of a specific application, a single monitor, or a collection of monitors including the whole desktop.

Screen sharing under desktop virtualization presents a particular challenge due to a complexity of how the complete user-visible desktop is composed from parts running on one or more virtual desktop servers as well as on the local desktop. Application or framework code running on any particular physical or virtual computer may be able to enumerate all sources of shareable screen content that the user may be interested in, or may not have access to pixels of a particular window or monitor. WebRTC redirection framework can be designed to deal with this complexity while providing optimized user experience for screen sharing.

Citrix patent application ID1167US, filed on Jan. 26, 2018 as U.S. patent application Ser. No. 15/880,938, "Virtual Computing System Providing Local Screen Sharing from Hosted Collaboration Applications and Related Methods" is incorporated by reference herein in its entirety. The methods discussed in ID1167US fully apply to WebRTC redirection. The present disclosure offers additional incremental enhancements discussed below: 1) distributed enumeration of sharable content sources, and 2) optimizations of content sharing media and network pipeline.

In the distributed enumeration of shareable content sources, elements of WebRTC redirection framework (connector, engine, and possibly virtual desktop server and client code) can be designed to enumerate possible sources of content sharing (applications and their windows, monitors and desktops) in parallel on virtual desktop servers 302 and client computing devices 304, 305. Information internal to the desktop virtualization system may be used to create correct descriptions of these sources (e.g., correctly associate windows with corresponding applications). Inter-component protocols may be used to consolidate this information into a single list, and present the resulting list to the user when the application calls getDisplayMedia( ).

In the optimizations of content sharing media and network pipelines, when a particular screen sharing source is selected by the user, WebRTC redirection code can select the optimal location for capturing the content of that source. For example, if the user chooses a virtual application window, contents of that window should be captured on the virtual desktop server 302 because the window may be obscured on the client computing device 304. Alternatively, if the whole client desktop is selected for sharing, pixels of the desktop should be captured on the client computing device 304, since the graphics have already been delivered to the client computing device anyway and to avoid additional load on the virtual desktop server 302.

A further optimization may combine the screen rendering pipeline in the virtual desktop client application with the WebRTC redirection capture pipeline for screen content sharing.

In addition to choosing the optimal location for capturing shareable screen content, WebRTC redirection code can select the optimal location and method for compressing this content using a suitable video codec, and a network endpoint for transmitting this content to a remote destination. For example, screen content captured on the virtual desktop server 302 may be suitably compressed on the virtual desktop server 302, streamed from there to the client computing device 304, and transmitted to the network from the client computing device 304.

Alternatively, the same screen content may be only mildly compressed on the virtual desktop server 302, and achieve final compression on the client computing device 304. Alternatively, the same screen content may be compressed and transmitted from the virtual desktop server 302, not involving the client computing device 304 at all. These choices present different server and network scalability and network connectivity tradeoffs, and may be chosen based on policies or other criteria.

As illustrated in FIG. 12, the computing system 300 advantageously provides for sharing of both local and virtual client surfaces 331, 335 on the first client computing device 304 with the second client computing device 305. The injected redirection code 314 is used to enumerate shared surfaces from the client computing device 304 (local client surface 331) and from the virtual desktop server 302 (virtual desktop session 355) and combine them together into a single list. The virtual desktop server 302 includes a monitor 353 to generate the virtual desktop session 355.

One or more elements of the virtual desktop session 355 are rendered at the first client computing device 304 as a virtual client surface 335 on a first monitor 333 illustratively including a virtual session user interface (UI) 337. However, the first client computing device 304 also generates its own local client graphics surface 331, here on a second monitor 329. The local graphics surface 331 may include applications (web browser, document processing applications, etc.) installed locally at the client computing device 304.

It should be noted that both the local and virtual client surfaces 331, 335 may be displayed on a same monitor in different embodiments, i.e., they need not be on multiple monitors in all embodiments. As noted above, with the real-time media application 310 there is currently no way for the user of the first client computing device 304 to share the local graphics surface 331.

Yet, once the real-time media application 310 is launched, the virtual desktop server 302 uses the injected redirection code 314 to enumerate shared surfaces from the client computing device 304 (local client surface 331) and from the virtual desktop server 302 (virtual client surface 335) and combine them together into a single list that is presented to the user of the first client computing device 304.

This is accomplished without the need for virtual web cams and virtual plug-and-play (PnP) monitors at the virtual desktop server 302 as is needed in the above referenced Citrix patent application ID1167US. In the Citrix patent application ID1167US, the client surfaces are being enumerated in the virtual desktop server environment. Here, the illustrated computing system 300 is doing the reverse. The computing system 300 enumerates the client surfaces (local and/or virtual) and projects them to the first client computing device 304 so they can be more efficiently sent peer-to-peer to the second client computing device 305.

The second client computing device 305 generates a virtual client shared surface 365 on a first monitor 363. The second client computing device 305 also generates its own local client graphics shared surface 361, here on a second monitor 359.

A single list of enumerated surfaces is provided by the real-time media application 310. The user of the first client computing device 304 may click on a button or prompt to share surfaces (e.g., windows, monitors or desktops) and this triggers enumeration of those surfaces. Since the getDisplayMedia API element is intercepted, the enumerated local and virtual client surfaces 331, 335 can be combined.

More particularly, the illustrated computing system 300 includes the first client computing device 304 to display a local client surface 331 and a virtual client surface 335, with the local client surface 331 and the virtual client surface 335 to be shared with a second client computing device 305 having peer-to-peer communications with the first client computing device 304.

The virtual desktop server 302 communicates with the first client computing device 304 through a virtual channel 318 to provide the virtual client surface 335, and includes an application framework 312 that includes a real-time media application 310 to provide real-time communications (RTC), and a native RTC engine 316 to execute a portion of the real-time media application 310 when received by the native RTC engine 316.

An API code redirection module 306 within the virtual desktop server 302 redirects intercepted APIs of the real-time media application 310 intended for the native RTC engine 316 based on redirection code 314 injected into the real-time media application 310 so that the portion of the real-time media application 310 is redirected, with the injected redirection code 314 enumerating the local and virtual client surfaces 331, 335.

The first client computing device 304 includes a client RTC API engine 308 communicating with the API code redirection module 306 through the virtual channel 318 to execute the redirected portion of the real-time media application 310, and to share the local and virtual client surfaces 331, 335 with the second client computing device 305 based on the intercepted APIs enumerating the local and virtual client surfaces 331, 335.

As noted above, there may be an optimal location for capturing source content. For example, the virtual client surface 335 may include overlapping windows. If one of the overlapping windows is selected to be shared with the second client computing device 305, then pixels of the selected window are obtained from the virtual desktop server 302. As another example, a whole virtual desktop session 355 of the virtual desktop server 302 is to be shared. In this case pixels of the virtual desktop session 355 are captured on the first client computing device 304 to be delivered to the second client computing device 305.

As also noted above, a screen rendering pipeline and an RTC redirection capture pipeline may be combined. For example, the virtual desktop session 355 may include at least one window that is to be shared with the second client computing device 305. Then pixels of the shared window are to be provided by the virtual desktop server 302 to the second client computing device 305.

In terms of compression, the optimal location for compressing shareable screen content can be selected. For example, the virtual desktop server 302 may compress the pixels of the at least one window. If the window is to be shared with the second client computing device 305, then the compressed pixels of the shared window are sent to the first client computing device 304 for sharing with the second client computing device 305.

Another aspect of WebRTC redirection with screen sharing is directed to a method for operating a computing system 300 comprising a virtual desktop server 302 and a first client computing device 304 comprising a client RTC API engine 308, as discussed above. The method includes operating the first client computing device 304 to display a local client surface 331 and a virtual client surface 335, with the local client surface 331 and the virtual client surface 335 to be shared with a second client computing device 305 having peer-to-peer communications with the first client computing device 304.

The virtual desktop server 302 is operated to communicate with the first client computing device 304 through a virtual channel 318 to provide the virtual client surface 335. Real-time communications (RTC) is provided based on operation of the real-time media application 310, with a portion of the real-time media application 310 to be executed by the native RTC engine 316 when received by the native RTC engine 316.

The API code redirection module 306 redirects intercepted APIs of the real-time media application 310 intended for the native RTC engine 316 based on redirection code 314 injected into the real-time media application 310 so that the portion of the real-time media application 310 is redirected, with the injected redirection code 314 enumerating the local and virtual client surfaces 331, 335.

The client RTC API engine 308 is operated to communicate with the API code redirection module 306 through the virtual channel 318 to execute the redirected portion of the real-time media application 310. The client RTC API engine 308 is further operated to share the local and virtual client surfaces 331, 335 with the second client computing device 305 based on the intercepted APIs enumerating the local and virtual client surfaces 331, 335.

Yet another aspect is directed to a non-transitory computer readable medium for operating a virtual desktop server 302 within a computing system 300 as described above. The non-transitory computer readable medium has a plurality of computer executable instructions for causing the virtual desktop server 302 to communicate with the first client computing device 304 through a virtual channel 318 to provide the virtual client surface 335, and provide real-time communications (RTC) based on operation of the real-time media application 310. A portion of the real-time media application 310 is to be executed by the native RTC engine 316 when received by the native RTC engine 316.

The API code redirection module 306 intercepts APIs of the real-time media application 310 intended for the native RTC engine 316 based on redirection code 314 injected into the real-time media application 310 so that the client RTC API engine 308 communicates with the API code redirection module 306 through a virtual channel 318 to execute the redirected portion of the real-time media application 310. The injected redirection code 314 enumerates the local and virtual client surfaces 331, 335 so that the first client computing device 304 shares the local and virtual client surfaces 331, 335 with the second client computing device 305 based on the intercepted APIs enumerating the local and virtual client surfaces 331, 335.

In thin client resource management, WebRTC may be active in more than one browser tab, such as for video rendering, for example. A browser may decide to suspend video playback in an inactive tab. Presumably, this will be reflected onto the MediaStream object connected to the HTML5 video element in the inactive tab of the hosted app. The real-time media application 310 may be active in a plurality of browser tabs, and the client computing device 304 suspends video playback in an inactive browser tab and/or stops rendering in a non-visible area.

In addition, independent of the actions of the inactive browser tab of the hosted app, a receiver may decide to automatically stop the WebRTC rendering in a non-visible area. This may be done conditionally, e.g., on a thin client device, which may be resource challenged, or in conditions of limited bandwidth, which may improve UX in other active tabs and WebRTC channels.

Security policies will now be discussed. Real-time media support in browser applications involves a very large number of security and privacy considerations. An incomplete list of examples of such considerations includes the possibility of breaching users' privacy by gaining unauthorized access to microphones and video cameras in users' workspaces or homes; security leaks due to unauthorized content sharing; and the possibility of undesired fingerprinting of users or their endpoints through enumeration of connected devices. For example, the virtual desktop server 302 includes at least one security policy, and execution by the client RTC API engine 308 of at least part of the redirected portion of the real-time media application is based on the at least one security policy. WebRTC redirection needs to address these concerns, and may also implement a number of additional policy and monitoring features in the area of security and privacy, including the following.

Enabling administrators to define "automatic allow", "automatic deny", or "ask user" policies for WebRTC redirection in general and for specific subsets of WebRTC functionality (e.g., access to microphones, cameras, speakers, or screen content, as well as all the same features in the fallback scenario).

Allowing user identity, membership in a security group, or other user attributes, to be used as input to a WebRTC related policy.

Allowing application identity to be used as input to a WebRTC related policy. For example, the application virtualization framework may automatically detect a particular SaaS application, and apply policies specific to that application.

Allowing endpoint location (physical or network) to be used as input to a WebRTC related policy. For example, for endpoints in a secure location the framework may automatically disallow video and content sharing, allowing only audio sessions.

Network connectivity steering, Interactive Connectivity Establishment (ICE) extensions and Session Description Protocol (SDP) rewriting will now be discussed. A large portion of WebRTC functionality lies in enabling peer-to-peer network connectivity for real-time media. The following identifies the technologies used for this.

WebRTC implements the ICE procedure to identify all possible connectivity options between two real-time media endpoints. As part of the ICE procedure, WebRTC collects all connectivity candidates—local network endpoints (transport/IP address/port tuples) available for communications.

WebRTC can work with one or more connectivity servers. The connectivity servers may alternatively be referred to as media relay servers, Session Traversal Utilities for NAT (STUN) servers, Traversal Using Relay NAT (TURN) servers, or ICE servers. The connectivity servers facilitate connectivity by allowing endpoints to probe the network for existence of a Network Address Translation (NAT) device using the STUN protocol, and to create media relay points on the servers and use these ports as alternative connectivity candidates (using the TURN protocol).

WebRTC uses the SDP protocol to encode and exchange network connectivity details. SDP messages contain full descriptions of media sessions, including information about connectivity candidates.

Lack of network connectivity or impaired network connectivity are very typical concerns for desktop virtualization deployments. To address these, the WebRTC redirection framework can use the following novel techniques: 1) tunneled server-side transport fallback, and 2) changing the set of ICE servers.

In changing the set of ICE servers, a WebRTC application typically receives the set of ICE servers from an application specific source—e.g., the server-side portion of the application. The WebRTC redirection framework can extend, change, or replace the application-defined set of ICE servers with a framework specific set of one or more servers, to implement various types of traffic steering functionality.

For example, a multipurpose gateway or branch appliance integrated with the desktop virtualization framework may serve as an additional ICE (media relay) server. The WebRTC redirection framework may make this server automatically available for media traffic managed by a virtualized WebRTC application. Alternatively, the WebRTC framework may replace the set of ICE servers that the application intends to use with a different set. This may be determined using network connectivity probing, dynamic DNS, or other similar techniques, to improve media quality by optimal media stream routing.

Figure 19:
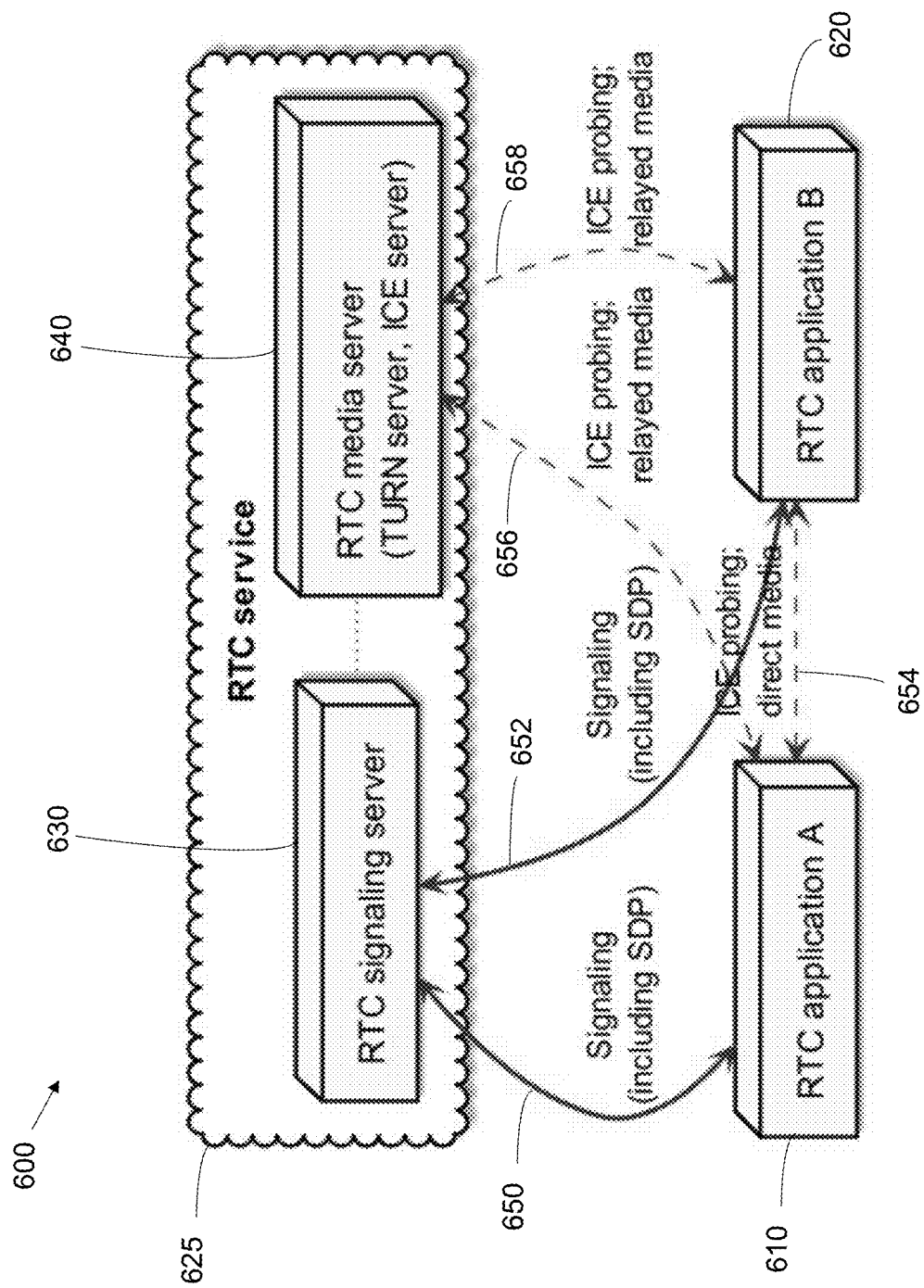
FIG. 19 is a simplified block diagram illustrating network connectivity steering of a WebRTC architecture without WebRTC API redirection and virtualization.

For an introduction on network connectivity steering in a WebRTC architecture 600 without WebRTC API redirection and virtualization, reference is now directed to FIG. 19. Without virtualization means that client computing device A 610 and client computing device B 620 are physical clients, i.e., executing WebRTC locally. The WebRTC architecture 600 is provided as background to illustrate network connectivity in general for a real-time communication system and the different relationships and protocols that occur between the client computing devices and servers.

The illustrated WebRTC architecture 600 is presented at a very high level to avoid complexity. Real-time communications are to be enabled between client computing device A 610 and client computing device B 620. Client computing device B 620 is a remote peer that behaves in an interoperable manner with client computing device A 610.

A WebRTC service framework 625 importantly consists of two distinct servers implemented as part of a WebRTC service. One is the WebRTC signaling server 630. The role of the WebRTC signaling server 630 is to enable client computing device A 610 and client computing device B 620 to log into the WebRTC service 625.

The WebRTC signaling server 630 has the authentication and authorization function, and it serves as a rendezvous point for client computing device A 610 and client computing device B 620 to be able to communicate with each other. Client computing device A 610 communicates to the WebRTC signaling server 630 over channel 650, and client computing device B 620 communicates to the WebRTC signaling server 630 over channel 652.

For example, client computing device A 610 communicates to the WebRTC signaling server 630 that it wants to talk to client computing device B 620. The call request goes from the calling client computing device A 610 through the WebRTC signaling server 630 to the client computing device B 620 receiving the call. The response comes back to the client computing device A 610 from the WebRTC signaling server 630.

As part of signaling, client computing device A 610 and client computing device B 620 exchange a Session Description Protocol (SDP). SDP is used for describing multimedia communication sessions for the purpose of session announcement, session invitation, and parameter negotiation. SDP does not deliver any media by itself but is used between endpoints for negotiation of media type, format, and all associated properties. A set of properties and parameters are often called a session profile. The session profile includes a set of IP addresses that are going to be used for a multimedia communication session.

The other WebRTC service framework 625 component is a WebRTC media server 640 that may have multiple names based on the different protocols that are used. The WebRTC media server 640 may be called a Traversal Using Relay NAT (TURN) server or an Interactive Connectivity Establishment (ICE) server. The WebRTC media server 640 may also be referred to as a connectivity server. The WebRTC media server 640 may be separate from the signaling server 630. Alternatively, the WebRTC media server 640 and the WebRTC signaling server 630 may combined into a single server.

The WebRTC media server 640 enables client computing device A 610 and client computing device B 620 to probe network connectivity and to be able to consider, and ultimately establish, different media communication paths. In optimum cases client computing device A 610 and client computing device B 620 are able to send media packets to each other directly over channel 654 if, for example, they are in a local area network.

If client computing device A 610 and client computing device B 620 are on different networks there may be intervening firewalls, which are not shown. If there are intervening firewalls, then the direct path between client computing device A 610 and client computing device B 620 will be blocked. This is where the WebRTC media server 640 steps in.

The WebRTC media server 640 enables client computing device A 610 and client computing device B 620 to request a relay path where each side sends packets to the relay. In this case, the media path is from client computing device A 610 to the WebRTC media server 640 and then to client computing device B 620. The path that will be chosen for a particular call is determined individually for each call. This is because for each call and for each multimedia communication session, client computing device A 610 does not know upfront who its peer will be.

Client computing device A 610 and client computing device B 620 could be on the local network or they could be remote. So each multimedia communication session starts with interactive probing of the network to determine the optimal path. This interactive probing is known as ICE probing. The WebRTC media server 640 plays a role by providing a probing point and a relay point over channels 656 and 658.

Figure 20A:
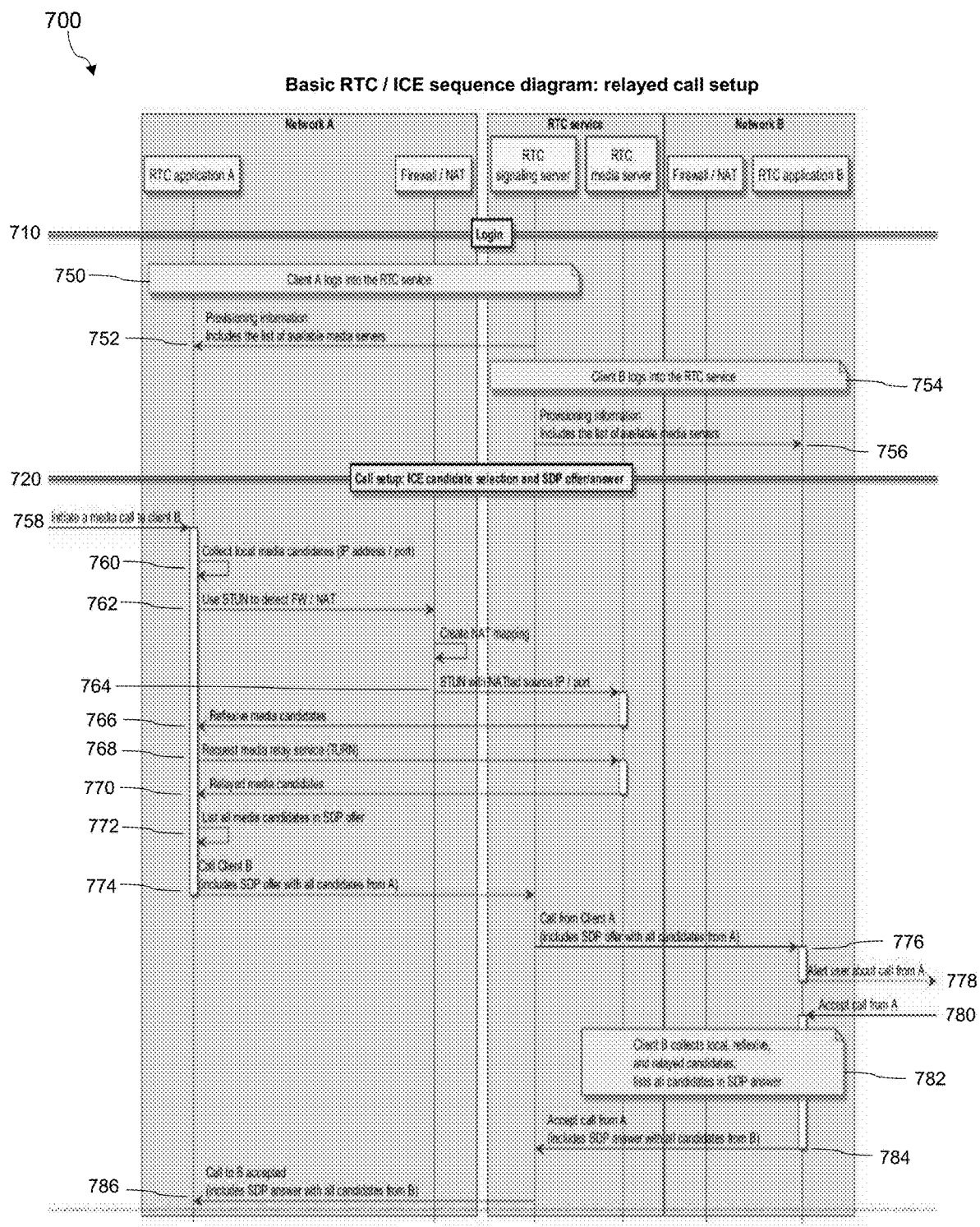
FIGS. 20A and 20B are a WebRTC/network connectivity sequence diagram implementing a relayed call setup for the WebRTC architecture as illustrated in FIG. 19.
Figure 20B:
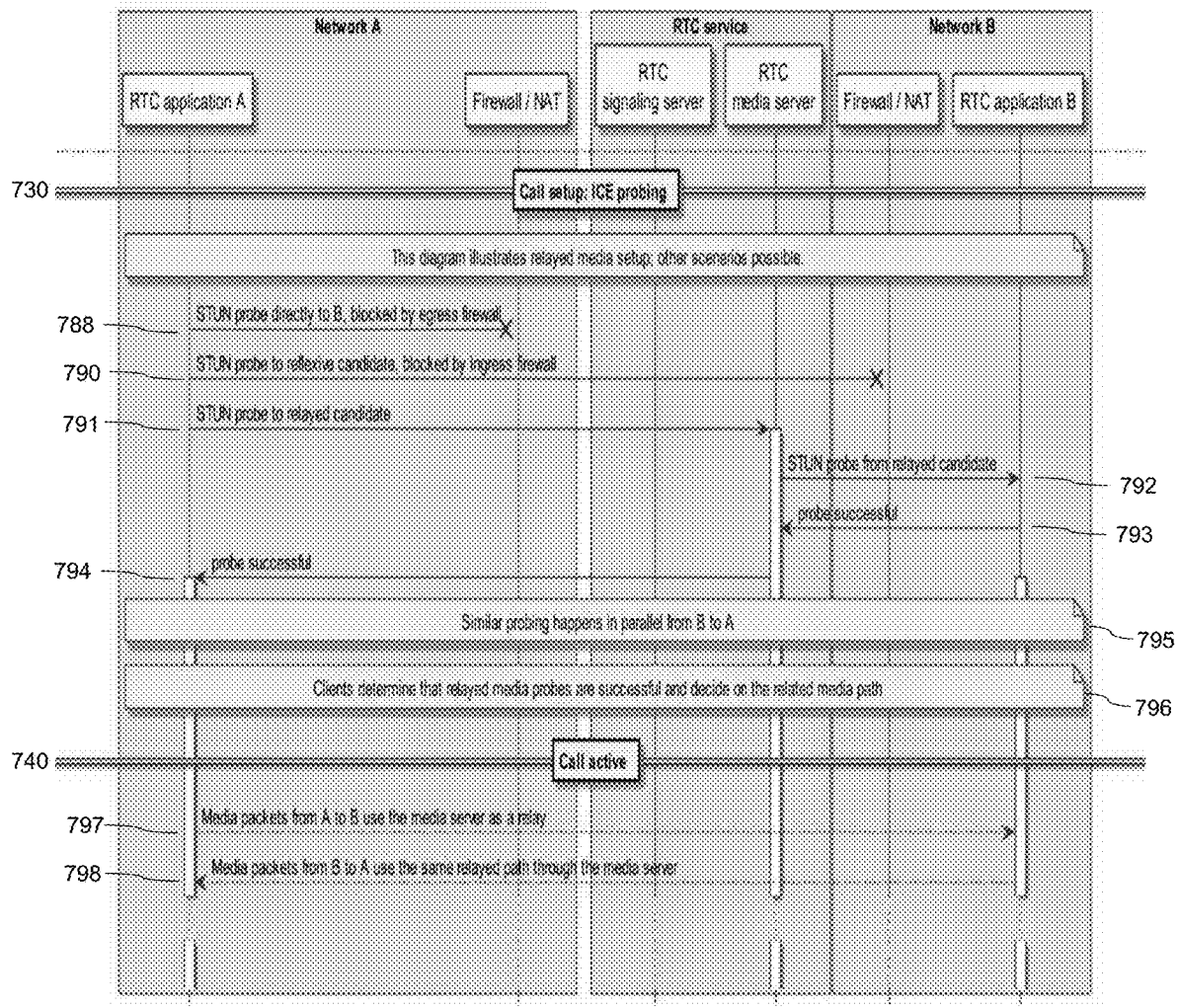

Referring now to FIGS. 20A-20B, a WebRTC/network connectivity sequence diagram 700 implementing a relayed call setup for the WebRTC architecture 600 will be discussed. The sequence diagram 700 is to illustrate one example of network connectivity and the different relationships and protocols that occur between the client computing devices A, B 612, 620 and the signaling/media servers 630, 640.

Client computing device A 610 is to establish a multimedia communication session with client computing device B 620. The sequence diagram 700 is divided into four sections. A first section 710 is referred to as login, a second section 720 is referred to as call setup which is ICE candidate selection and SDP offer/answer, a third section 730 is referred to as call setup with ICE probing, and a fourth section 740 is referred to as call active.

The sequence starts when client computing device A 610 logs into the WebRTC service at 750. Client computing device A 610 reaches out to the WebRTC signaling server 630 and provides credentials as part of the authorization process. Similarly, client computing device B 620 logs into the WebRTC service at 754. Client computing device B 620 reaches out to the WebRTC signaling server 630 and provides credentials as part of the authorization process.

Provisioning is an outcome or a follow up to the log-in process. Provisioning is where the WebRTC signaling server 630 tells client computing device A 610 the different parameters of the service at 752, and tells client computing device B 620 the different parameters of the service at 756. Provisioning information includes a list of available WebRTC media servers 640.

At this point client computing device A 610 and client computing device B 620 are logged in. A user of client computing device A 610 decides to call the user of client computing device B 620 at 758. This initiates the ice procedure, which is extremely branched in the sense that there are lots of possibilities that could go one way or the other depending on the specifics of the network configuration.

In this one possible scenario, among many scenarios, client computing device A 610 is to collect all the connectivity path possibilities at 760 since it does not know which connectivity path will work. Client computing device A 610 is to get the list of the local IP addresses and open network ports and those IP addresses, which is a local procedure that clients can do.

A determination needs to be made if client computing device A 610 is situated behind a network router which implements Network Address Translation (NAT). NAT is a method of remapping one IP address space into another by modifying network address information in the IP header of packets while they are in transit across a traffic routing device.

For example, client computing device A 610 has a private IP but when packets are sent to the Internet the NAT automatically changes its source address to a public IP. Client computing device A 610 does not know about this because it happens on the path from the client computing device A 610 to the network. Client computing device A 610 never sees those packets after they have been translated.

The client computing device A 610 uses a STUN protocol at 762 to detect a firewall or a NAT. The STUN protocol serves as a tool for other protocols in dealing with NAT traversal. It can be used by an endpoint to determine the IP address and port allocated to it by a NAT.

This is where the WebRTC media server 640 becomes useful. Client computing device A 610 sends a specially formatted probe packet at 762 toward the WebRTC media server 640. The probe packet undergoes network address translation on its path at 764. The probe packet is received by the WebRTC media server 640. The WebRTC media server 640 has the capability to respond back at 766 with the IP address that it saw this coming from. The client computing device A 610 is detecting the presence of the network.

The response back includes the reflective media candidates at 766. The reflexive address now results in address and ports for client computing device B 620 that potentially may be used by the remote side to send packets to the local side. Each corresponding address and port are called a candidate, with one of the candidates being used for eventual media connectivity. Consequently, local candidates are collected.

With respect to the reflexive candidates, the WebRTC media server 640 is acting like a mirror reflecting the packet from client computing device A 610 back to client computing device A 610. Client computing device A 610 can also ask the WebRTC media server 640 to provide a relay service at 768, whereby client computing device A 610 wants to be able to send packets but client computing device A 610 may not be able to source the packets from its local network interface. Instead, the WebRTC media server 640 provides client computing device A 610 a relay point at 770 so that the packets will be sent by the WebRTC media server 640 to client computing device B 620.

The collected candidates are listed in a text format called a Session Description Protocol (SDP) at 772. This description is sent along with a call request at 774.

The description may be sent separately or may be sent embedded within a call request. Implementations may differ, but conceptually, there is a request from client computing device A 610 to the WebRTC signaling server 630. Client computing device A 610 says it wants to call client computing device B 620, and provides a list of all the network candidates for client computing device A 610. The WebRTC signaling server 630 in turn relays this to client computing device B 620 at 776. From this point client computing device B 620 is aware that there is an incoming call at 778. Client computing device B 620 accepts the call at 780.

Client computing device B 620 now collects local, reflective, and relayed candidates, and lists all the candidates in an SDP answer at 782. Client computing device B 620 goes through the same procedure as client computing device A 610 in collecting the local, reflective and relayed candidates. Client computing device B 620 mirrors client computing device A 610.

Once the candidates are collected they are very similarly listed in an SDP at 784. The SDP answer with the candidates from client computing device B 620 are sent to client computing device A 610 at 786. At this point both client computing device A 610 and client computing device BA 620 agree that they want to establish a call, and they both have information about connectivity candidates for the other side.

Client computing device A 610 and client computing device B 620 now start probing the network, which could be extremely extensive and detailed since there are generally a large number of connectivity possibilities. However, since there is a firewall, direct connectivity is not possible at 788 between client computing device A 610 and client computing device B 620.

Instead, client computing device A 610 sends a probe to the reflective candidate at 790 because of the firewall which goes to the public facing IP of client computing device B 620. Depending on the configuration of the remote firewall the probe may go through or it may get rejected. In this particular scenario the probe is rejected.

Client computing device A 610 then falls back to the relayed candidate at 791. The way the relay works is that it is still probing since client computing device A 610 is not committed to any particular path. One of the probing paths is towards the relay. The relay embedded in the WebRTC media server 640 relays the probe at 792 and is delivered to client computing device B 620. Client computing device B 620 responds that the probe is successful at 793. The probe goes through the same path to client computing device A 610 at 794.

At this point client computing device A 610 knows it has a viable path through the relay. Similar probing happens at 795 in parallel from client computing device B 620 to client computing device A 610. Client computing device A 610 and client computing device B 620 determine at 796 that the relayed media probes are successful and decide on the relayed media path.

Once both sides have a pair of viable successful probes going out and coming in they agree that this is what they want to use for that call. Once those probes are successful they become viable candidates, and there is a confirmation transaction where client computing device A 610 is the one driving the whole thing and says this is what we ought to be using, and client computing device B 620 agrees. The call is active at this point. Media packets from client computing device A 610 to client computing device B 620 use the WebRTC media server 640 as a relay at 795, and media packets from client computing device B 620 to client computing device A 610 use the same relayed path at 796 through the WebRTC media server 640.

Figure 21:
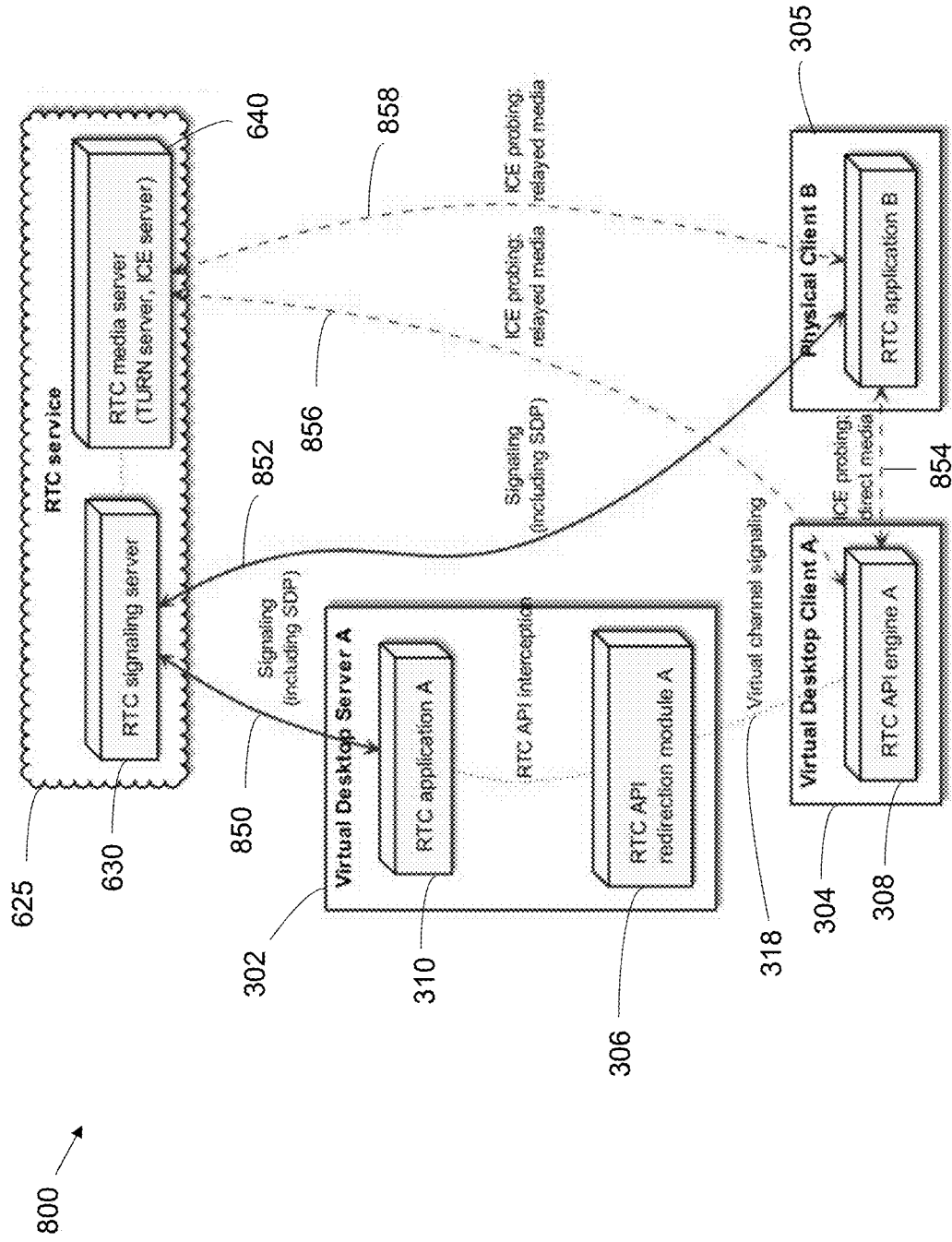
FIG. 21 is a simplified block diagram of the WebRTC API redirection architecture illustrated in FIG. 3 with network connectivity steering.

Referring now to FIG. 21, a simplified WebRTC API redirection architecture 800 with network connectivity steering will be discussed. The simplified WebRTC API redirection architecture 800 is based on the WebRTC API redirection architecture 300 illustrated in FIG. 3 and the WebRTC service framework 625 illustrated in FIG. 19. For the items discussed below that are not shown in FIG. 21, reference is directed to FIG. 3. Also, the WebRTC API redirection architecture 800 will be referred to as computing system 800.

As a result of the intercepted APIs of the real-time media application 310 being redirected to client computing device A 304, client computing device A 304 can now advantageously reach out to the WebRTC media server 640. Without WebRTC redirection, the virtual desktop server 302 would instead reach out to the media server 640.

In other words, network connectivity probing is to be performed by client computing device A 304 to determine reachability to peer client computing device B 305. The peer computing device is illustrated as another client computing device, i.e., client computing device B 305. Alternatively, the peer computing device may be configured as a conference bridge. A conference bridge allows a group of users to connect and share multimedia.

Even though probing is performed by client computing device A 304 instead of virtual desktop server 302, signaling with the WebRTC signaling server 630 remains with the virtual desktop server 302. That is, signaling is not redirected to client computing device A 304 as part of the WebRTC redirection. The WebRTC signaling server 630 enables client computing device A 304 to log into the WebRTC service 625 via the virtual desktop server 302, and enables client computing device B 305 to log into the WebRTC service 625.

As noted above, the WebRTC signaling server 630 has the authentication and authorization function, and it serves as a rendezvous point for client computing device A 304 and client computing device B 305 to be able to communicate with each other. The virtual desktop server 302 communicates to the WebRTC signaling server 630 over channel 850, and client computing device B 305 communicates to the WebRTC signaling server 630 over channel 852.

As part of signaling, the virtual desktop server 302 and client computing device B 305 exchange a Session Description Protocol (SDP). SDP is used for describing multimedia communication sessions for the purpose of session announcement, session invitation, and parameter negotiation. SDP does not deliver any media by itself but is used between endpoints for negotiation of media type, format, and all associated properties. The set of properties and parameters are often called a session profile. The session profile includes a set of IP addresses that are going to be used for a multimedia communication session.

The computing system 800 includes a virtual desktop server 302 comprising an application framework 312 comprising a real-time media application 310 to provide real-time communications (RTC) for peer-to-peer networking, and a native RTC engine 316 to execute a portion of the real-time media application when received by the native RTC engine 316. An application program interface (API) code redirection module 306 redirects intercepted APIs of the real-time media application intended for the native RTC engine 316 so that the portion of the real-time media application is redirected away from the native RTC engine 316. The API code redirection module 306 redirects the intercepted APIs based on redirection code 314 injected into the real-time media application 310. The redirected APIs correspond to real-time media processing.

Client computing device A 304 includes a client RTC API engine 308 communicating with the API code redirection module 306 to execute the redirected portion of the real-time media application. As a result of the WebRTC redirection, client RTC API engine 308 performs network connectivity probing to determine reachability to a peer computing device 305, and establish at least one media stream with the peer computing device 305 based on the network connectivity probing.

Client computing device A 304 and client computing device B 305 could be on a local network or they could be remote. So each multimedia communication session starts with interactive probing of the network to determine the optimal path. This interactive probing is known as ICE probing. The WebRTC media server 640 plays a role by providing a probing point and a relay point over channels 856 and 858. If client computing device A 304 and client computing device B 305 are on a local network, then ICE probing is also performed over channel 854. Reference is directed to sections 720 and 730 in the sequence diagram 700 illustrated in FIGS. 20A-20B for a detailed discussion of ICE probing.

Based on results of the network connectivity probing, at least one media stream is established with the peer computing device 305. The at least one media stream may be relayed over channels 856 and 858, or may be direct over channel 854 if client computing device A 304 and client computing device B 305 are on a local network.

The portion of the real-time media application being redirected from the virtual desktop server 302 to client computing device A 304 includes information directed to a Session Traversal Utilities for NAT (STUN) server or a Traversal Using Relay NAT (TURN) server, or a combination of a STUN and TURN server. The client RTC API engine 308 communicates with the API code redirection module 306 through a virtual channel 318, and the information directed to the STUN and TURN servers is provided over this channel 318.

Figure 22:
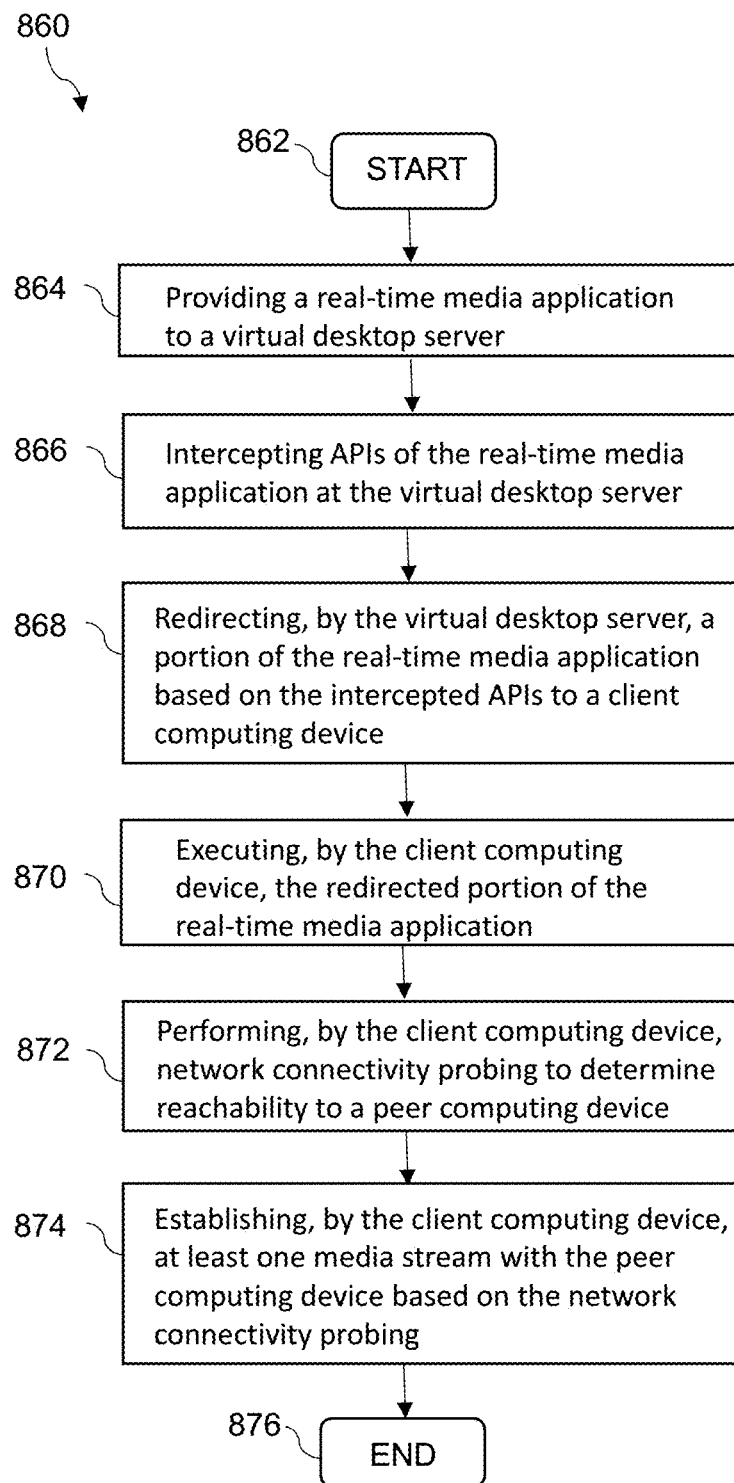
FIG. 22 is a flowchart illustrating a method for providing real-time communications for peer-to-peer networking for the WebRTC API redirection architecture illustrated in FIG. 21.

Referring now to FIG. 22, a flowchart 860 illustrating a method for providing real-time communications for peer-to-peer networking for the WebRTC API redirection architecture 800 with network connectivity steering will be discussed. From the start (Block 862), the method includes providing real-time communications (RTC) for peer-to-peer networking to the virtual desktop server 302 at Block 864. A portion of a real-time media application is to be executed when received by the native RTC engine 316 in the virtual desktop server 302.

APIs of the real-time media application 310 are intercepted by the API code redirection module 306 of the virtual desktop server 302 at Block 866. The API code redirection module 306 redirects the portion of the real-time media application to client computing device A 304 at Block 868 based on the intercepted APIs. The client computing device A 304 executes the redirected portion of the real-time media application 310 at Block 870, performs network connectivity probing to determine reachability to the peer computing device 305 at Block 872, and establishes at least one media stream with the peer computing device 305 at Block 874 based on the network connectivity probing. The method ends at Block 876.

Figure 23:
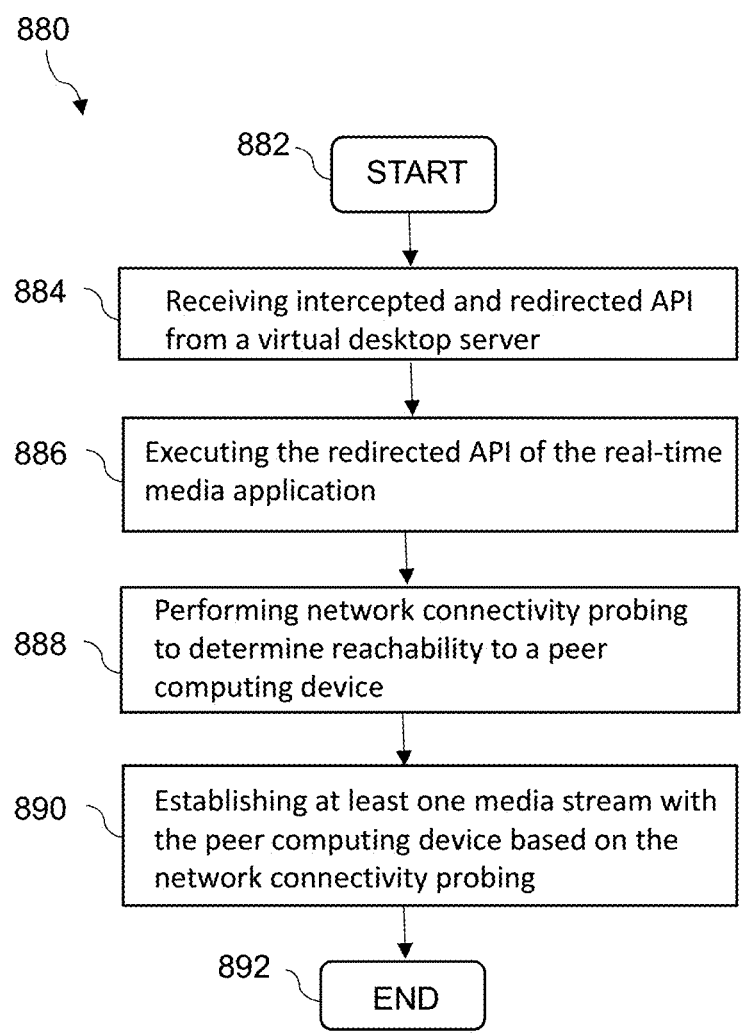
FIG. 23 is a flowchart illustrating a method for operating a client computing device within the WebRTC API redirection architecture illustrated in FIG. 21.

Referring now to FIG. 23, a flowchart 880 illustrating a method for operating client computing device A 304 within the WebRTC API redirection architecture 800 with network connectivity steering will be discussed. From the start (Block 882), the method includes receiving intercepted and redirected APIs from the virtual desktop server 302 at Block 884. The APIs are related to a portion of the real-time media application 310 that is being redirected from the virtual desktop server 302 to client computing device A 304. Client computing device A 304 executes the redirected portion of the real-time media application 310 at Block 886, performs network connectivity probing to determine reachability to the peer computing device 305 at Block 888, and establishes at least one media stream with the peer computing device 305 at Block 890 based on the network connectivity probing. The method ends at Block 892.

Another aspect is directed to a non-transitory computer readable medium for operating a client computing device 304 within the computing system 800 comprising a virtual desktop server 302. The virtual desktop server 302 includes an application framework 312 comprising a real-time media application 310 to provide real-time communications (RTC) for peer-to-peer networking, and a native RTC engine 316 to execute a portion of the real-time media application when received by the native RTC engine 316.

An API code redirection module 306 in the virtual desktop server 302 redirects intercepted APIs of the real-time media application 310 intended for the native RTC engine 316 so that the portion of the real-time media application is redirected away from the native RTC engine 316. The non-transitory computer readable medium has a plurality of computer executable instructions for causing the client computing device 304 to execute the redirected portion of the real-time media application 310, perform network connectivity probing to determine reachability to a peer computing device 305, and establish at least one media stream with the peer computing device 305 based on the network connectivity probing.

Figure 24A:
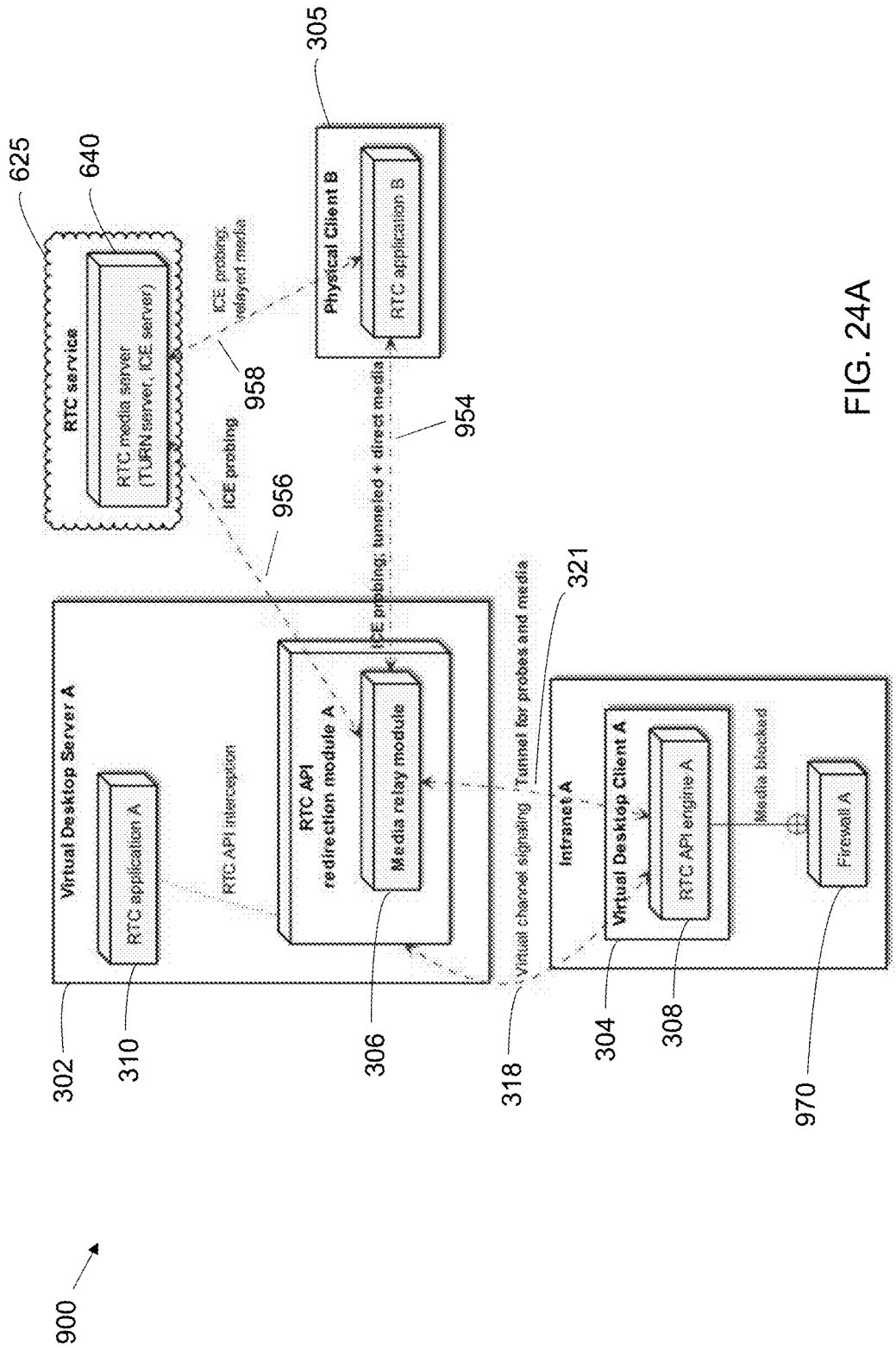
FIG. 24A is a simplified block diagram of the WebRTC API redirection architecture illustrated in FIG. 3 with network connectivity steering fallback.

Referring now to FIG. 24A, another feature of network connectivity probing is directed to network connectivity steering fallback, such as when network connectivity is impaired for client computing device A 304. Communications may be impaired when client computing device A 304 is behind a firewall 970. In this case, network connectivity probing is still performed by client computing device A 304 but is relayed back through the virtual desktop server 302. Here, network end points or network ports are added to the virtual desktop server 302 by a media relay module to be used as part of the ICE connectivity probing procedure. The media relay module is illustrated as part of the RTC API code redirection module 306. Alternatively, the media relay module may be separate from the RTC API code redirection module 306 within the virtual desktop server 302.

A simplified WebRTC API redirection architecture 900 with network connectivity steering fallback is provided in FIG. 24A. Network connectivity steering fallback will also be referred to as tunneled server-side transport fallback. The simplified WebRTC API redirection architecture 900 is based on the WebRTC API redirection architecture 300 illustrated in FIG. 3 and the WebRTC service framework 625 illustrated in FIG. 19. For the items discussed below that are not shown in FIG. 24A, reference is directed to FIG. 3. Also, the WebRTC API redirection architecture 900 will be referred to as computing system 900.

Lack of network connectivity or impaired network connectivity are very typical concerns for desktop virtualization deployments. To address these, the WebRTC redirection framework can use network connectivity steering fallback, i.e., tunneled server-side transport fallback.

In the tunneled server-side transport fallback, ideally, endpoints should be able to exchange media streams directly over UDP, and if that is not possible, use TURN servers to relay the media packets. If neither of these options is available, real-time connectivity would not be possible.

WebRTC redirection has components running on the virtual desktop server 302 and on client computing device A 304, providing an additional connectivity option. Namely, it is possible to tunnel the stream of media packets between client computing device A 304 and the virtual desktop server 302 through a dedicated virtual channel 321, and use a port or a set of ports on the virtual desktop server 302 as the network endpoint.

Fallback is less optimized but it is important to maintain quality gains from the WebRTC redirection. Using the dedicated virtual channel 321 to transmit the media packets between the RTC API engine 308 and the media relay module insures that the media packets do not interfere with other network traffic (such as over virtual channel 318) in the same direction while maintaining a quality service.

The media packets are sent over the virtual channel 321 as either in-band or off-band independent streams over TCP or UDP transports. Citrix HDX may be used to deliver high-definition user experience. In-band may be part of an HDX reliable stream over TCP or UDP transport, whereas off-band means a separate stream from the HDX reliable stream. Citrix protocol Enlightened Data Transport (EDT) may be used to send the media packets as an alternative to TCP and UDP. Citrix HDX also allows switching between lossless and lossy graphics modes, but switching to lossless has a high bandwidth overhead.

The virtual channel 321 is different from the virtual channel 318 used to redirect the intercepted APIs of the real-time media application from the RTC API code redirection module 306 in the virtual desktop server 302 to the RTC API engine 308 in client computing device A 304. The virtual channel 321 is designed for real time media.

In addition to the media relay module relaying the streams of media packets in the desktop server 302, the media relay module also relays the fallback network connectivity probing. The fallback network connectivity probing between the virtual desktop server 302 and client computing device A 304 may also be over virtual channel 321 used for the stream of media packets.

The media relay module is configured to open network input and output ports to be used as candidates for the fallback network connectivity probing. The illustrated media relay module is within the RTC API code redirection module 306 in the virtual desktop server 302 and communicates with the RTC API engine 308 in the client computing device A 304 over virtual channel 321. This transport option can be very useful in many scenarios, such as when neither direct connectivity nor relay servers are available, for example, such as when client computing device A 304 is blocked by a firewall 970.

To implement this option, the WebRTC redirection framework must a) implement the functionality to open a server-side User Datagram Protocol (UDP) port from the connector 306 on demand, and relay media packets between it and the client-side engine 308 through the virtual channel 321, b) use the server-side IP address and port as an additional candidate for the ICE process. ICE requires this to be repeated for all media streams where additional connectivity is necessary.

The computing system 900 includes a virtual desktop server 302 comprising an application framework 312 comprising a real-time media application 310 to provide real-time communications (RTC) for peer-to-peer networking, and a native RTC engine 316 to execute a portion of the real-time media application when received by the native RTC engine 316. An application programming interface (API) code redirection module 306 redirects original APIs of the real-time media application intended for the native RTC engine 316 so that the portion of the real-time media application is to be redirected away from the native RTC engine 316.

Client computing device A 304 includes a client RTC API Engine 308 communicating with the API code redirection module 306 to execute the redirected portion of the real-time media application. As a result of the WebRTC redirection, client RTC API engine 308 performs network connectivity probing to determine reachability to a peer computing device 305, and also performs fallback network connectivity probing via the virtual desktop server 302 to determine reachability to the peer computing device 305.

The peer computing device 305 is illustrated as another client computing device, i.e., client computing device B 305. Alternatively, the peer computing device 305 may be configured as a conference bridge. A conference bridge allows a group of users to connect and share multimedia.

At least one media stream is established with the peer computing device 305 via the virtual desktop server 302 based on the fallback network connectivity probing if network connectivity is impaired with the network connectivity probing. If network connectivity is not impaired, then at least one media stream is established with the peer computing device 305 based on the network connectivity probing. The client RTC API engine 308 may perform the network connectivity probing and the fallback network connectivity probing in parallel.

The portion of the real-time media application being redirected includes information directed to a Session Traversal Utilities for NAT (STUN) server or a Traversal Using Relay NAT (TURN) server, or a combination of a STUN and TURN server. The client RTC API engine 308 communicates with the API code redirection module 306 through the virtual channel 318, and the information directed to the STUN and TURN servers is provided over this channel.

Figure 24B:
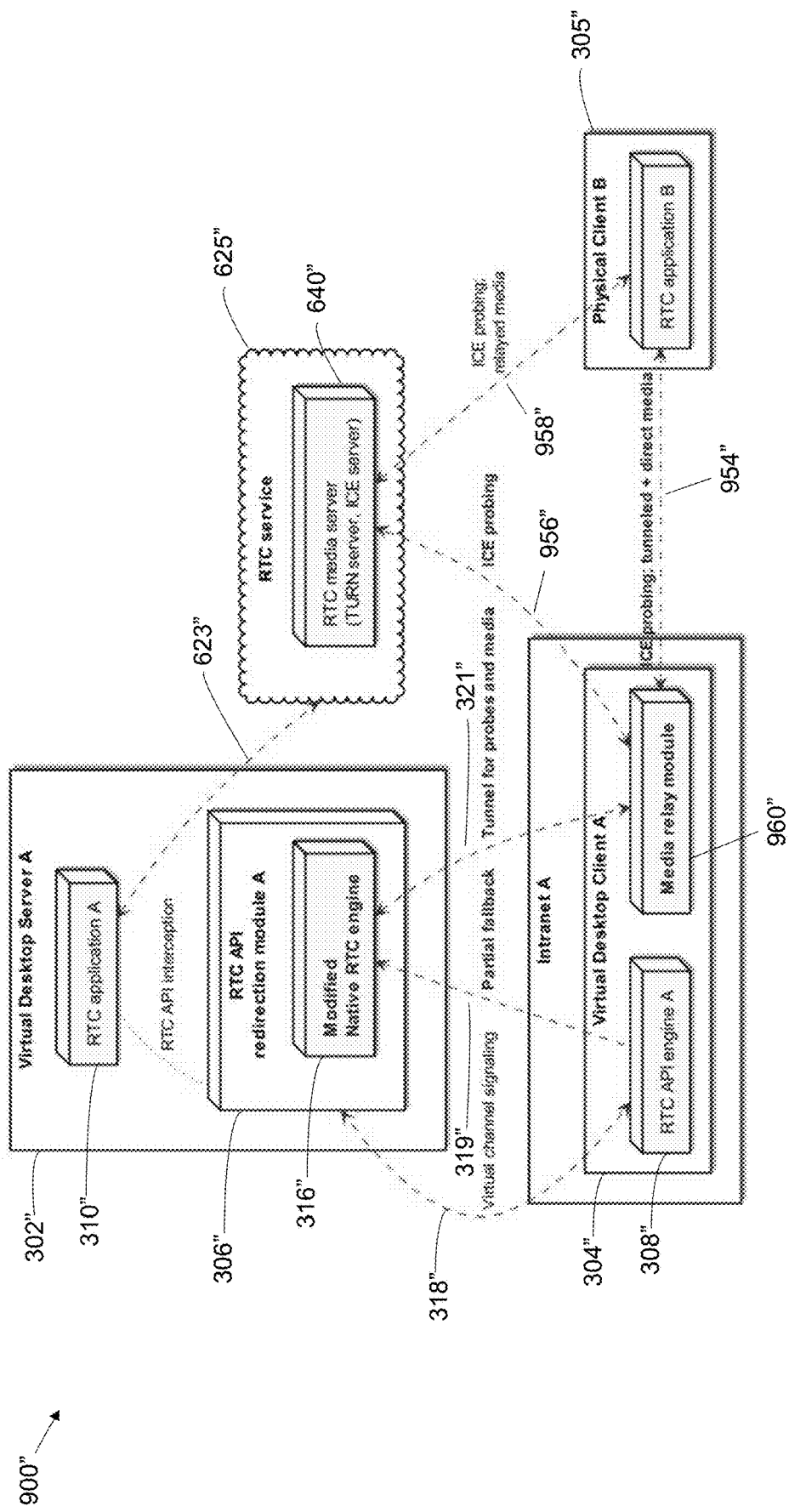
FIG. 24B is a simplified block diagram of the WebRTC API redirection architecture illustrated in FIG. 3 with network connectivity steering partial fallback.

Referring now to FIG. 24B, another feature of network connectivity probing is directed to network connectivity steering partial fallback. In this case, network connectivity is impaired at the virtual desktop server 302" instead of at client computing device A 304".

Network connectivity may be impaired when the virtual desktop server 302" is blocked, such as by a firewall. Alternatively, network connectivity may be impaired when the virtual desktop server 302" cannot perform media processing using its RTC API Engine A 316" due to at least one of limited resources (CPU, memory), lack of suitable codecs, security reasons (concerns with local media execution), etc.

Another reason for a partial fallback may be version compatibility: client computing device A 304" may be running an older version of the media engine 308" that may lack some media processing functionality available in a newer version on the virtual desktop server 302" (but still be fully compatible with regard to media relay and related networking connectivity.

In the partial fallback, a modified native RTC engine 316" at the virtual desktop server 302" performs ICE probing and tunnels media over virtual channel 321" via a media relay module 960" at client computing device A 304". Media processing is redirected back to the RTC API redirection module 310" in the virtual desktop server 302" over virtual channel 319", which is a partial fallback.

A simplified WebRTC API redirection architecture 900" with network connectivity steering partial fallback is provided in FIG. 24B. The simplified WebRTC API redirection architecture 900" is based on the WebRTC API redirection architecture 300 illustrated in FIG. 3 and the WebRTC service framework 625 illustrated in FIG. 19. For the items discussed below that are not shown in FIG. 24A, reference is directed to FIG. 3. Also, the WebRTC API redirection architecture 900" will be referred to as computing system 900".

Network connectivity probing is relayed by the media relay module 960" over channel 956" to the WebRTC media server 640" and then over channel 958" to client computing device B 305". The WebRTC media server 640" is also in communications with real-time media application 310" over channel 623". Network connectivity probing may also be relayed by the media relay module 960" over channel 956" directly to client computing device B 305" when on a local network with client computing device A 304".

Based on results of the network connectivity probing, at least one media stream is established with the peer computing device 305". The at least one media stream may be relayed over channels 956" and 958", or over a direct channel 954" if client computing device A 304" and client computing device B 305" are on a local network.

Figure 25A:
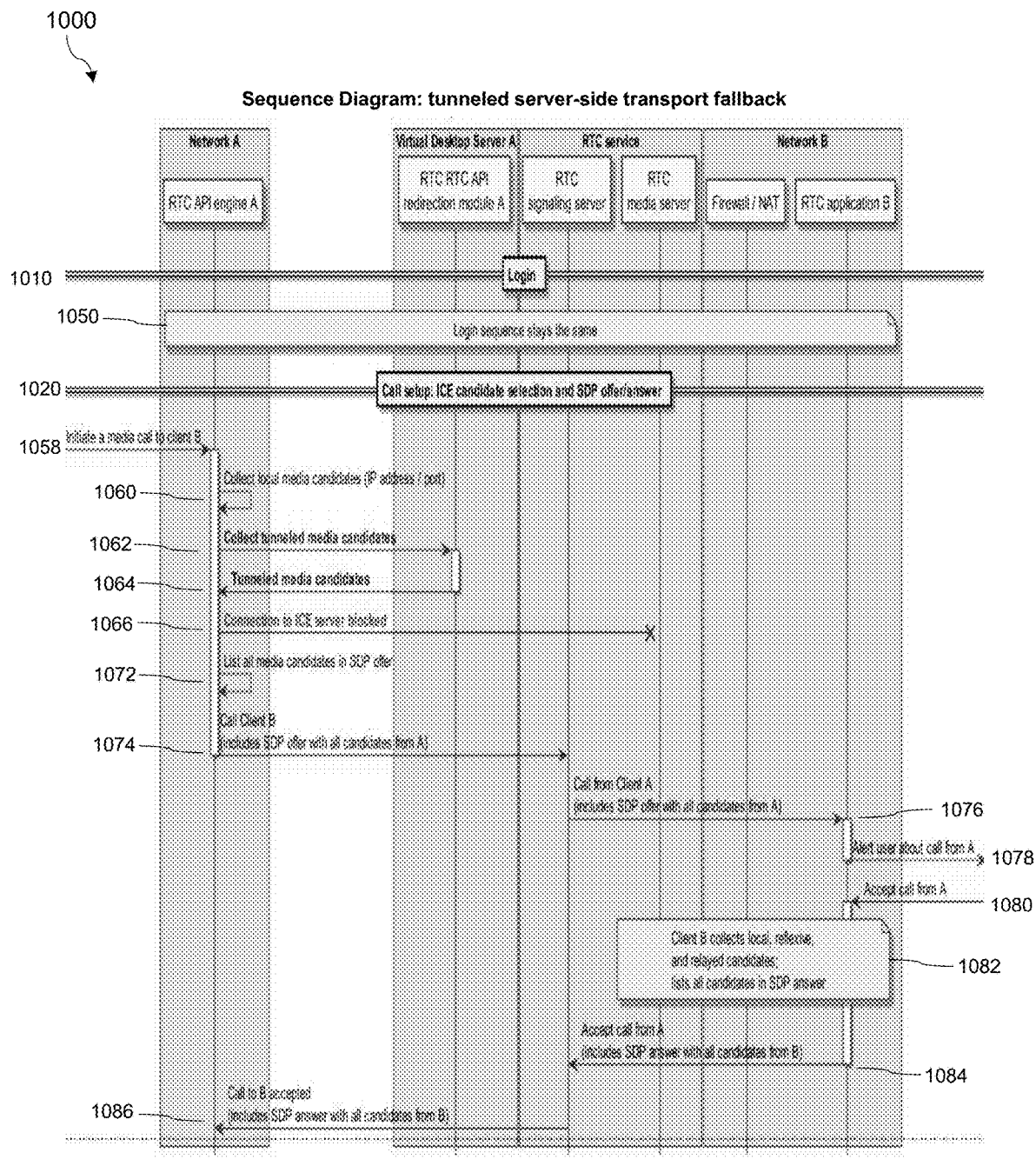
FIGS. 25A and 25B are a WebRTC/network connectivity sequence diagram implementing a network connectivity steering fallback for the WebRTC API redirection architecture illustrated in FIG. 24A.
Figure 25B:
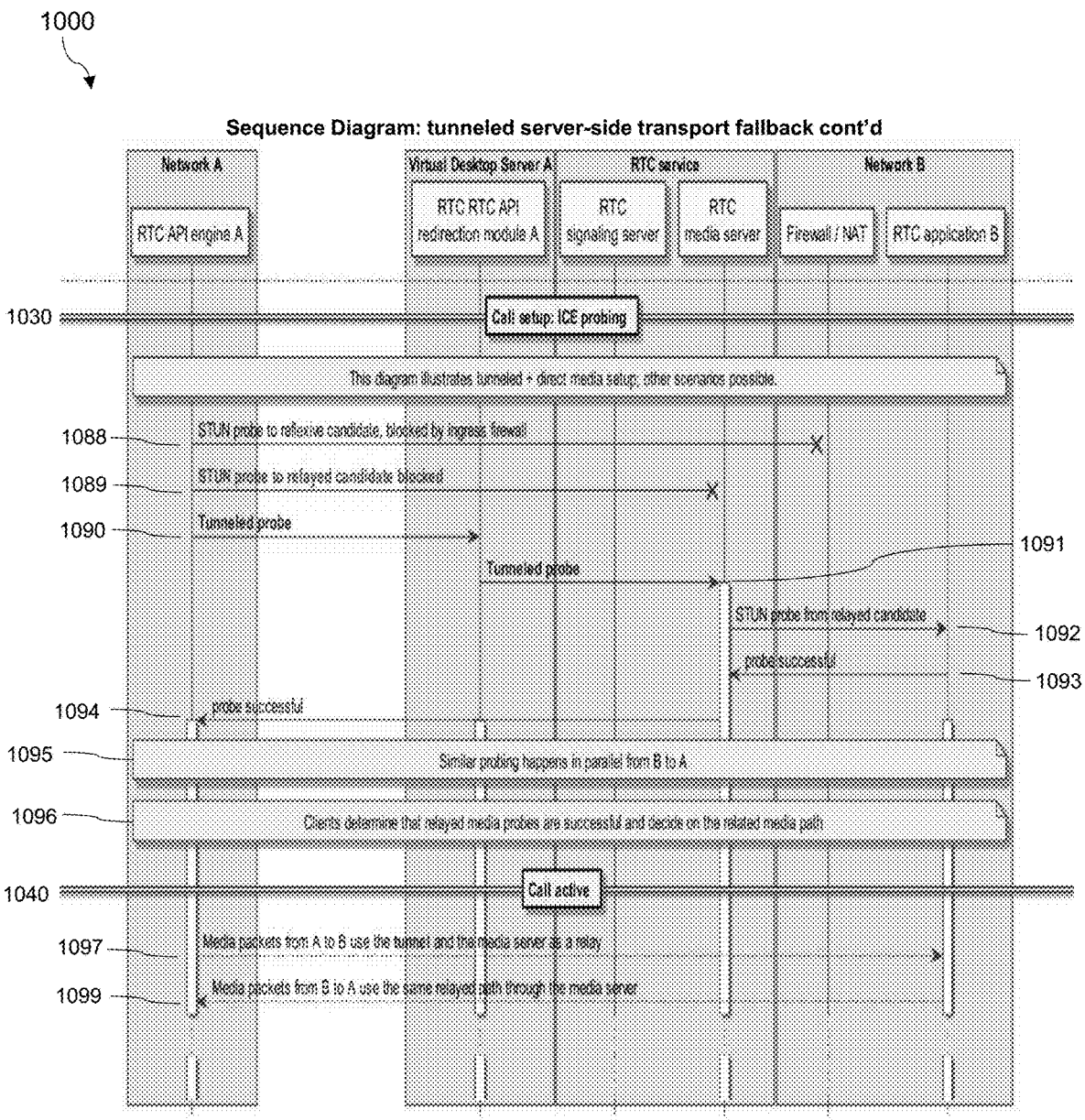

Referring now to FIGS. 25A-25B, a WebRTC/network connectivity sequence diagram 1000 implementing tunneled server-side fallback for the WebRTC architecture 900 will be discussed. Client computing device A 304 is to establish a multimedia communication session with client computing device B 305. The sequence diagram 1000 is divided into four sections. A first section 1010 is referred to as login, a second section 1020 is referred to as call setup which is ICE candidate selection and SDP offer/answer, a third section 1030 is referred to as call setup with ICE probing, and a fourth section 1040 is referred to as call active.

The sequence starts with the login sequence which is generally referenced as 1050. The login sequence is similar to the login sequence discussed in FIG. 20A, where client computing device A 304 logs into the WebRTC service. Client computing device A 304 reaches out to the WebRTC signaling server 630 and provides credentials as part of the authorization process. Similarly, client computing device B 305 logs into the WebRTC service. Client computing device B 305 reaches out to the WebRTC signaling server 630 and provides credentials as part of the authorization process.

The log-in process leads to provisioning, where the WebRTC signaling server 630 tells client computing device A 304 and client computing device B 305 the different parameters of the WebRTC service. Provisioning information includes a list of available WebRTC media servers 640.

At this point client computing device A 304 and client computing device B 305 are logged in. A user of client computing device A 304 decides to call the user of client computing device B 305 at 1058. This initiates the ICE procedure, which is extremely branched in the sense that there are lots of possibilities that could go one way or the other depending on the specifics of the network configuration.

In this one possible scenario, among many scenarios, client computing device A 304 is to collect all the connectivity path possibilities at 1060 since it does not know which connectivity path will work. Client computing device A 304 is to get the list of the local IP addresses and open network ports and those IP addresses, which is a local procedure that clients can do.

In support of tunneled server-side transport fallback, client computing device A 304 requests tunneled media candidates from the virtual desktop server 302 at 1062. The client computing device A 304 implements this functionality by opening a server-side UDP port from the media relay within the RTC API code redirection module 306 on demand. Tunneled media candidates are collected by client computing device A 304 at 1064. Client computing device A 304 can now use the server-side IP address and port as an additional candidate for the ICE process.

Client computing device A 304 determines that the connection to the ICE server is blocked at 1066. In other words, direct connectivity is not available with client computing device B 305 and relay servers are also not available.

The collected candidates are listed in a text format called a Session Description Protocol (SDP) at 1072. Then this description is sent along with a call request at 1074 to the WebRTC signaling server 630.

The description may be sent separately or may be sent embedded within a call request. Implementations may differ, but conceptually, there is a request from client computing device A 304 to the WebRTC signaling server 630 via the virtual desktop server 302. Client computing device A 304 says it wants to call client computing device B 305, and provides a list of all the network candidates for client computing device A 304. The WebRTC media server 640 in turn relays this to client computing device B 305 at 1076. Right from this point client computing device B 305 is aware that there is an incoming call at 1078. Client computing device B 305 accepts the call at 1080.

Client computing device B 305 now collects local, reflective, and relayed candidates, and lists all the candidates in an SDP answer at 1082. Client computing device B 305 goes through the same procedure as client computing device A 304 would normally perform in collecting local, reflective and relayed candidates in sequence diagram 700. Client computing device B 305 mirrors client computing device A 304.

Once the candidates are collected they are very similarly listed in an SDP at 1084. The SDP answer with the candidates from client computing device B 305 are sent to client computing device A 304 at 1086. At this point both client computing device A 304 and client computing device B 305 agree that they want to establish a call, and they both have information about connectivity candidates for the other side.

At this point client computing device A 304 and client computing device B 305 start probing the network, which could be extremely extensive and detailed since there are generally a large number of connectivity possibilities.

Client computing device A 304 sends a probe to a reflective candidate at 1088 but is blocked by a firewall. Client computing device A 304 then sends a probe to a relayed candidate at 1089 but is also blocked by a firewall. At this point, client computing device A 304 falls back to the tunnel probing via the media relay at 1090. The media relay is in the RTC API code redirection module 306 in the virtual desktop server 302. The tunnel probing is sent to the WebRTC media server 640 at 1091. The relay embedded in the WebRTC media server 640 relays the probe at 1092 and is delivered to client computing device B 305. Client computing device B 305 responds that the probe is successful at 1093. The probe goes through the same path to client computing device A 304 at 1094.

At this point client computing device A 304 knows it has a viable path through the relay. Similar probing happens at 1095 in parallel from client computing device B 305 to the media relay at the virtual desktop server 302. Client computing device A 304 and client computing device B 305 determine at 1096 that the relayed media probes are successful and decide on the relayed media path.

Once both sides have a pair of viable successful probes going out and coming in they agree that this is what they want to use for that call. Once those probes are successful they become viable candidates, and there is a confirmation transaction where client computing device A 304 is the one driving the whole thing and says this is what we ought to be using, and client computing device B 305 agrees. At this point the call is active. Media packets from client computing device A 304 to the media relay module 306 are sent over a virtual channel 321, then the media relay module 306 relays the media packets to client computing device B 305 using the WebRTC media server 640 as a relay at 1097. Media packets from client computing device B 305 to client computing device A 304 use the same relayed path at 1098 through the WebRTC media server 640.

Based on results of the network connectivity probing, at least one media stream is established with the peer computing device 305. The at least one media stream may be relayed over channels 956 and 958, or over a direct channel 954 if the virtual desktop server 302 and client computing device B 305 are on a local network.

Figure 26:
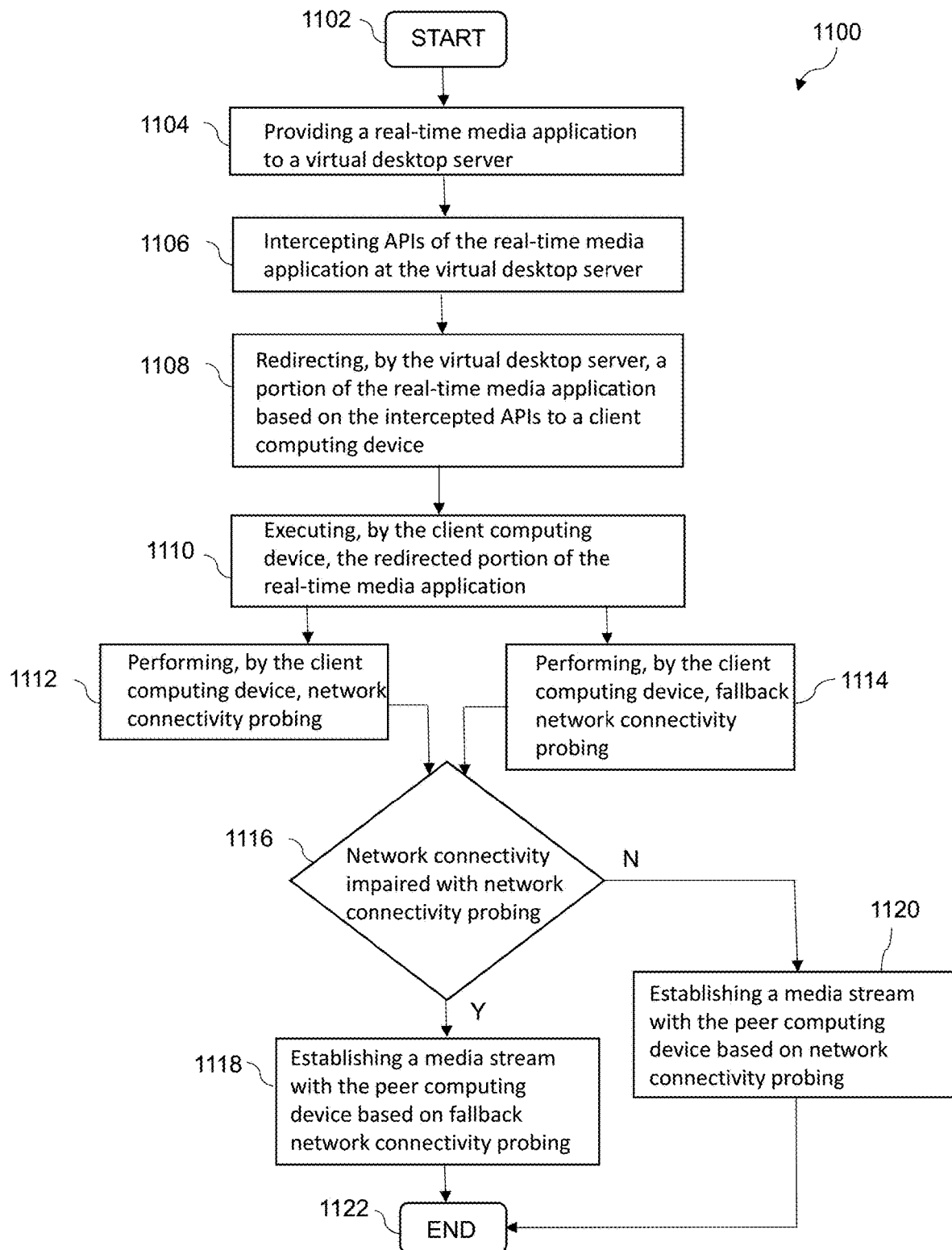
FIG. 26 is a flowchart illustrating a method for providing real-time communications for peer-to-peer networking for the WebRTC API redirection architecture illustrated in FIG. 24A.

Referring now to FIG. 26, a flowchart 1100 illustrating a method for providing real-time communications for peer-to-peer networking for the WebRTC API redirection architecture 900 with network connectivity steering fallback will be discussed. From the start (Block 1102), the method includes providing real-time communications (RTC) for peer-to-peer networking to the virtual desktop server 302 at Block 1104. A portion of a real-time media application is to be executed when received by the native RTC engine 316 in the virtual desktop server 302.

APIs of the real-time media application 310 are intercepted by the API code redirection module 306 of the virtual desktop server 302 at Block 1106. The API code redirection module 306 redirects the portion of the real-time media application to client computing device A 304 at Block 1108 based on the intercepted APIs.

The client computing device A 304 executes the redirected portion of the real-time media application 310 at Block 1110. Network connectivity probing is performed by client computing device A 304 to determine reachability to the peer computing device 305 at Block 1112. Fallback network connectivity probing is also performed by client computing device A 304 to determine reachability to the peer computing device 305 at Block 1114. A determination is made at Block 1116 on whether network connectivity is impaired with the network connectivity probing.

If network connectivity is impaired with the network connectivity probing, then client computing device A 304 establishes at least one media stream with the peer computing device 305 at Block 1118 based on the fallback network connectivity probing. If network connectivity is not impaired with the network connectivity probing, then client computing device A 304 establishes at least one media stream with the peer computing device 305 at Block 1120 based on the network connectivity probing. The method ends at Block 1122.

Figure 27:
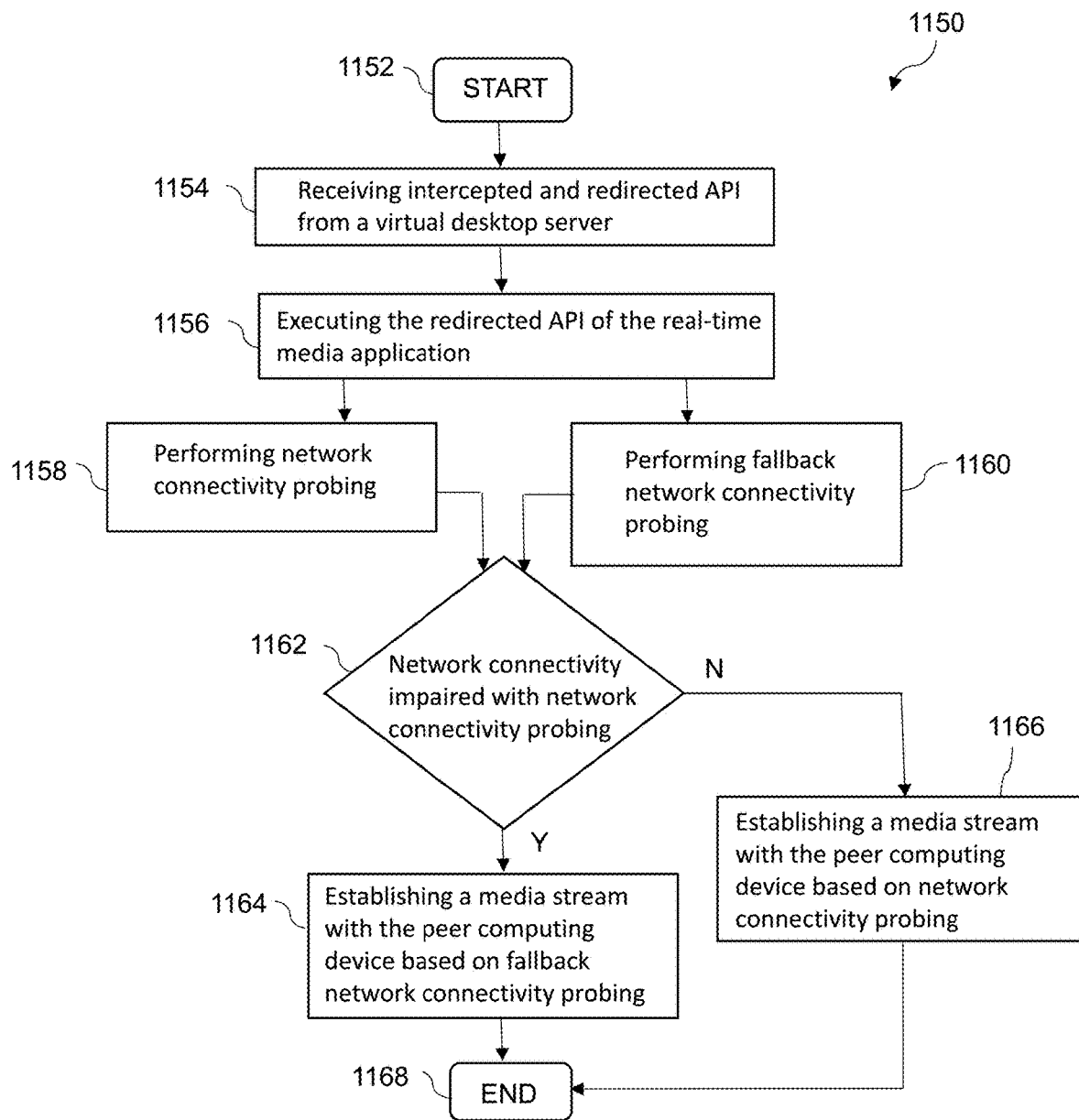
FIG. 27 is a flowchart illustrating a method for operating a client computing device within the WebRTC API redirection architecture illustrated in FIG. 24A.

Referring now to FIG. 27, a flowchart 1150 illustrating a method for operating the client computing device 304 within the WebRTC API redirection architecture 1000 with network connectivity steering fallback will be discussed. From the start (Block 1152), the method includes receiving intercepted and redirected APIs from the virtual desktop server 302 at Block 1154. The APIs are related to a portion of the real-time media application 310 to be executed by the virtual desktop server 302. Client computing device A 304 executes the redirected portion of the real-time media application 310 at Block 1156.

Network connectivity probing is performed by client computing device A 304 to determine reachability to the peer computing device 305 at Block 1158. Fallback network connectivity probing is also performed by client computing device A 304 to determine reachability to the peer computing device 305 at Block 1160. A determination is made at Block 1162 on whether network connectivity is impaired with the network connectivity probing. If network connectivity is impaired with the network connectivity probing, then client computing device A 304 establishes at least one media stream with the peer computing device 305 at Block 1164 based on the fallback network connectivity probing. If network connectivity is not impaired with the network connectivity probing, then client computing device A 304 establishes at least one media stream with the peer computing device 305 at Block 1166 based on the network connectivity probing. The method ends at Block 1168.

Another aspect is directed to a non-transitory computer readable medium for operating a client computing device 304 within a computing system 1000 comprising a virtual desktop server 302. The virtual desktop server 302 includes an application framework 312 comprising a real-time media application 310 to provide real-time communications (RTC) for peer-to-peer networking, and a native RTC engine 316 to execute a portion of the real-time media application when received by the native RTC engine 316.

An API code redirection module 306 in the virtual desktop server 302 redirects intercepted APIs of the real-time media application 310 intended for the native RTC engine 316 so that the portion of the real-time media application is redirected away from the native RTC engine 316. The non-transitory computer readable medium has a plurality of computer executable instructions for causing the client computing device 304 to execute the redirected portion of the real-time media application 310. Network connectivity probing is performed to determine reachability to a peer computing device 305, and fallback network connectivity probing via the virtual desktop server 302 is performed to determine reachability to the peer computing device 305. At least one media stream is established with the peer computing device 305 via the virtual desktop server 302 based on the fallback network connectivity probing if network connectivity is impaired with the network connectivity probing.

Figure 28:
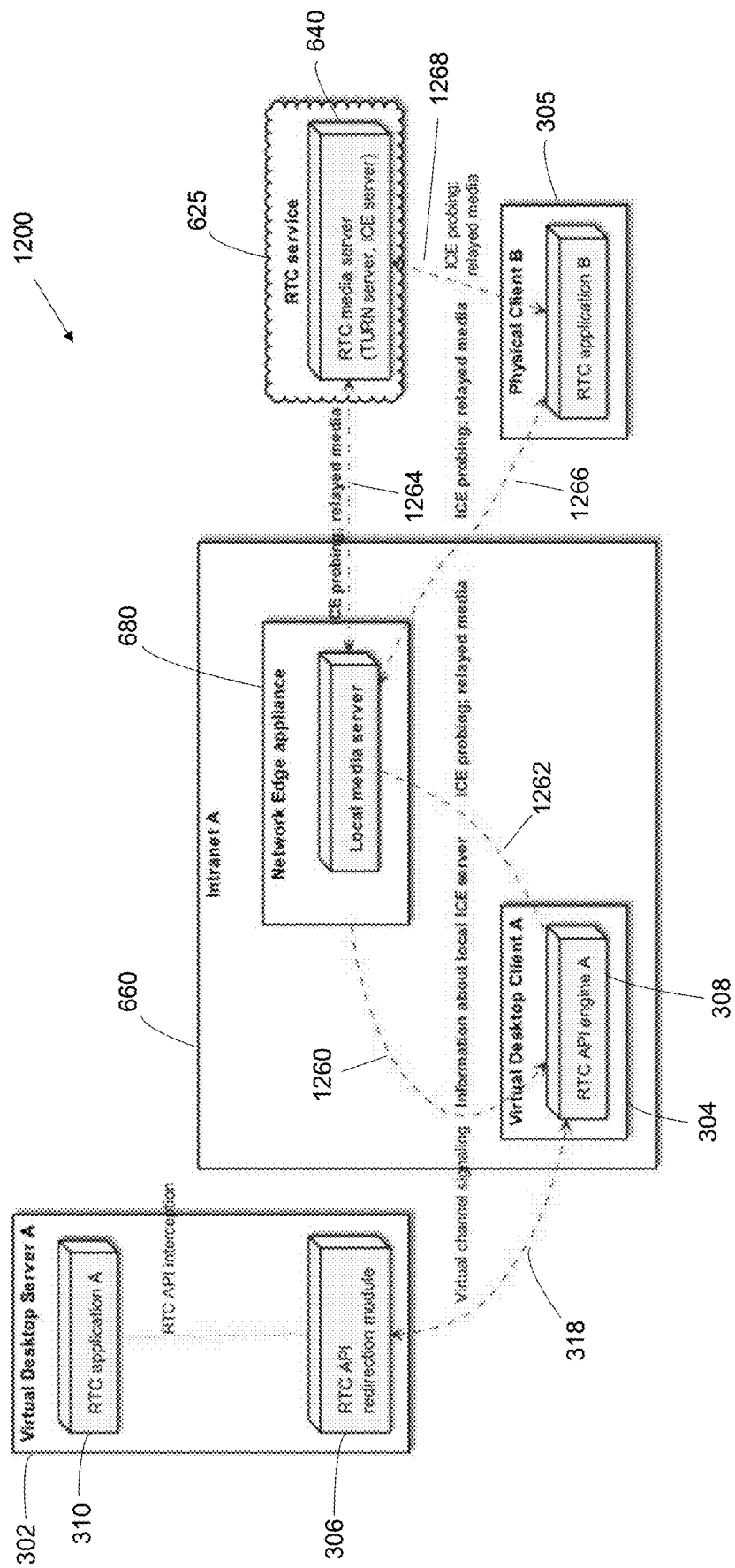
FIG. 28 is a simplified block diagram of the WebRTC API redirection architecture illustrated in FIG. 3 with alternative network connectivity steering.

Referring now to FIG. 28, yet another feature of network connectivity probing is directed to alternative network connectivity steering, such as when communications from client computing device A 304 is constrained. Communications may be constrained when client computing device A 304 is operating within an enterprise. The enterprise may prevent direct communications from client computing device A 304 to client computing device B 305 and to the WebRTC media server 640 in order to provide better manageability of their network.

A typical deployment is where the virtual desktop server 302 is in a centralized location, like in an enterprise data center or in a private cloud location. Client computing device A 304 is on a branch within the enterprise. A likely scenario is when the enterprise implements a firewall to separate the branch network from the rest of the world. The branch network is within Intranet A 660, for example.

In this case, client computing device A 304 communicates with a network edge appliance 680 over channel 1260, which is on one or more branches within the enterprise. The network edge appliance 680 functions as a bridge by straddling the boundary between Intranet A 660 and the network interfacing with the WebRTC service 625 and client computing device B 305.

The network edge appliance 680 provides similar functionality as the WebRTC media server 640. Hence, the reference to alternative network connectivity probing. In other words, the network edge appliance 680 acts as a local media server for client computing device A 304.

Normally, client computing device A 304 would directly communicate with the WebRTC media server 640 using provisioning information provided by the redirected portion of the real-time media application. The provisioning information includes a recommended WebRTC media server 640 that is associated with the WebRTC service 625.

With the alternative network connectivity probing, probing performed by client computing device A 304 is over channel 1262 with the network edge appliance 680, over channel 1264 with the WebRTC media server 640 and over channel 1266 with client computing device B 305. ICE probing may also be over channel 1268 between the WebRTC media server 640 and client computing device B 305. Reference is directed to sections 720 and 730 in the sequence diagram 700 illustrated in FIGS. 20A-20B for a detailed discussion of ICE probing.

There are a number of options for client computing device A 304 to perform network connectivity probing via the network edge appliance 680 instead of with the WebRTC media server 640 as provided by the provisioning information.

One option is where client computing device A 304 is not aware of the network edge appliance 680. In this case, when the client RTC API engine 308 attempts network connectivity probing with the WebRTC media server 640, the network edge appliance 680 intercepts the attempt. The provisioning information for the WebRTC media server 640 is replaced with the provisioning information for the network edge appliance 680 that is functioning as a local media server. This interception and redirection is transparent to client computing device A 304.

Another option for client computing device A 304 to perform network connectivity probing via the network edge appliance 680 is when client computing device A 304 is made aware of the availability of the network edge appliance for the alternative network connectivity probing. This may be possible when a local device configuration is pushing group policies to client computing device A 304 with the information needed to communicate with the network edge appliance 680. Alternatively, a beacon is pushed through the webRTC redirection and then client computing device A 304 talks to that beacon to discover the network edge appliance 680. Automatic network discovery protocols may also be used for client computing device A 304 to communicate with the network edge appliance 680.

Still referring now to FIG. 28, a simplified WebRTC API redirection architecture 1200 with alternative network connectivity steering will be discussed. The simplified WebRTC API redirection architecture 1200 is based on the WebRTC API redirection architecture 300 illustrated in FIG. 3 and the WebRTC service framework 625 illustrated in FIG. 19. For the items discussed below that are not shown in FIG. 28, reference is directed to FIG. 3. Also, the WebRTC API redirection architecture 1200 will be referred to as computing system 1200.

Since client computing device A 304 is constrained by the enterprise from communicating outside of Intranet A 660, network connectivity probing will now be performed by client computing device A 304 via the network edge appliance 680. Network connectivity probing determines reachability from client computing device A 304 to peer client computing device B 305.

The peer computing device is illustrated as another client computing device, i.e., client computing device B 305. Alternatively, the peer computing device may be configured as a conference bridge. A conference bridge allows a group of users to connect and share multimedia.

Even though probing is performed by client computing device A 304 instead of virtual desktop server 302, signaling with the WebRTC signaling server 630 remains with the virtual desktop server 302. As noted above, the WebRTC signaling server 630 has the authentication and authorization function, and it serves as a rendezvous point for client computing device A 304 and client computing device B 305 to be able to communicate with each other.

The computing system 1200 includes a virtual desktop server 302 within an enterprise. The virtual desktop server 302 includes an application framework 312 comprising a real-time media application 310 to provide real-time communications (RTC) for peer-to-peer networking, and a native RTC engine 316 to execute a portion of the real-time media application when received by the native RTC engine 316.

An application program interface (API) code redirection module 306 redirects intercepted APIs of the real-time media application intended for the native RTC engine 316 so that the portion of the real-time media application is redirected away from the native RTC engine 316.

The API code redirection module 306 redirects the intercepted APIs based on redirection code 314 injected into the real-time media application 310. The redirected APIs correspond to real-time media processing. The portion of the real-time media application being redirected includes information directed to a provisioned media server 640.

A network edge appliance 680 is associated with a branch within the enterprise and is configured to provide alternative network connectivity options for the peer-to-peer networking. Client computing device A 304 is in the branch with the network edge appliance 680.

Client computing device A 304 includes a client RTC API engine 308 communicating with the API code redirection module 306 to execute the redirected portion of the real-time media application. Client computing device A 304 performs alternative network connectivity probing via the network edge appliance 680 to determine reachability to a peer computing device 305, and establishes at least one media stream with the peer computing device 305 via the network edge appliance 680 based on the alternative network connectivity probing.

The at least one media stream may be relayed over channel 1262 to the network edge appliance 680 and over channel 1266 to client computing device B 305. Alternatively, the at least one media stream may be relayed over channel 1262 to the network edge appliance 680 and over channel 1264 to the WebRTC media server 640 then to client computing device B 305 over channel 1268.

In one approach, the client RTC API engine 308 may be configured to attempt network connectivity probing via the provisioned media server 640 before performing the alternative network connectivity probing. In this approach the network edge appliance 680 is further configured to intercept the attempt so that the alternative network connectivity probing is instead performed.

In another approach, the network edge appliance 680 may notify client computing device A 304 on availability of the network edge appliance 680 for the alternative network connectivity probing.

The provisioning information being redirected along with the portion of the real-time media application includes information on at least one of a session traversal utilities for NAT (STUN) server, a traversal using relay NAT (TURN) server, and a combination of a STUN and TURN server. The client RTC API engine 308 communicates with the API code redirection module 306 through a virtual channel 318, and wherein the information on STUN and TURN servers to be used in the network connectivity probing is provided over the virtual channel 318.

The alternative connectivity probing is based on interactive connectivity establishment (ICE). The alternative connectivity probing is based on communications with at least one session traversal utilities for NAT (STUN) server implementing a STUN protocol. The network connectivity probing may be further based on communications with at least one traversal using relay NAT (TURN) server implementing a TURN protocol.

Figure 29:
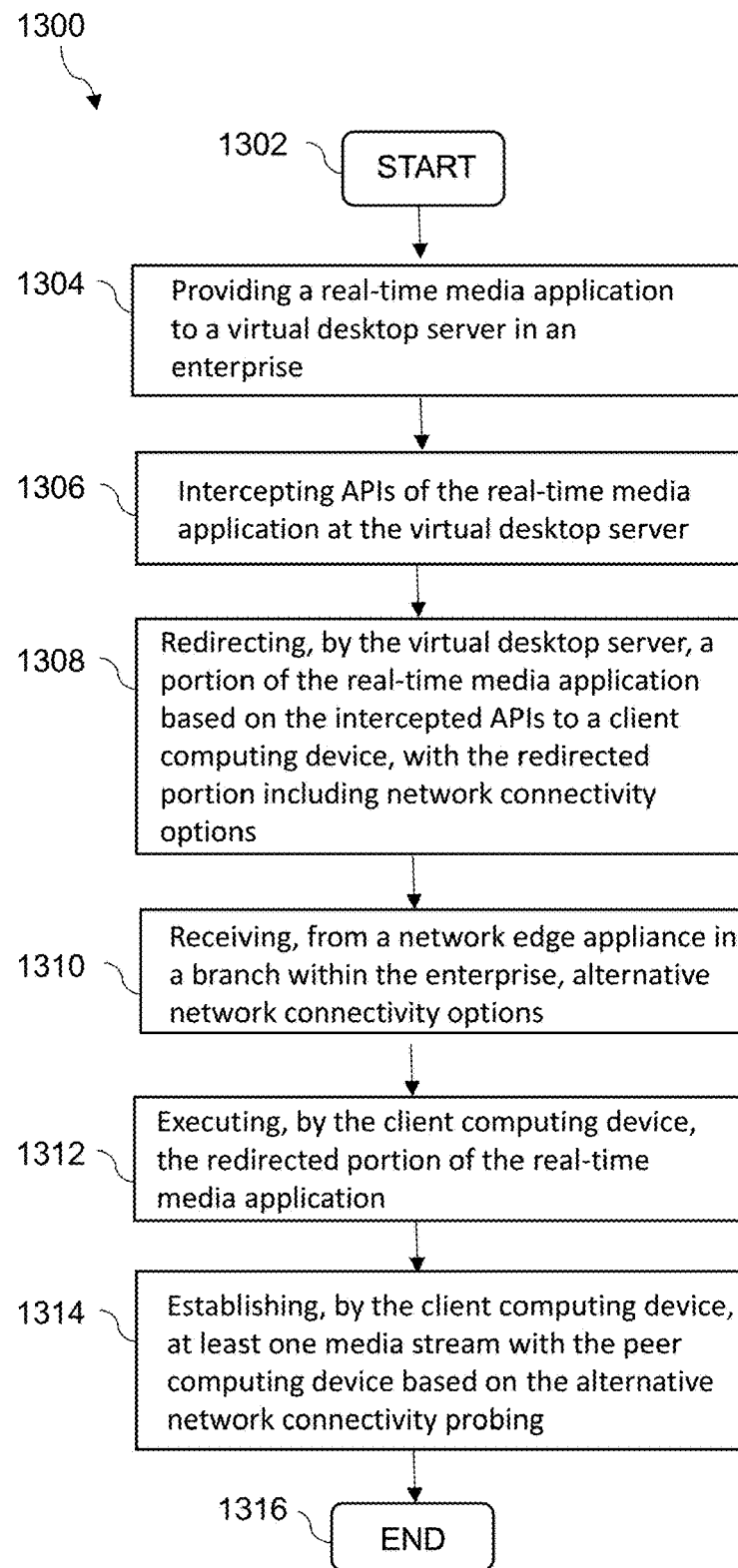
FIG. 29 is a flowchart illustrating a method for providing real-time communications for peer-to-peer networking for the WebRTC API redirection architecture illustrated in FIG. 28.

Referring now to FIG. 29, a flowchart 1300 illustrating a method for providing real-time communications for peer-to-peer networking for the WebRTC API redirection architecture 900 with alternative network connectivity steering will be discussed. From the start (Block 1302), the method includes providing real-time communications (RTC) for peer-to-peer networking to the virtual desktop server 302 in an enterprise at Block 1304. A portion of a real-time media application is to be executed when received by the native RTC engine 316 in the virtual desktop server 302.

APIs of the real-time media application 310 are intercepted by the API code redirection module 306 of the virtual desktop server 302 at Block 1306. The API code redirection module 306 redirects the portion of the real-time media application to client computing device A 304 at Block 1308 based on the intercepted APIs. The portion of the real-time media application being redirected includes provisioning information directed to a media server.

Client computing device A 304 receives from a network edge appliance 680 associated with a branch within the enterprise alternative network connectivity options for the peer-to-peer networking at Block 1310. The client computing device A 304 executes the redirected portion of the real-time media application 310 at Block 1312. At least one media stream is established with the peer computing device 305 at Block 1314 based on the alternative network connectivity probing. The method ends at Block 1316.

Figure 30:
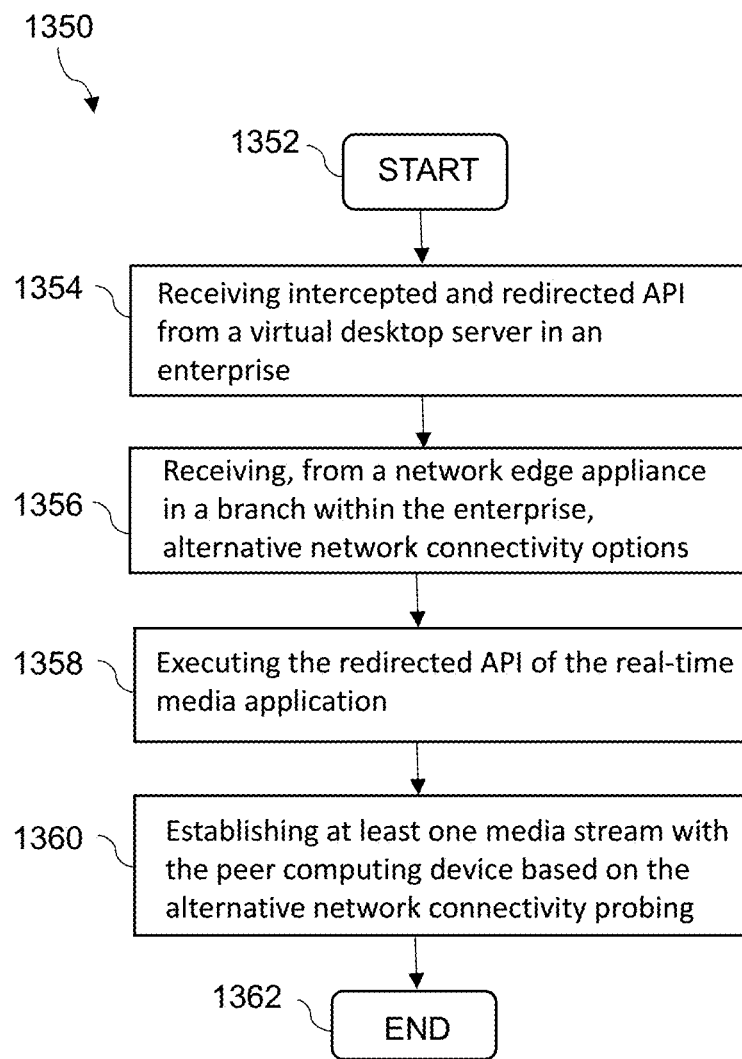
FIG. 30 is a flowchart illustrating a method for operating a client computing device within the WebRTC API redirection architecture illustrated in FIG. 28.

Referring now to FIG. 30, a flowchart 1350 illustrating a method for operating the client computing device 304 within the WebRTC API redirection architecture 1000 with alternative network connectivity steering will be discussed. From the start (Block 1352), the method includes receiving intercepted and redirected APIs from the virtual desktop server 302 at Block 1354. The APIs are related to a portion of the real-time media application 310 to be executed by the virtual desktop server 302. The portion of the real-time media application being redirected includes provisioning information directed to a media server.

The method further includes receiving, from a network edge appliance 680 associated with a branch within the enterprise, alternative network connectivity options for the peer-to-peer networking at Block 1356. Client computing device A 304 executes the redirected portion of the real-time media application 310 at Block 1358. At least one media stream is established with the peer computing device 305 at Block 1360 based on the alternative network connectivity probing. The method ends at Block 1362.

Another aspect is directed to a non-transitory computer readable medium for operating a client computing device 304 within a computing system 1200 comprising a virtual desktop server 302 within an enterprise, and a network edge appliance 680 associated with a branch within the enterprise to provide alternative network connectivity options for peer-to-peer networking. The virtual desktop server 302 includes a real-time media application to provide real-time communications (RTC) for peer-to-peer networking, and a native RTC engine 316 to execute a portion of the real-time media application when received by the native RTC engine 316.

An API code redirection module 306 in the virtual desktop server 302 redirects intercepted APIs of the real-time media application 310 intended for the native RTC engine 316 so that the portion of the real-time media application is redirected away from the native RTC engine 316. The portion of the real-time media application being redirected includes provisioning information directed to a media server 640.

The non-transitory computer readable medium has a plurality of computer executable instructions for causing the client computing device 304 in the branch with the network edge appliance 680 to execute the redirected portion of the real-time media application, and perform alternative network connectivity probing via the network edge appliance 680 to determine reachability to a peer computing device 305. At least one media stream is established with the peer computing device 305 via the network edge appliance 680 based on the alternative network connectivity probing.

Figure 31:
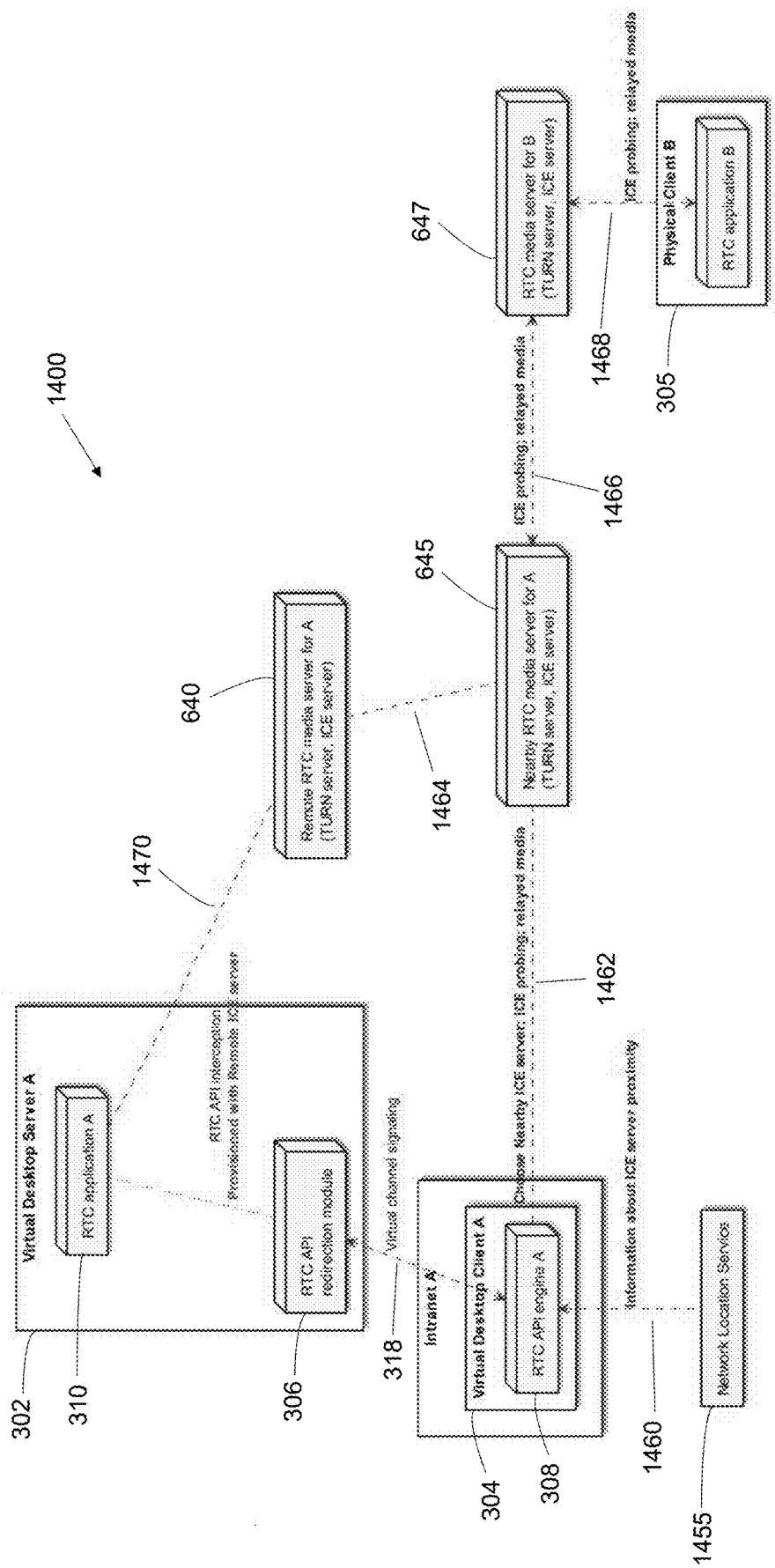
FIG. 31 is a simplified block diagram of the WebRTC API redirection architecture illustrated in FIG. 3 with intelligent network connectivity steering.

Referring now to FIG. 31, another feature of network connectivity probing is directed to intelligent network connectivity steering, such as when the virtual desktop server 302 and client computing device A 304 are in different geographic locations. For example, the virtual desktop server 302 is located in the US, and client computing device A 304 is located in Europe.

When client computing device A 304 connects to the virtual desktop server 302, the provisioning information that is redirected to client computing device A 304 is for a preferred WebRTC media server 640 that is close to the virtual desktop server 302. In this case, the WebRTC media server 640 is in the US. However, from a network latency efficiency point of view, this is sub-optimum for client computing device A 304 (located in Europe) to connect with the virtual desktop server 302 (located in the US). For discussion purposes, the WebRTC media server 640 is referred to as a remote WebRTC media server 640.

Preferably, client computing device A 304 instead connects to a nearby WebRTC media server 645 that is in Europe. Client computing device A 304 is made aware of the nearby WebRTC media server 645 from a network location service 1455.

A key feature of the network location service 1455 is to understand the topology of the Internet. The best path on the Internet from point A to point B is determined given the current state of affairs. The network location service 1455 may be characterized as a huge scale database. It provides API so a client computing device could potentially query it and request to connect a WebRTC media server that gives the client computing device the best path. An example network location service 1455 is Intelligent Traffic Management (ITM) as provided by Citrix.

The ITM service basically collects information from a variety of endpoints by embedding JavaScript into websites. The embedded JavaScript may be referred to as Trojan horses. So when each endpoint connects to a website, the JavaScript runs and collects metrics about connectivity network statistics, and then sends the collected metrics over to the ITM service. The ITM service has visibility using the Trojan horses that are embedded in each web site.

In another embodiment, the network location service 1455 is configured as a network edge appliance operating within a local network along with client computing device A 304. The network edge appliance operates more in real-time since it actually interfaces on the network to figure out where to go. The network edge appliance could be a gateway service node, such as Citrix SD-WAN. Client computing device A 304 receives information about a nearby WebRTC media server 645 that would give better performance for media relay and/or has a higher chance of succeeding with the ICE connectivity probing. Preferably, the network edge appliance provides the nearest Point of Presence (PoP) for client computing device A 304.

Still referring now to FIG. 31, a simplified WebRTC API redirection architecture 1400 with intelligent network connectivity steering will be discussed. The simplified WebRTC API redirection architecture 1400 is based on the WebRTC API redirection architecture 300 illustrated in FIG. 3 and the WebRTC service framework 625 illustrated in FIG. 19. For the items discussed below that are not shown in FIG. 31, reference is directed to FIG. 3. Also, the WebRTC API redirection architecture 1400 will be referred to as computing system 1400.

The peer computing device is illustrated as another client computing device, i.e., client computing device B 305. Alternatively, the peer computing device may be configured as a conference bridge. A conference bridge allows a group of users to connect and share multimedia.

Even though probing is performed by client computing device A 304 instead of virtual desktop server 302, signaling with the WebRTC signaling server 630 remains with the virtual desktop server 302. As noted above, the WebRTC signaling server 630 has the authentication and authorization function, and it serves as a rendezvous point for client computing device A 304 and client computing device B 305 to be able to communicate with each other.

The computing system 1400 includes a virtual desktop server 302 comprising an application framework 312 comprising a real-time media application 310 to provide real-time communications (RTC) for peer-to-peer networking, and a native RTC engine 316 to execute a portion of the real-time media application when received by the native RTC engine 316.

An application programming interface (API) code redirection module 306 redirects intercepted APIs of the real-time media application intended for the native RTC engine 316 so that the portion of the real-time media application is redirected away from the native RTC engine 316. The portion of the real-time media application being redirected includes provisioning information directed to a remote media server 640.

A network location service 1455 provides provisioning information directed to a nearby media server 645 over channel 1460. Client computing device A 304 includes a client RTC API engine 308 communicating with the API code redirection module 306 and the network location service 1455 to execute the redirected portion of the real-time media application, and select the remote media server 640 or the nearby media server 645 based on network proximity to the client computing device 3604.

Network connectivity probing is performed by the client RTC API engine 308 with the selected media server 645 to determine reachability to client computing device B 305. At least one media stream is established with client computing device B 305 based on the network connectivity probing.

The nearby media server 645 is selected when the remote media server 640 is in close network proximity to the virtual desktop server 302, and the nearby media server 645 is in close network proximity to client computing device A 304.

With the intelligent network connectivity probing, probing performed by client computing device A 304 is over channel 1462 with the nearby media server 645, over channel 1466 with a RTC media server 647 for client computing device B 305, and over channel 1468 with client computing device B 305. The nearby media server 645 may communicate with the remote media server over channel 1464, which then communicates with the virtual desktop server 302 over channel 1470. Reference is directed to sections 720 and 730 in the sequence diagram 700 illustrated in FIGS. 20A-20B for a detailed discussion of ICE probing.

Based on the network connectivity probing, the at least one media stream may be relayed over channel 1462 to the nearby media server 645, over channel 1466 to RTC media server 647, and then over channel 1468 to client computing device B 305.

Client computing device A 304 operates within a local network, and wherein the network location service 1455 includes a network edge appliance operating within the local network. Alternatively, client computing device A 304 operates within the local network, but the network location service 1455 operates in a remote network.

The provisioning information directed to the remote media server includes at least one of a session traversal utilities for NAT (STUN) server, a traversal using relay NAT (TURN) server, and a combination of a STUN and TURN server in close network proximity to the virtual desktop server. The information directed to the nearby media server includes at least one of a STUN server, a TURN server, and a combination of a STUN and TURN server in close network proximity to the client computing device.

The network connectivity probing is based on communications with at least one session traversal utilities for NAT (STUN) server implementing a STUN protocol. The network connectivity probing is further based on communications with at least one traversal using relay NAT (TURN) server implementing a TURN protocol.

The API code redirection module 306 redirects the intercepted APIs based on redirection code injected into the real-time media application. The redirected APIs correspond to real-time media processing.

Figure 32A:
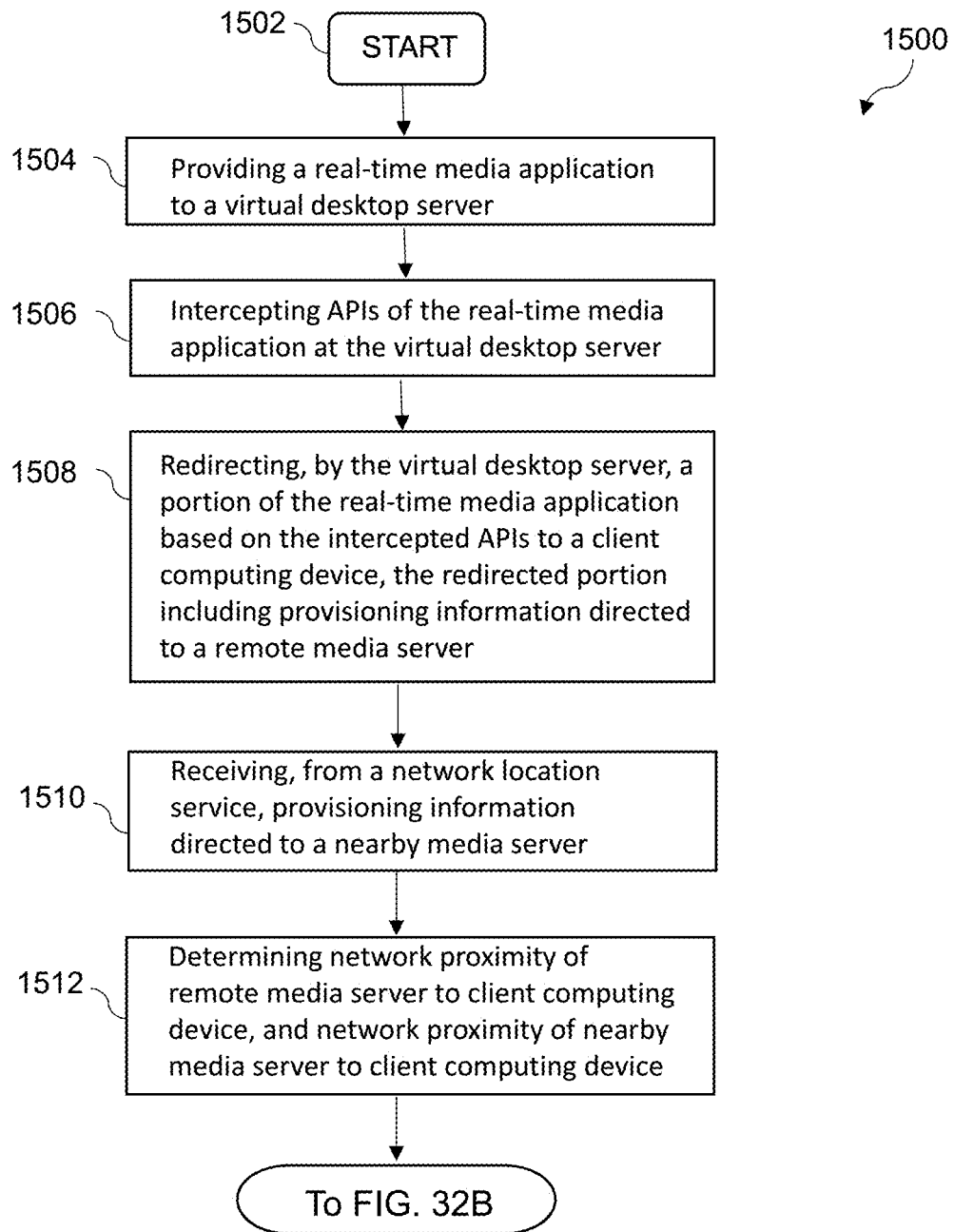
FIGS. 32A-32B are a flowchart illustrating a method for providing real-time communications for peer-to-peer networking for the WebRTC API redirection architecture illustrated in FIG. 31.
Figure 32B:
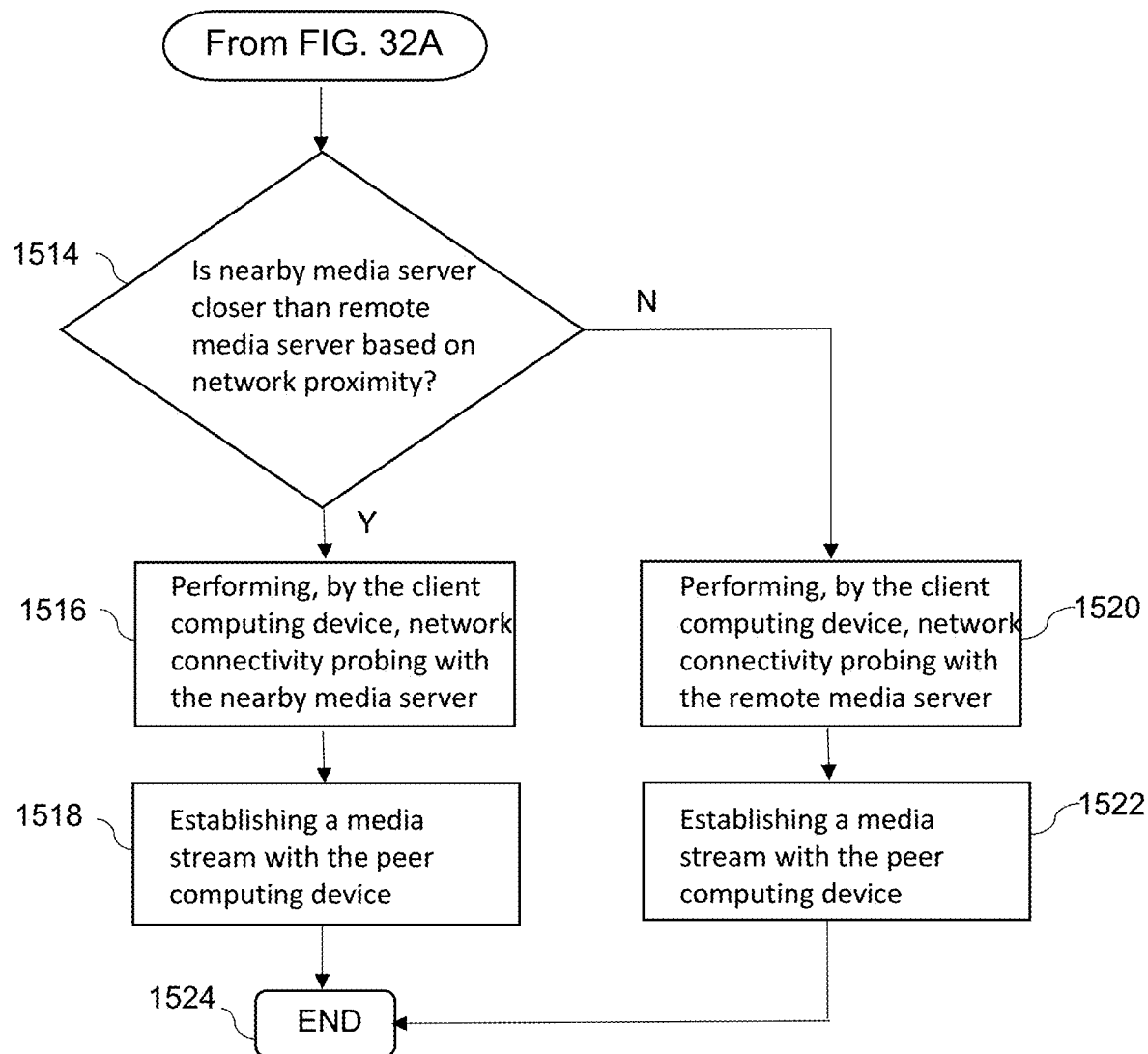

Referring now to FIGS. 32A and 32B, a flowchart 1500 illustrating a method for providing real-time communications for peer-to-peer networking for the WebRTC API redirection architecture 900 with intelligent network connectivity steering will be discussed. From the start (Block 1502), the method includes providing real-time communications (RTC) for peer-to-peer networking to the virtual desktop server 302 at Block 1504. A portion of a real-time media application is to be executed when received by the native RTC engine 316 in the virtual desktop server 302.

APIs of the real-time media application 310 are intercepted by the API code redirection module 306 of the virtual desktop server 302 at Block 1506. The API code redirection module 306 redirects the portion of the real-time media application to client computing device A 304 at Block 1508 based on the intercepted APIs. The portion of the real-time media application being redirected includes provisioning information directed to a remote media server 640.

Client computing device A 304 receives from a network location service 1455 provisioning information directed to a nearby media server 645 at Block 1510. At Block 1512, network proximity of the remote media server 640 to client computing device A 302 is determined, and network proximity of the nearby media server to client computing device A 304 is determined. A decision is made if the nearby media server 645 is closer than the remote media server 640 based on network proximity at Block 1514.

If the nearby media server 645 is closer, then client computing device A 304 performs network connectivity probing with the nearby media server at Block 1516. At least one media stream is established with the peer computing device 305 at Block 1518. If the remote media server 640 is closer, then client computing device A 304 performs network connectivity probing with the remote media server at Block 1520. At least one media stream is established with the peer computing device 305 at Block 1522. The method ends at Block 1524.

Figure 33:
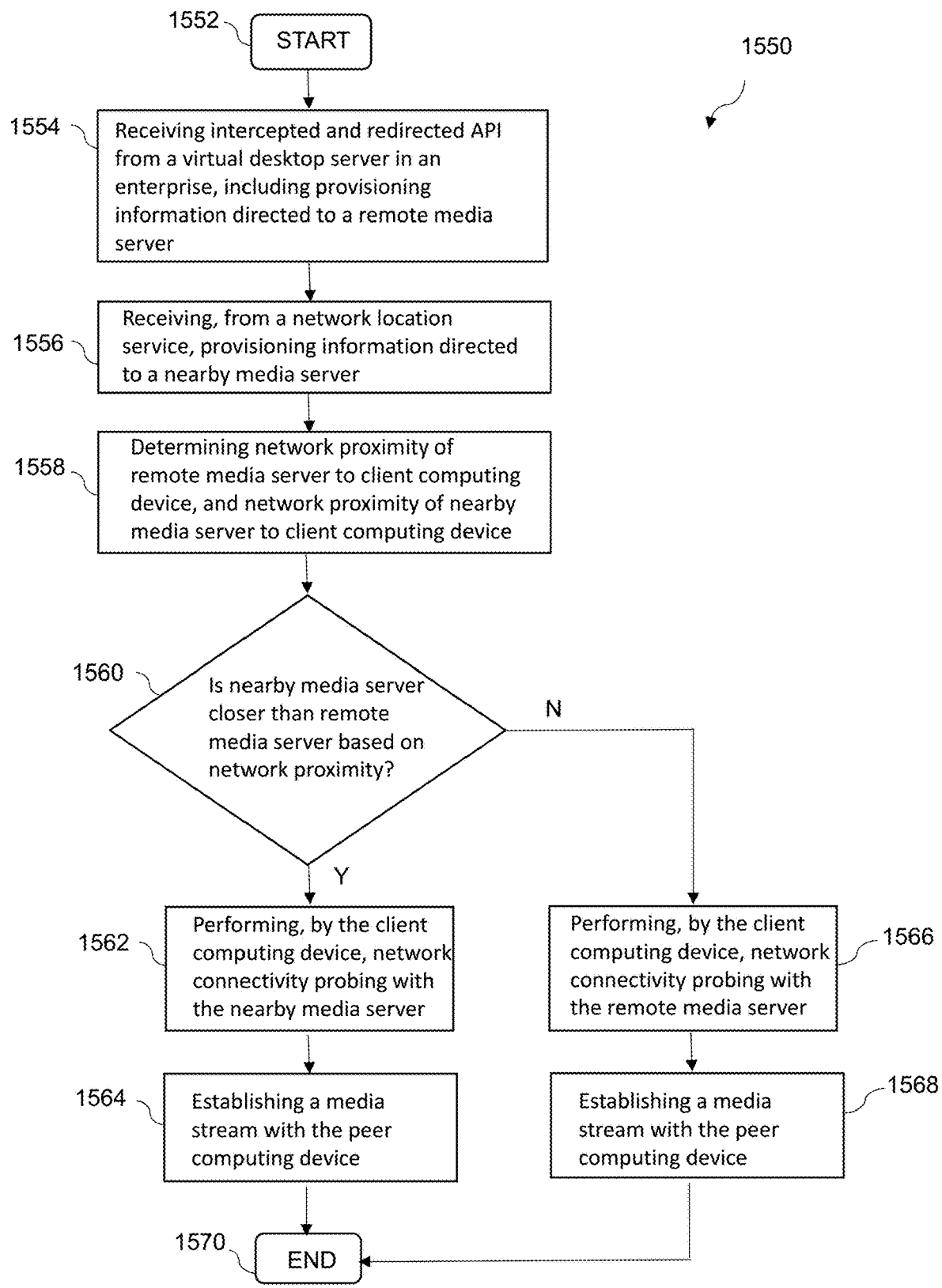
FIG. 33 is a flowchart illustrating a method for operating a client computing device within the WebRTC API redirection architecture illustrated in FIG. 31.

Referring now to FIG. 33, a flowchart 1550 illustrating a method for operating the client computing device 304 within the WebRTC API redirection architecture 1400 with intelligent network connectivity steering will be discussed. From the start (Block 1552), the method includes receiving intercepted and redirected APIs from the virtual desktop server 302 at Block 1554. The APIs are related to a portion of the real-time media application 310 to be executed by the virtual desktop server 302. The portion of the real-time media application being redirected includes provisioning information directed to a remote media server 640.

The method further includes receiving, from a network location service 1455, provisioning information directed to a nearby media server 645 at Block 1556. At Block 1558, network proximity of the remote media server 640 to client computing device A 302 is determined, and network proximity of the nearby media server 645 to client computing device A 304 is determined. A decision is made if the nearby media server 645 is closer than the remote media server 640 based on network proximity at Block 1560.

If the nearby media server 645 is closer, then client computing device A 304 performs network connectivity probing with the nearby media server at Block 1562. At least one media stream is established with the peer computing device 305 at Block 1564. If the remote media server 640 is closer, then client computing device A 304 performs network connectivity probing with the remote media server at Block 1566. At least one media stream is established with the peer computing device 305 at Block 1568. The method ends at Block 1570.

Another aspect is directed to a non-transitory computer readable medium for operating a client computing device 304 within a computing system 1400 comprising a virtual desktop server 302, and a network location service 1455 to provide information directed to a nearby media server 645.

The virtual desktop server 302 includes an application framework 312 comprising a real-time media application 310 to provide real-time communications (RTC) for the peer-to-peer networking, and a native RTC engine 316 executes a portion of the real-time media application when received by the native RTC engine 316.

An application programming interface (API) code redirection module 306 redirects intercepted APIs of the real-time media application intended for the native RTC engine 316 so that the portion of the real-time media application is redirected away from the native RTC engine 316. The portion of the real-time media application being redirected includes provisioning information directed to a remote media server 640.

The non-transitory computer readable medium has a plurality of computer executable instructions for causing the client computing device 304 to execute the redirected portion of the real-time media application, and select the remote media server 640 or the nearby media server 645 based on network proximity to the client computing device 304. Network connectivity probing is performed with the selected media server to determine reachability to a peer computing device 305. At least one media stream is established with the peer computing device 305 based on the network connectivity probing.

In WebRTC activity and quality monitoring, WebRTC redirection framework has complete visibility into real-time media activity and can implement various types of activity and quality monitoring. For example, real-time media monitoring statistics can be combined with other resource usage and quality metrics produced by the desktop virtualization framework, and used to present a more comprehensive view to systems and applications administrators and other decision makers.

In a virtual app/desktop session collaboration, a shared HDX session use case will be discussed. During HDX virtual session sharing or collaboration there will be an initiator and any number of collaborators. The HDX session will always be owned by the initiator. The initiator invites the collaborators to join or share the session. All collaborators will have separate protocol stacks at Receiver.

At the Virtual Desktop server all collaborators could share the protocol stack. The management of the collaboration session, including policies, invitation, authentication, security, input arbitration, and other core mechanisms related to the shared HDX session lifetime are outside the scope of this disclosure.

The server connector code could aggregate devices from all endpoints. For example, Webcams can be enumerated from the initiator and all collaborators and presented to the get user media WebRTC API (NavigatorUserMedia, getUserMedia( )) in the context of the app. Thereafter, all the info (Webcam names) will be sent to the initiator and the collaborators so Receivers can implement accelerated Peer-to-Peer (P2P) overlays. Each client endpoint should filter out their own Webcam.

In case any one of the initiator or the collaborators does not support the accelerated WebRTC functionality, the virtual desktop server connector code could operate in "dual" mode, i.e., remote WebRTC where possible, and fallback to host-side rendering for purposes of remoting to WebRTC-redirection incapable client endpoints.

Upon fallback, injected code will defer to the built-in WebRTC engine to enumerate local devices, which may in turn invoke other virtual channel functionality to enumerate client devices and perform non-optimized redirection, for example via generic Audio redirection or graphics remoting virtual channels. The support of non-optimized redirection in shared sessions is VC specific and outside the scope of this disclosure. An alternative approach would be to disable WebRTC remoting for all collaborators, but this is more limiting.

In the event the initiator or a collaborator disconnects from the shared session, either on purpose or accidentally, e.g., as a result of network disruption, disconnect events will be raised to the server connector code. This in turn will notify the hosted app via the WebRTC API that media devices from the disconnected endpoint are no longer available. Thereafter, the event will be sent to the other client endpoints (remaining initiator or collaborators) so receivers can update the list of accelerated Peer-to-Peer (P2P) overlays.

Functional background may be provided in the following references, all of which are assigned to the current assignee of the present application and which are all incorporated by reference in their entirety:

Remoting Audio and Video Extensions (RAVE); Methods and Apparatus for Generating Graphical and Media Displays at a Client: U.S. Pat. Nos. 8,131,816; 8,671,213; and 9,325,759.

Reverse RAVE (Webcam Redirection); Systems and Methods for Remotely Presenting a Multimedia Stream: U.S. Pat. Nos. 9,191,425; and 9,203,883.

Flash Redirection; Systems and methods for remoting multimedia plugin calls: U.S. Pat. No. 8,296,357.

HTML5 Video Redirection; Multimedia redirection in a virtualized environment using a proxy server: U.S. Pat. Nos. 9,124,668; and 9,571,599.

Browser Content Redirection; Redirection of Web Content: Provisional—ID1340 (B&W ref 007737.00826); Managing Browser Session Navigation Between One or More Browsers: Provisional—ID1368US (B&W ref 007737.00827).

Several patents that cover Citrix HDX Real-time Optimization Pack component architecture include: U.S. Pat. Nos. 8,949,316; 8,869,141; 8,799,362; and 8,601,056, sharing the title "Scalable high-performance interactive real-time media architectures for virtual desktop environments".

However, as explained in detail above, the novelty of this disclosure lies in specific functions and interactions of the injected code, connector, and engine modules that are designed to optimize real-time media APIs and WebRTC in particular.

Many modifications and other embodiments will come to the mind of one skilled in the art having the benefit of the That which is claimed:

1. A computing system comprising:
a virtual desktop server within an enterprise and comprising:
an application framework comprising a real-time media application to provide real-time communications (RTC) for peer-to-peer networking, and a native RTC engine to execute a portion of the real-time media application when received by the native RTC engine, and
an application programming interface (API) code redirection module to redirect intercepted APIs of the real-time media application intended for the native RTC engine so that the portion of the real-time media application is redirected away from the native RTC engine, with the portion of the real-time media application being redirected including provisioning information directed to a media server;
a network edge appliance associated with a branch within the enterprise and configured to provide alternative network connectivity options for the peer-to-peer networking; and
a client computing device in the branch with said network edge appliance and comprising a client RTC API engine communicating with the API code redirection module to:
execute the redirected portion of the real-time media application,
perform alternative network connectivity probing via said network edge appliance to determine reachability to a peer computing device, and
establish at least one media stream with the peer computing device via said network edge appliance based on the alternative network connectivity probing.

2. The computing system according to claim 1 wherein the client RTC API engine is further configured to attempt network connectivity probing via the provisioned media server before performing the alternative network connectivity probing, and wherein said network edge appliance is further configured to intercept the attempt so that the alternative network connectivity probing is instead performed by the client RTC API engine.

3. The computing system according to claim 1 wherein said network edge appliance notifies said client computing device on availability of said network edge appliance for the alternative network connectivity probing.

4. The computing system according to claim 1 wherein the provisioning information being redirected along with the portion of the real-time media application includes information on at least one of a session traversal utilities for NAT (STUN) server, a traversal using relay NAT (TURN) server, and a combination of a STUN and TURN server.

5. The computing system according to claim 4 wherein the client RTC API engine communicates with the API code redirection module through a virtual channel, and wherein the information on STUN and TURN servers to be used in the network connectivity probing is provided over the virtual channel.

6. The computing system according to claim 1 wherein the alternative connectivity probing is based on an interactive connectivity establishment (ICE).

7. The computing system according to claim 1 wherein the alternative connectivity probing is based on communications with at least one session traversal utilities for NAT (STUN) server implementing a STUN protocol.

8. The computing system according to claim 7 wherein the network connectivity probing is further based on communications with at least one traversal using relay NAT (TURN) server implementing a TURN protocol.

9. The computing system according to claim 1 wherein the API code redirection module redirects the intercepted APIs based on redirection code injected into the real-time media application.

10. The computing system according to claim 1 wherein the redirected APIs correspond to real-time media processing.

11. The computing system according to claim 1 wherein the peer computing device is configured as another client computing device.

12. The computing system according to claim 1 wherein the peer computing device is configured as a conference bridge.

13. A method for providing real-time communications (RTC) for peer-to-peer networking comprising:
receiving, by a virtual desktop server within an enterprise, a portion of a real-time media application by a native RTC engine of the virtual desktop server;
intercepting and redirecting, by an application programming interface (API) code redirection module of the virtual desktop server, APIs of the real-time media application intended for the native RTC engine so that the portion of the real-time media application is redirected away from the native RTC engine, with the portion of the real-time media application being redirected including provisioning information directed to a media server;
receiving, from a network edge appliance associated with a branch within the enterprise, alternative network connectivity options for the peer-to-peer networking; and
instructing, by the virtual desktop server, a client computing device in the branch with the network edge appliance and comprising a client RTC API engine communicating with the API code redirection module to:
execute the redirected portion of the real-time media application, and
establish at least one media stream with the peer computing device via the network edge appliance based on the alternative network connectivity probing.

14. The method according to claim 13 wherein the client RTC API engine is further configured to attempt network connectivity probing via the provisioned media server before performing the alternative network connectivity probing, and wherein the network edge appliance is further configured to intercept the attempt so that the alternative network connectivity probing is instead performed by the client RTC API engine.

15. The method according to claim 13 wherein the network edge appliance notifies the client computing device on availability of the network edge appliance for the alternative network connectivity probing.

16. The method according to claim 13 wherein the provisioning information being redirected along with the portion of the real-time media application includes information on at least one of a session traversal utilities for NAT (STUN) server, a traversal using relay NAT (TURN) server, and a combination of a STUN and TURN server.

17. The method according to claim 16 wherein the client RTC API engine communicates with the API code redirection module through a virtual channel, and wherein the information directed to STUN and TURN servers to be used in the network connectivity probing is provided over the virtual channel.

18. The method according to claim 13 wherein the alternative connectivity probing is based on interactive connectivity establishment (ICE).

19. The method according to claim 13 wherein the alternative connectivity probing is based on communications with at least one session traversal utilities for NAT (STUN) server implementing a STUN protocol, and based on communications with at least one traversal using relay NAT (TURN) server implementing a TURN protocol.

20. A non-transitory computer readable medium for operating a client computing device within a computing system comprising a virtual desktop server within an enterprise, and a network edge appliance associated with a branch within the enterprise to provide alternative network connectivity options for peer-to-peer networking, with the virtual desktop server comprising an application framework comprising a real-time media application to provide real-time communications (RTC) for the peer-to-peer networking, and a native RTC engine to execute a portion of the real-time media application when received by the native RTC engine, and an application programming interface (API) code redirection module to redirect intercepted APIs of the real-time media application intended for the native RTC engine so that the portion of the real-time media application is redirected away from the native RTC engine, with the portion of the real-time media application being redirected including provisioning information directed to a media server, and with the non-transitory computer readable medium having a plurality of computer executable instructions for causing the client computing device in the branch with the network edge appliance to perform steps comprising:
executing the redirected portion of the real-time media application;
performing alternative network connectivity probing via the network edge appliance to determine reachability to a peer computing device; and
establishing at least one media stream with the peer computing device via the network edge appliance based on the alternative network connectivity probing.

21. A method for providing real-time communications (RTC) for peer-to-peer networking comprising:
receiving, by a client computing device in communication with a virtual desktop server within an enterprise, intercepted and redirected application programming interface (API) from the virtual desktop server, the API related to a portion of a real-time media application to be executed by the virtual desktop server, wherein the portion of the real-time media application is redirected to the client computing device and includes provisioning information directed to a media server;
receiving, from a network edge appliance associated with a branch within the enterprise, alternative network connectivity options for the peer-to-peer networking; and
executing, by the client computing device, the redirected portion of the real-time media application;
establishing, by the client computing device, at least one media stream with the peer computing device via the network edge appliance based on the alternative network connectivity probing.

* * * * *